(12) United States Patent
Kimura et al.

(10) Patent No.: US 10,750,517 B2
(45) Date of Patent: Aug. 18, 2020

(54) COMMUNICATION CONTROL DEVICE, COMMUNICATION CONTROL METHOD, AND COMMUNICATION DEVICE

(71) Applicant: SONY CORPORATION, Tokyo (JP)

(72) Inventors: Ryota Kimura, Tokyo (JP); Ryo Sawai, Tokyo (JP); Hiromasa Uchiyama, Kanagawa (JP); Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/196,319

(22) Filed: Nov. 20, 2018

(65) Prior Publication Data

US 2019/0090254 A1 Mar. 21, 2019

Related U.S. Application Data

(63) Continuation of application No. 14/909,125, filed as application No. PCT/JP2014/066745 on Jun. 24, 2014, now Pat. No. 10,149,309.

(30) Foreign Application Priority Data

Aug. 7, 2013 (JP) ................................ 2013-164333

(51) Int. Cl.
*H04W 72/08* (2009.01)
*H04W 28/16* (2009.01)
(Continued)

(52) U.S. Cl.
CPC .......... *H04W 72/085* (2013.01); *H04B 7/024* (2013.01); *H04W 28/16* (2013.01);
(Continued)

(58) Field of Classification Search
None
See application file for complete search history.

(56) References Cited

U.S. PATENT DOCUMENTS 9,055,514 B2 * 6/2015 Meylan ................. H04W 48/10
9,325,398 B2 * 4/2016 Negus ..................... H04W 4/00
(Continued)

FOREIGN PATENT DOCUMENTS

EP 2246992 A1 11/2010
EP 2445246 A1 4/2012
(Continued)

OTHER PUBLICATIONS

Office Action for CN Patent Application No. 201480042845.5, dated Sep. 20, 2018, 10 pages of Office Action and 16 pages of English Translation.

(Continued)

*Primary Examiner* — Bunjob Jaroenchonwanit
(74) *Attorney, Agent, or Firm* — Chip Law Group

(57) ABSTRACT

A communication control device including an acquisition unit configured to acquire quality-related information regarding quality of a backhaul line to be used for providing control-related information regarding control in a control scheme of radio communication to a communication node to which the control scheme is applied, and a control unit configured to control the application of the control scheme to the communication node based on the quality-related information.

15 Claims, 64 Drawing Sheets

(51) Int. Cl.
*H04W 72/04* (2009.01)
*H04B 7/024* (2017.01)

(52) U.S. Cl.
CPC ... *H04W 72/0406* (2013.01); *H04W 72/0426* (2013.01); *H04W 72/0433* (2013.01)

(56) References Cited

U.S. PATENT DOCUMENTS

| | | | |
|---|---|---|---|
| 2008/0205420 A1* | 8/2008 | Srikrishna | H04W 40/12 370/401 |
| 2010/0080157 A1* | 4/2010 | Stewart | H04W 40/026 370/311 |
| 2010/0104033 A1 | 4/2010 | Gorokhov | |
| 2010/0151876 A1 | 6/2010 | Park et al. | |
| 2011/0080864 A1* | 4/2011 | Cai | H04W 36/30 370/315 |
| 2012/0046028 A1 | 2/2012 | Damnjanovic et al. | |
| 2012/0087298 A1* | 4/2012 | Garavaglia | H04W 24/10 370/315 |
| 2012/0093006 A1* | 4/2012 | Yang | H04M 3/2236 370/249 |
| 2012/0294179 A1* | 11/2012 | Tafreshi | H04W 36/18 370/252 |
| 2012/0294203 A1* | 11/2012 | Koorapaty | H04L 1/0002 370/280 |
| 2013/0044620 A1* | 2/2013 | Sul | H04L 65/80 370/252 |
| 2013/0142111 A1* | 6/2013 | Kim | H04W 76/046 370/315 |
| 2013/0194948 A1* | 8/2013 | Mallik | H04W 24/00 370/252 |
| 2013/0244670 A1 | 9/2013 | Biermann et al. | |
| 2013/0279350 A1 | 10/2013 | Erickson et al. | |
| 2014/0370823 A1* | 12/2014 | Yu | H04B 17/14 455/73 |
| 2015/0304018 A1* | 10/2015 | Pitakdumrongkija | H04B 7/15592 370/315 |
| 2015/0365141 A1* | 12/2015 | Derneryd | H01Q 3/2605 455/63.4 |
| 2015/0365959 A1* | 12/2015 | Coldrey | H04W 24/04 370/252 |
| 2016/0037511 A1* | 2/2016 | Vincze | H04B 7/024 370/329 |
| 2016/0044657 A1* | 2/2016 | Park | H04L 1/1861 370/329 |

FOREIGN PATENT DOCUMENTS

| | | | |
|---|---|---|---|
| EP | 2464187 | A2 | 6/2012 |
| EP | 2579658 | A1 | 4/2013 |
| JP | 2011-120095 | A | 6/2011 |
| JP | 2012-507203 | A | 3/2012 |
| JP | 2012-124887 | A | 6/2012 |
| JP | 2012-199944 | A | 10/2012 |
| JP | 2012-209679 | A | 10/2012 |
| JP | 2013-502182 | A | 1/2013 |
| JP | 2013-527724 | A | 6/2013 |
| WO | 2010/048513 | A2 | 4/2010 |
| WO | 2011/020062 | A2 | 2/2011 |
| WO | 2011/150719 | A1 | 12/2011 |
| WO | 2012/052512 | A1 | 4/2012 |

OTHER PUBLICATIONS

Offfice Action for CN Patent Application No. 201480042845.5, dated Sep. 20, 2018, 10 pages of Office Action and 16 pages of English Translation.

Office Action for JP Patent Application No. 2015-530746, dated May 22, 2018, 11 pages of Office Action and 04 pages of English Translation.

Extended European Search Report of EP Patent Application No. 14835443.4, dated Feb. 28, 2017, 09 pages.

"Proposals for backhaul constraint modelling on latency and capacity", Huawei, HiSilicon, 3GPP TSG RAN WG1 Meeting #64, Feb. 21-25, 2011, 09 pages.

Brueck, et al., "Centralized Scheduling for Joint Transmission Coordinated Multi-Point in LTE-Advanced", International ITG Workshop on Smart Antennas (WSA 2010), 2010, 08 pages.

International Search Report and Written Opinion of PCT Application No. PCT/JP2014/066745, dated Sep. 30, 2014, 10 pages of English Translation and 09 pages of ISRWO.

International Preliminary Report on Patentability of PCT Application No. PCT/JP2014/066745, dated Feb. 18, 2016, 10 pages of English Translation and 07 pages of IPRP.

Notice of Allowance and Fees Due for U.S. Appl. No. 14/909,125, dated Oct. 31, 2018, 03 pages.

Notice of Allowance and Fees Due for U.S. Appl. No. 14/909,125, dated Sep. 5, 2018, 02 pages.

Notice of Allowance and Fees Due for U.S. Appl. No. 14/909,125, dated Jul. 27, 2018, 05 pages.

Advisory Action for U.S. Appl. No. 14/909125, dated Apr. 30, 2018, 03 pages.

Final Rejection for U.S. Appl. No. 14/909,125, dated Feb. 13, 2018, 16 pages.

Non-Final Rejection for U.S. Appl. No. 14/909,125, dated Aug. 18, 2017, 18 pages.

* cited by examiner

FIG.3

| | #0 D | #1 S | #2 U | #3 U | #4 U | #5 D | #6 S | #7 U | #8 U | #9 U |
|---|---|---|---|---|---|---|---|---|---|---|
| Configuration 0 DL:UL 2:3 | #0 D | #1 S | #2 U | #3 U | #4 U | #5 D | #6 S | #7 U | #8 U | #9 D |
| Configuration 1 DL:UL 3:2 | #0 D | #1 S | #2 U | #3 U | #4 D | #5 D | #6 S | #7 U | #8 U | #9 D |
| Configuration 2 DL:UL 4:1 | #0 D | #1 S | #2 U | #3 D | #4 D | #5 D | #6 S | #7 U | #8 D | #9 D |
| Configuration 3 DL:UL 7:3 | #0 D | #1 S | #2 U | #3 U | #4 U | #5 D | #6 D | #7 D | #8 D | #9 D |
| Configuration 4 DL:UL 4:1 | #0 D | #1 S | #2 U | #3 U | #4 D | #5 D | #6 D | #7 D | #8 D | #9 D |
| Configuration 5 DL:UL 9:1 | #0 D | #1 S | #2 U | #3 D | #4 D | #5 D | #6 D | #7 D | #8 D | #9 D |
| Configuration 6 DL:UL 1:1 | #0 D | #1 S | #2 U | #3 U | #4 U | #5 D | #6 S | #7 U | #8 U | #9 D |

FIG.13

| BACKHAUL TECHNOLOGY | LATENCY (ONE WAY) | THROUGHPUT | PRIORITY (1 IS THE HIGHEST) |
|---|---|---|---|
| FIBER ACCESS 1 | 10-30ms | 10M-10Gbps | 1 |
| FIBER ACCESS 2 | 5-10ms | 100-1000Mbps | 2 |
| FIBER ACCESS 3 | 2-5ms | 50M-10Gbps | 1 |
| DSL ACCESS | 15-60ms | 10-100Mbps | 1 |
| CABLE | 25-35ms | 10-100Mbps | 2 |
| WIRELESS BACKHAUL | 5-35ms | 10Mbps-100Mbps TYPICAL, MAYBE UP TO Gbps RANGE | 1 |

FIG.14

| BACKHAUL TECHNOLOGY | LATENCY (ONE WAY) | THROUGHPUT | PRIORITY (1 IS THE HIGHEST) |
|---|---|---|---|
| FIBER ACCESS 4 (NOTE 1) | LESS THAN 2.5 US (NOTE 2) | UP TO 10Gbps | 1 |

FIG.19

| IE IN REQUEST MESSAGE |
| --- |
| REQUEST MESSAGE SOURCE |
| REQUEST MESSAGE DESTINATION |
| BACKHAUL QUALITY MEASUREMENT REQUEST FLAG (ONE OR MORE) |
| TIME STAMP OF TRANSMISSION OF REQUEST MESSAGE |
| DATA SIZE OF REQUEST MESSAGE |

FIG.20

| IE IN RESPONSE MESSAGE |
| --- |
| RESPONSE MESSAGE SOURCE |
| RESPONSE MESSAGE DESTINATION |
| BACKHAUL QUALITY MEASUREMENT RESPONSE FLAG (ONE OR MORE) |
| BACKHAUL QUALITY MEASUREMENT RESULT (ONE OR MORE) |
| TIME STAMP OF TRANSMISSION OF RESPONSE MESSAGE |
| DATA SIZE OF RESPONSE MESSAGE |

FIG.22

| IE IN REQUEST MESSAGE |
|---|
| REQUEST MESSAGE SOURCE |
| REQUEST MESSAGE DESTINATION |
| BACKHAUL QUALITY MEASUREMENT REQUEST FLAG (ONE OR MORE) |
| TOTAL NUMBER OF REQUEST |
| CURRENT REQUEST INDEX |
| TIME STAMP OF TRANSMISSION OF REQUEST MESSAGE |
| DATA SIZE OF REQUEST MESSAGE |

FIG.23

| IE IN RESPONSE MESSAGE |
|---|
| RESPONSE MESSAGE SOURCE |
| RESPONSE MESSAGE DESTINATION |
| BACKHAUL QUALITY MEASUREMENT RESPONSE FLAG (ONE OR MORE) |
| BACKHAUL QUALITY MEASUREMENT RESULT (ONE OR MORE) |
| TOTAL NUMBER OF RESPONSE |
| CURRENT RESPONSE INDEX |
| TIME STAMP OF TRANSMISSION OF RESPONSE MESSAGE |
| DATA SIZE OF RESPONSE MESSAGE |

FIG.25

| IE IN REQUEST MESSAGE |
|---|
| REQUEST MESSAGE SOURCE |
| REQUEST MESSAGE DESTINATION |
| BACKHAUL QUALITY MEASUREMENT REQUEST FLAG (ONE OR MORE) |
| TOTAL NUMBER OF REQUEST |
| CURRENT REQUEST INDEX |
| TIME STAMP OF TRANSMISSION OF REQUEST MESSAGE |
| DATA SIZE OF REQUEST MESSAGE |

FIG.26

| IE IN RESPONSE MESSAGE |
|---|
| RESPONSE MESSAGE SOURCE |
| RESPONSE MESSAGE DESTINATION |
| BACKHAUL QUALITY MEASUREMENT RESPONSE FLAG (ONE OR MORE) |
| BACKHAUL QUALITY MEASUREMENT RESULT (ONE OR MORE) |
| TOTAL NUMBER OF MEASUREMENTS |
| TIME STAMP OF TRANSMISSION OF RESPONSE MESSAGE |
| DATA SIZE OF RESPONSE MESSAGE |

FIG.28

| IE IN COMPLETE MESSAGE |
|---|
| COMPLETE MESSAGE SOURCE |
| COMPLETE MESSAGE DESTINATION |
| BACKHAUL QUALITY MEASUREMENT COMPLETE FLAG (ONE OR MORE) |
| BACKHAUL QUALITY MEASUREMENT RESULT (ONE OR MORE) |

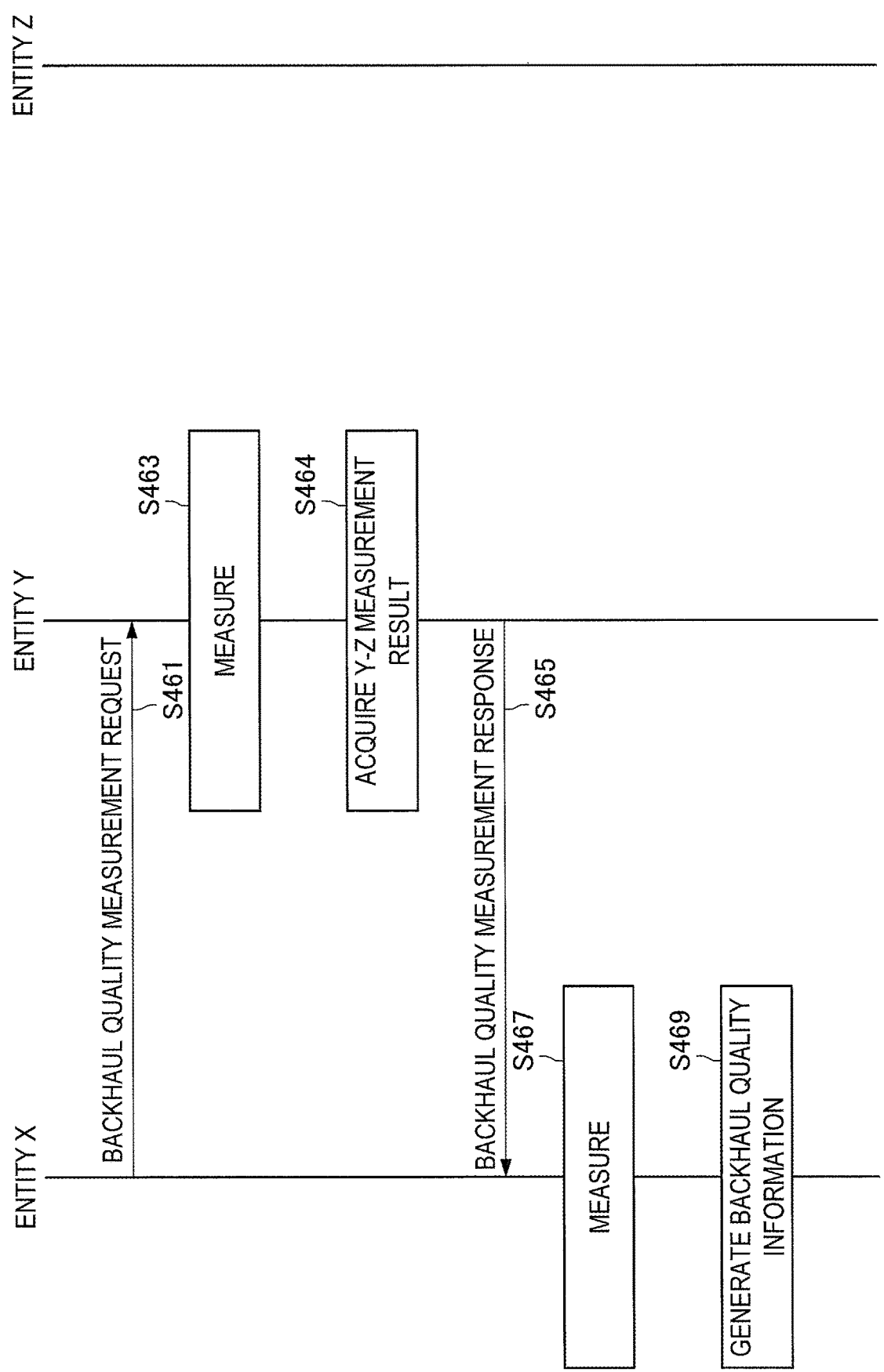

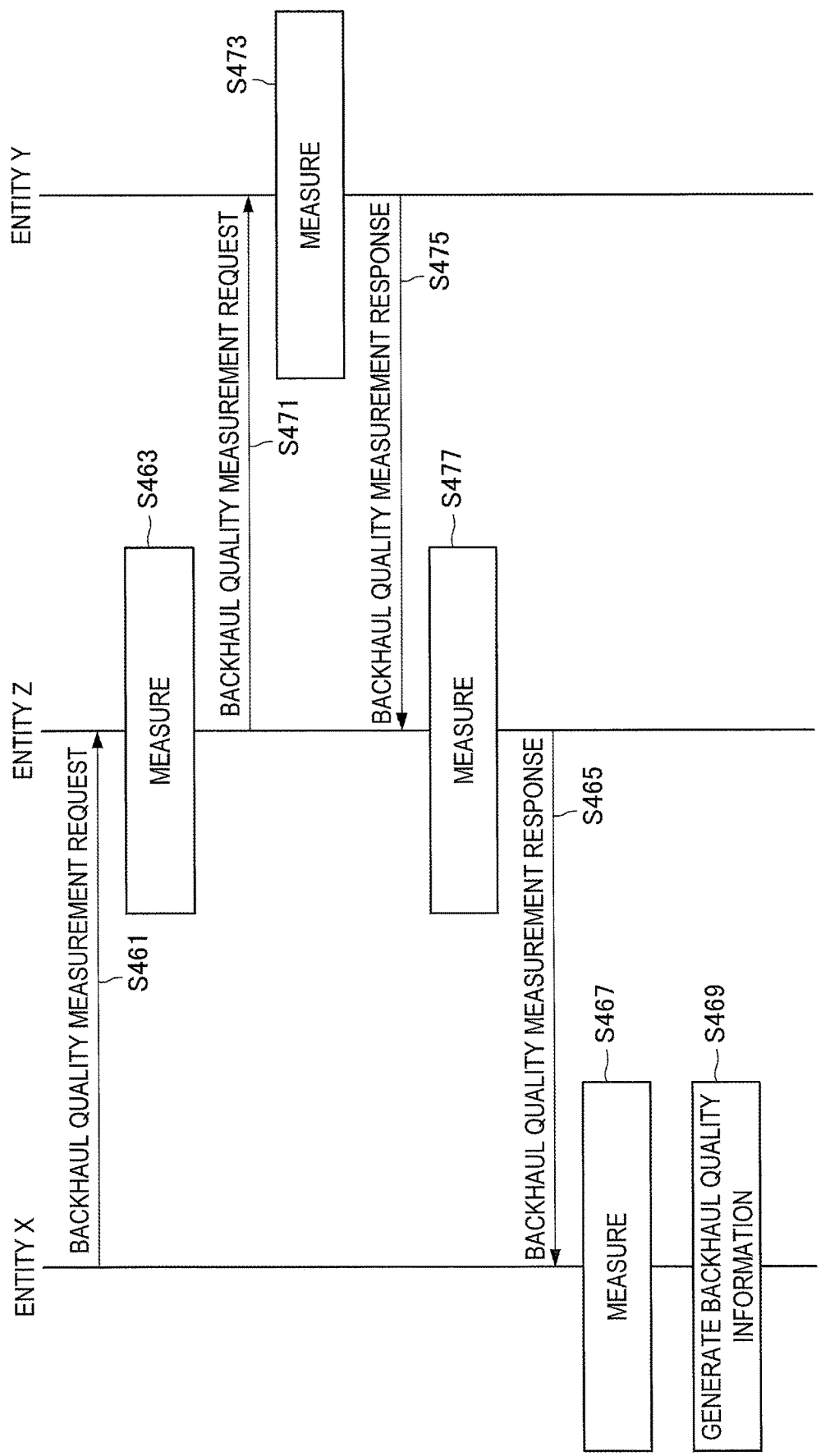

FIG.34

| IE IN RESPONSE MESSAGE |
|---|
| RESPONSE MESSAGE SOURCE |
| RESPONSE MESSAGE DESTINATION |
| TOTAL NUMBER OF BACKHAUL TYPES |
| BACKHAUL SOURCE (PER BACKHAUL TYPE) (ONE ORE MORE) |
| BACKHAUL DESITNATION (PER BACKHAUL TYPE) (ONE ORE MORE) |
| BACKHAUL TYPE (PER BACKHAUL TYPE) (ONE ORE MORE) |
| BACKHAUL QUALITY MEASUREMENT RESPONSE FLAG (PER BACKHAUL TYPE) (ONE ORE MORE) |
| BACKHAUL QUALITY MEASUREMENT RESULT (PER BACKHAUL TYPE) (ONE ORE MORE) |
| TIME STAMP OF TRANSMISSION OF RESPONSE MESSAGE |
| DATA SIZE OF RESPONSE MESSAGE |

FIG.36

| IE IN REQUEST MESSAGE |
|---|
| REQUEST MESSAGE SOURCE |
| REQUEST MESSAGE DESTINATION |
| BACKHAUL INFORMATION GATHERING REQUEST FLAG (ONE OR MORE) |
| BACKHAUL SOURCE (ONE OR MORE) |
| BACKHAUL DESTINATION (ONE OR MORE) |

FIG.37

| IE IN RESPONSE MESSAGE |
|---|
| RESPONSE MESSAGE SOURCE |
| RESPONSE MESSAGE DESTINATION |
| BACKHAUL INFORMATION (ONE OR MORE) |
| BACKHAUL SOURCE (ONE OR MORE) |
| BACKHAUL DESTINATION (ONE OR MORE) |

FIG.39

| IE IN REQUEST MESSAGE |
|---|
| REQUEST MESSAGE SOURCE |
| REQUEST MESSAGE DESTINATION |
| REQUEST MESSAGE TRANSFER |
| BACKHAUL INFORMATION GATHERING REQUEST FLAG (ONE OR MORE) |
| BACKHAUL SOURCE (ONE OR MORE) |
| BACKHAUL DESTINATION (ONE OR MORE) |

FIG.41

| IE IN RESPONSE MESSAGE |
|---|
| RESPONSE MESSAGE SOURCE |
| RESPONSE MESSAGE DESTINATION |
| BACKHAUL INFORMATION (ONE OR MORE) |
| BACKHAUL SOURCE (ONE OR MORE) |
| BACKHAUL DESTINATION (ONE OR MORE) |
| DESTINATION ENTITY TO BE REQUESTED (ONE OR MORE) |

FIG.44

| IE IN RESPONSE MESSAGE |
|---|
| RESPONSE MESSAGE SOURCE |
| RESPONSE MESSAGE DESTINATION |
| BACKHAUL SOURCE (ONE OR MORE) |
| BACKHAUL DESTINATION (ONE OR MORE) |
| NUMBER OF BACKHAUL TYPES BETWEEN SOURCE AND DESTINATION (ONE OR MORE) |
| BACKHAUL TYPE (ONE OR MORE) |
| BACKHAUL INFORMATION (ONE OR MORE) |

FIG.45

| CLASS | CONTROL SCHEME | APPLICATION CONDITION |
|---|---|---|
| 1 | Frequency-domain ICIC | $T_{D1} < T$ |
| 2 | Time-domain ICIC (Zero-power ABS) | $T_{D2} < T <= T_{D1}$ |
| 3 | Time-domain ICIC (Reduced-power ABS) | $T_{D3} < T <= T_{D2}$ |
| 4 | Beam-forming (Static) | $T_{D4} < T <= T_{D3}$ |
| 5 | Beam-forming (Dynamic) | $T <= T_{D4}$ |

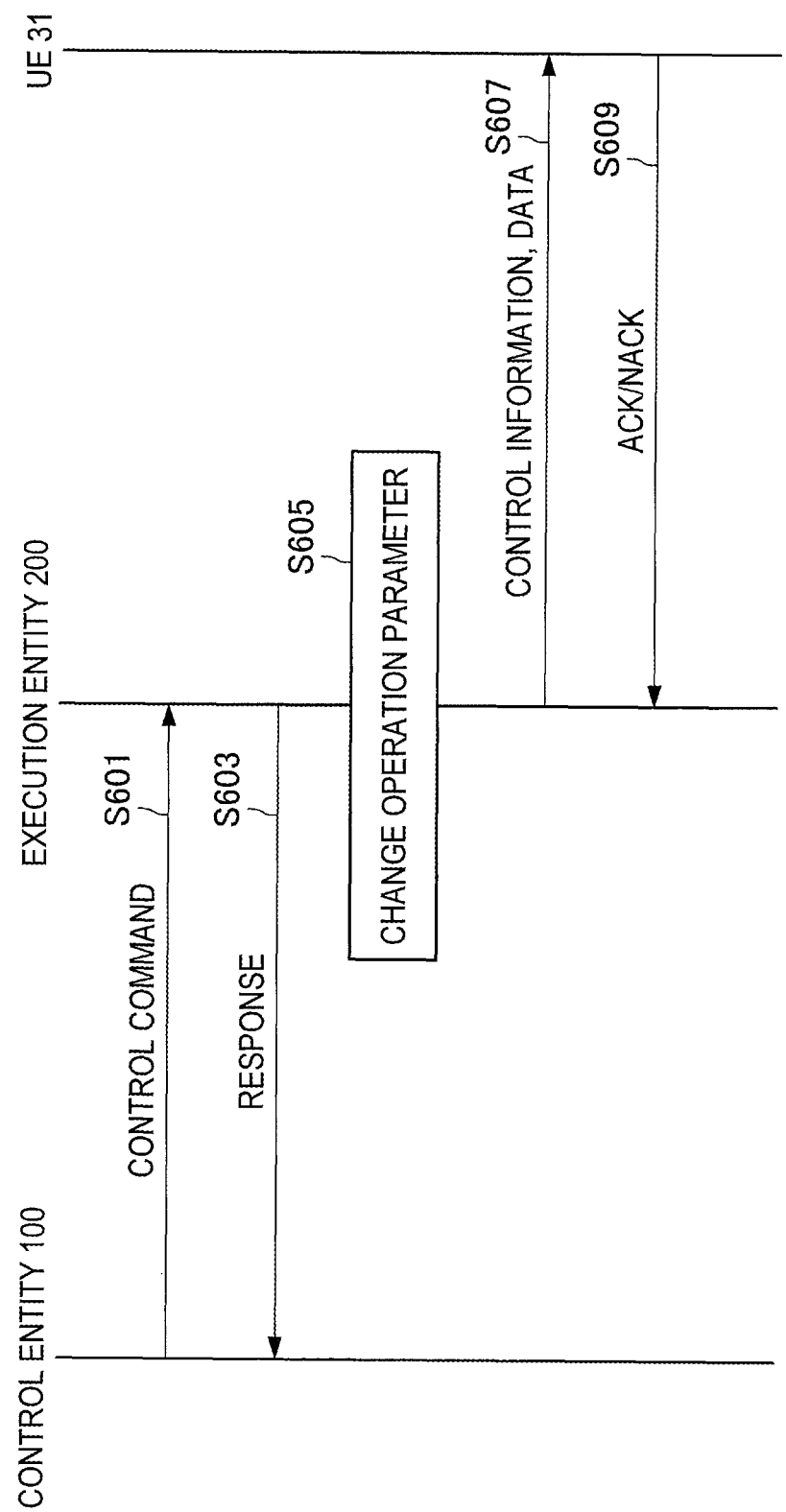

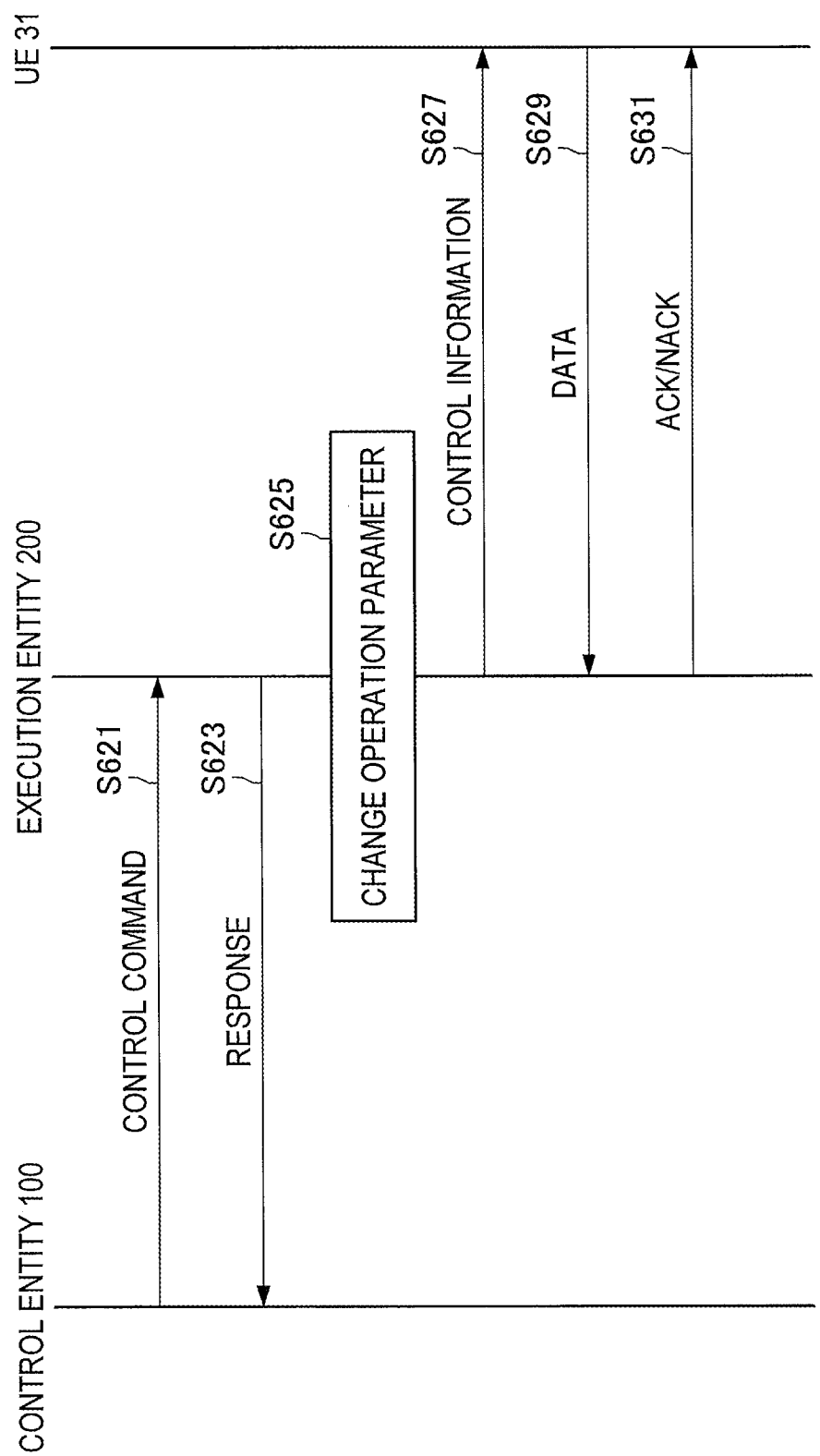

FIG.48

| RESPONSE MESSAGE IE |
|---|
| RESPONSE MESSAGE SOURCE |
| RESPONSE MESSAGE DESTINATION |
| ACK/NACK |
| REASON |

FIG.49

| REASON ID | REASON |
|---|---|
| 0 | ERROR DETECTED |
| 1 | OUT OF SERVICE |
| 2 | OUT OF AMOUNT RANGE |
| 3 | OUT OF START-TIME RANGE |
| 4 | OTHERS |

FIG.50

| COMMAND MESSAGE IE |
|---|
| COMMAND MESSAGE SOURCE |
| COMMAND MESSAGE DESTINATION |
| CONTROL METHOD CLASS ID |
| WHEN TO APPLY THIS COMMAND |
| FREQUENCY RESOURCE TO BE USED |
| POWER REDUCTION FOR FFR |

FIG.52

| COMMAND MESSAGE IE |
|---|
| COMMAND MESSAGE SOURCE |
| COMMAND MESSAGE DESTINATION |
| CONTROL METHOD CLASS ID |
| WHEN TO APPLY THIS COMMAND |
| TIME RESOURCE TO BE USED |
| POWER REDUCTION FOR REDUCED POWER ABS |

FIG.54

| COMMAND MESSAGE IE |
|---|
| COMMAND MESSAGE SOURCE |
| COMMAND MESSAGE DESTINATION |
| CONTROL METHOD CLASS ID |
| WHEN TO APPLY THIS COMMAND |
| (SET OF) WEIGHT COEFFICIENT TO BE USED |

FIG.56

| COMMAND MESSAGE IE |
|---|
| COMMAND MESSAGE SOURCE |
| COMMAND MESSAGE DESTINATION |
| CONTROL METHOD CLASS ID |
| WHEN TO APPLY THIS COMMAND |
| SET OF COMP ENTITY'S ID |
| (SET OF) UE ID TO BE APPLIED BY COMP |
| FREQUENCY RESOURCE TO BE USED |
| TIME RESOURCE TO BE USED |
| (SET OF) PRECODER ID TO BE USED |

FIG.59

| COMMAND MESSAGE IE |
| --- |
| COMMAND MESSAGE SOURCE |
| COMMAND MESSAGE DESTINATION |
| AMOUNT TO BE ADJUSTED |
| WHEN TO START ADJUSTMENT |

FIG.60

| RESPONSE MESSAGE IE |
| --- |
| RESPONSE MESSAGE SOURCE |
| RESPONSE MESSAGE DESTINATION |
| ACK/NACK |
| REASON |

FIG.61

| REASON ID | REASON |
| --- | --- |
| 0 | ERROR DETECTED |
| 1 | OUT OF SERVICE |
| 2 | OUT OF AMOUNT RANGE |
| 3 | OUT OF START-TIME RANGE |
| 4 | OTHERS |

FIG.62

| INFORMATION SCHEDULING IE |
|---|
| FLAG TO INDICATE THE OPERATION TIMING WILL BE ADJUSTED |
| SCHEDULING INFORMATION |

FIG.63

| TIMING ADJUSTMENT INFORMATION |
|---|
| COMMAND MESSAGE SOURCE |
| AMOUNT TO BE ADJUSTED |
| WHEN TO START ADJUSTMENT |

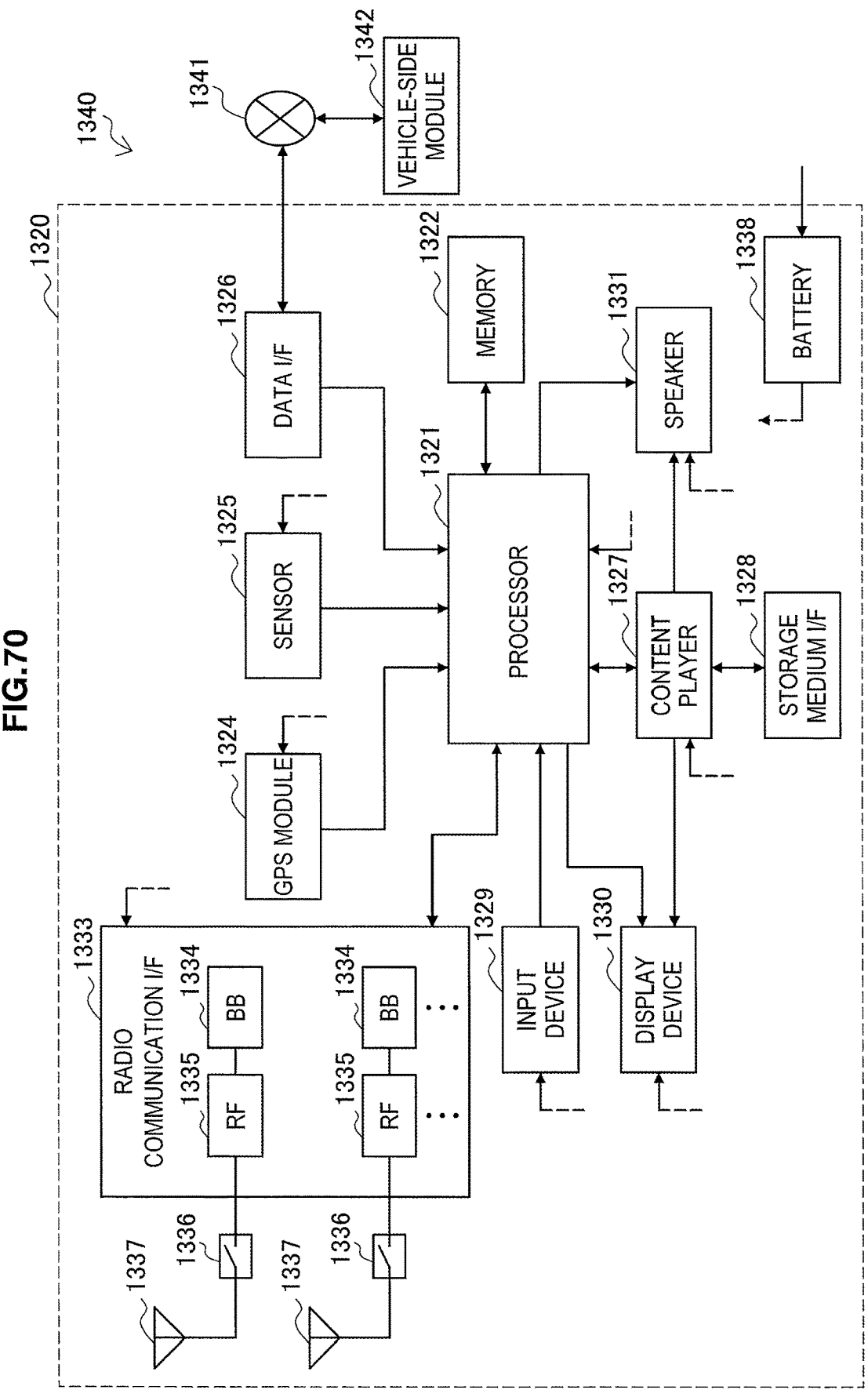

COMMUNICATION CONTROL DEVICE, COMMUNICATION CONTROL METHOD, AND COMMUNICATION DEVICE

CROSS REFERENCE TO RELATED APPLICATIONS

The present application is a continuation application of U.S. patent application Ser. No. 14/909,125, filed Jan. 31, 2016, which is a National Stage of PCT/JP2014/066745, filed Jun. 24, 2014, and which claims the priority from Japanese Patent Application JP 2013-164333 filed Aug. 7, 2013, the entire content of which is hereby incorporated by reference.

TECHNICAL FIELD

The present disclosure relates to a communication control device, a communication control method, and a communication device.

BACKGROUND ART

In recent years, communication systems of a cellular scheme such as long time evolution (LTE) and worldwide interoperability for microwave access (WiMAX) have spread widely. Further, data traffic in the communication systems is increasing due to the spread of smartphones or the like. Accordingly, it is becoming increasingly important for each communication provider to increase a communication capacity of the communication systems.

As techniques for increasing a communication capacity, those of controlling not only individual cells (or individual base stations) but also a plurality of cells (or a plurality of base stations) have been proposed. For example, techniques for interference control between a plurality of base stations, coordinated transmission and reception between a plurality of base stations, and the like have been proposed. These techniques can improve communication quality. As a result, a communication capacity can increase.

For example, as such a technology relating to interference control, Patent Literature 1 discloses a technology in which interference between femtocell base stations is measured and, based on the result of the measurement, a setting for transmission between the femtocell base stations is updated. In addition, as another technology relating to interference control, Patent Literature 2 discloses a technology for adjusting data transmission within a sector based on an interference report from another sector. Furthermore, as a technology relating to coordinated transmission and reception, Patent Literature 3 discloses a technology for controlling permission and stopping of coordinated transmission and reception so that throughput is heightened in a set coordinated control area.

CITATION LIST

Patent Literature

Patent Literature 1: JP 2011-120095A
Patent Literature 2: JP 2012-199944A
Patent Literature 3: JP 2012-209679A

SUMMARY OF INVENTION

Technical Problem

In control over a plurality of communication nodes (for example, a plurality of base stations), information regarding control (control information, data transmitted according to control, and the like) is transmitted through a backhaul line. In technologies of the related art including the technologies disclosed in Patent Literatures 1 to 3 described above, however, delays in transmission and reception on such a backhaul line (or irregular delays among backhaul lines) are not considered. For this reason, there is a possibility of a time at which information regarding control is to be acquired significantly deviating between two nodes among a plurality of communication nodes. As a result, there is concern of control by the communication nodes not being performed at a proper time.

Therefore, it is desirable to propose a mechanism which enables control over a plurality of communication nodes to be performed more properly.

Solution to Problem

According to the present disclosure, there is provided a communication control device including: an acquisition unit configured to acquire quality-related information regarding quality of a backhaul line to be used for providing control-related information regarding control in a control scheme of radio communication to a communication node to which the control scheme is applied; and a control unit configured to control the application of the control scheme to the communication node based on the quality-related information.

According to the present disclosure, there is provided a communication control method executed by a communication control device, the communication control method including: acquiring quality-related information regarding quality of a backhaul line to be used for providing control-related information regarding control in a control scheme of radio communication to a communication node to which the control scheme is applied; and controlling the application of the control scheme to the communication node based on the quality-related information.

According to the present disclosure, there is provided a communication device including: an acquisition unit configured to acquire at least a part of quality-related information regarding quality of a backhaul line to be used for providing control-related information regarding control in a control scheme of radio communication to a communication node to which the control scheme is applied; and a providing unit configured to provide the at least a part of the quality-related information. The quality-related information is information to be used in controlling the application of the control scheme to the communication node.

Advantageous Effects of Invention

According to the present disclosure described above, it is possible to enable control over a plurality of communication nodes to be performed more properly. It should be noted that the effects are not necessarily limitative, and along with or instead of the effects, any of other effects described in the present specification may also be exhibited.

BRIEF DESCRIPTION OF DRAWINGS

FIG. 3 is an illustrative diagram for describing an example of configurations of a link direction defined in 3GPP.

FIG. 13 is an illustrative diagram for describing a first example of types and qualities of backhaul technologies.

FIG. 14 is an illustrative diagram for describing a second example of types and qualities of backhaul technologies.

FIG. 19 is an illustrative diagram for describing information elements (IEs) included in a request message according to the first example of the measurement procedure.

FIG. 20 is an illustrative diagram for describing information elements (IEs) included in a response message according to the first example of the measurement procedure.

FIG. 22 is an illustrative diagram for describing information elements (IEs) included in a request message according to the second example of the measurement procedure.

FIG. 23 is an illustrative diagram for describing information elements (IEs) included in a response message according to the second example of the measurement procedure.

FIG. 25 is an illustrative diagram for describing information elements (IEs) included in a request message according to the third example of the measurement procedure.

FIG. 26 is an illustrative diagram for describing information elements (IEs) included in a response message according to the third example of the measurement procedure.

FIG. 28 is an illustrative diagram for describing information elements (IEs) included in a completion message according to the fourth example of the measurement procedure.

FIG. 32 is a sequence diagram showing a first example of the schematic flow of a seventh example of the measurement procedure of quality of a backhaul line.

FIG. 33 is a sequence diagram showing a second example of the schematic flow of a seventh example of the measurement procedure of quality of a backhaul line.

FIG. 34 is an illustrative diagram for describing information elements (IEs) included in a response message according to the seventh example of the measurement procedure.

FIG. 36 is an illustrative diagram for describing information elements (IEs) included in a request message according to the first example of the collection procedure.

FIG. 37 is an illustrative diagram for describing information elements (IEs) included in a response message according to the first example of the collection procedure.

FIG. 39 is an illustrative diagram for describing information elements (IEs) included in a request message according to the second example of the collection procedure.

FIG. 41 is an illustrative diagram for describing information elements (IEs) included in a response message according to the third example of the collection procedure.

FIG. 44 is an illustrative diagram for describing information elements (IEs) included in a response message according to the sixth example of the collection procedure.

FIG. 45 is an illustrative diagram for describing a specific example of decision of application of an interference control scheme.

FIG. 46 is an illustrative diagram for describing the flow of a process of application and execution of a control scheme in downlink.

FIG. 47 is an illustrative diagram for describing the flow of a process of application and execution of a control scheme in uplink.

FIG. 48 is an illustrative diagram for describing an example of the content of a command response message to a control command.

FIG. 49 is an illustrative diagram for describing an example of categories of the reason for NACK included in the command response message.

FIG. 50 is an illustrative diagram for describing an example of the content of a control command of frequency-domain ICIC.

FIG. 52 is an illustrative diagram for describing an example of the content of a control command of time-domain ICIC.

FIG. 54 is an illustrative diagram for describing an example of the content of the control command of time-domain ICIC.

FIG. 56 is an illustrative diagram for describing an example of the content of a control command of CoMP transmission and reception.

FIG. 59 is an illustrative diagram for describing information elements (IEs) included in a control command for adjusting an operation timing.

FIG. 60 is an illustrative diagram for describing information elements (IEs) included in a response message to the control command for adjusting the operation timing.

FIG. 61 is an illustrative diagram for describing an example of categories of the reason for NACK included in the response message to the control command for adjusting the operation timing.

FIG. 62 is an illustrative diagram for describing information elements (IEs) regarding adjustment of an operation timing included in a notification of a system information change.

FIG. 63 is an illustrative diagram for describing information elements (IEs) regarding adjustment of an operation timing included in system information.

FIG. 70 is a block diagram showing an example of a schematic configuration of a car navigation apparatus.

DESCRIPTION OF EMBODIMENTS

Figure 1:
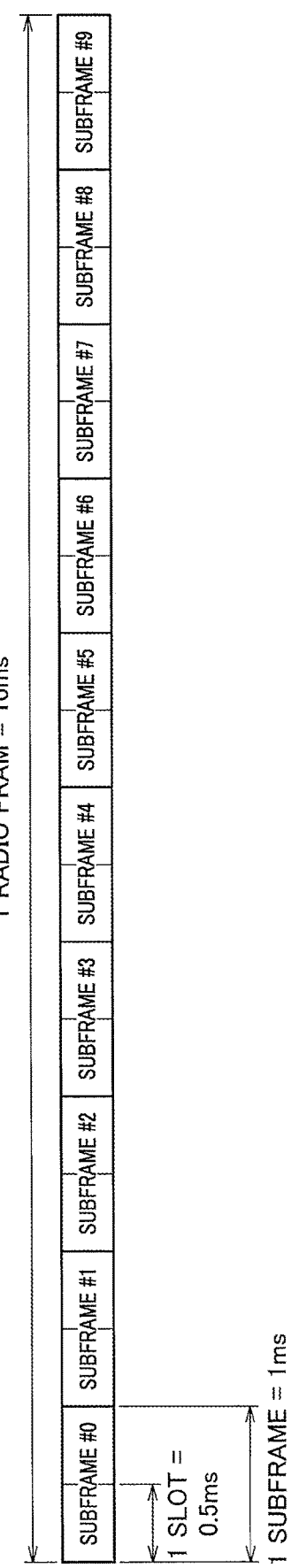
FIG. 1 is an illustrative diagram for describing a radio resource in the time direction in FDD.

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Note that description will be provided in the following order.

1. Introduction
2. Schematic configuration of communication system according to embodiment
3. Configuration of each entity
  3.1. Configuration of a control entity
  3.2. Configuration of an execution entity
4. Accumulation of backhaul quality information
  4.1. Measurement procedure
  4.2. Collection procedure
5. Control of application of a control scheme
  5.1. Decision of the application of the control scheme
  5.2. Application and execution of the control scheme
6. Others
  6.1. Adjustment of operation timing
  6.2. Filtering of backhaul quality information
  6.3. Setting of application timing of control command
7. Application examples
8. Conclusion

1. Introduction

First, radio resources, interference control, coordinated multi-point transmission and reception, a backhaul line, and technical problems will be described with reference to FIGS. 1 to 14.

(Radio Resource and Format)

Time Direction

In radio communication in the 3rd generation partnership project (3GPP), a radio resource is divided in a time direction. For example, in LTE, a radio resource is divided in a subframe unit. This point will be described below with reference to FIG. 1 and FIG. 2.

FIG. 1 is an illustrative diagram for describing a radio resource in the time direction in frequency division duplex (FDD). With reference to FIG. 1, 10 sub-frames included in a radio frame of 10 ms are shown. In the FDD, a frequency band for uplink and a frequency band for downlink are prepared, and resource control is performed in the subframe unit in each of the frequency bands. Note that each subframe includes two slots. Further, each slot includes 7 orthogonal frequency division multiplexing (OFDM) symbols.

Figure 2:
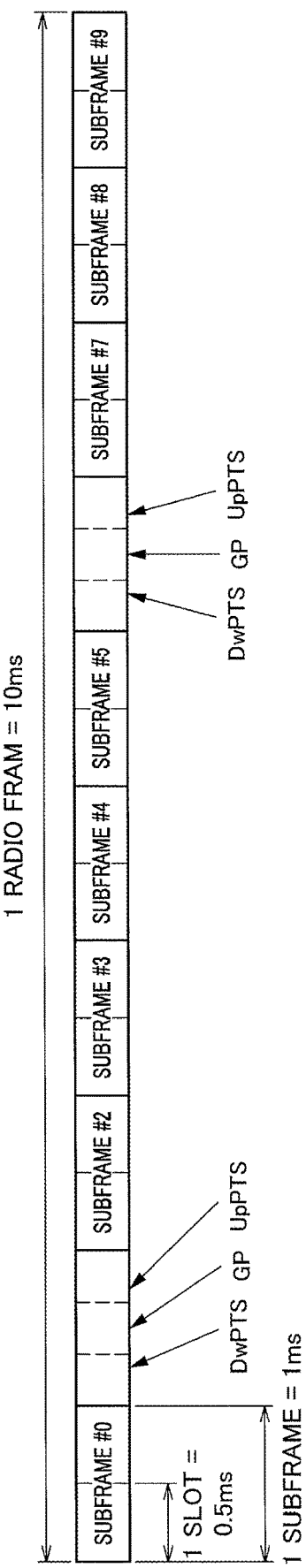
FIG. 2 is an illustrative diagram for describing a radio resource in the time direction in TDD.

FIG. 2 is an illustrative diagram for describing a radio resource in the time direction in time division duplex (TDD). With reference to FIG. 2, 10 subframes included in a radio frame of 10 ms are shown. In the TDD, communication is performed according to a link direction in the subframe unit. That is, each subframe is one of a downlink subframe, an uplink subframe, or a special subframe. The special subframe is provided for suppressing the interference in switching from the downlink subframe to the uplink subframe. The special subframe includes a downlink pilot time slot (DwPTS), a guard period, and an uplink pilot time slot (UpPTS). With reference to FIG. 3, a specific example of the link direction in the subframe unit in the TDD will be described below.

FIG. 3 is an illustrative diagram for describing an example of configurations of a link direction defined in 3GPP. With reference to FIG. 3, 7 configurations defined in the LTE technology standard (TS 36.211 Table 4.2-2) are shown. The subframe represented by "D" is the downlink subframe, the subframe represented by "U" is the uplink subframe, and the subframe represented by "S" is the special subframe. For example, in LTE, any configuration of these 7 configurations is selected and applied.

Frequency Direction

Furthermore, for example, in LTE, the radio resource is divided also in a frequency direction. Specifically, in the frequency band direction, subcarriers exist at an interval of 15 kHz. Then, the subcarriers are bundled every 12 subcarriers (that is, 180 kHz).

Time Direction and Frequency Direction

For example, in LTE, the radio resource over the 12 subcarriers in the frequency direction and 1 slot in the time direction is handled as a resource block (RB). Further, the radio resource of 1 subcarrier and 1 OFDM symbol is called a resource element.

Each RE is used for transmission of a control signal or a data signal. Examples of the control signal include a synchronization signal, a reference signal (RS), and the like.

Furthermore, a channel including one or more resource elements is defined. In LTE, as the channels of the downlink, a physical downlink control channel (PDCCH), a physical downlink shared channel (PBCH), a physical broadcast channel (PBCH), a physical control format indicator channel (PCFICH), and a physical HARQ indicator channel (PHICH) are defined. On the other hand, as the channel of the uplink, a physical uplink control channel (PUCCH), a physical uplink shared channel (PUSCH), and a physical random access channel (PRACH) are defined.

Note that data is basically transmitted on the PDSCH in the downlink, and transmitted on the PUSCH in the uplink. The number of the REs that can be used for the transmission of the data affects a size of the data to be transmitted and received.

(Reference Signal)

A user equipment (UE) measures reference signal received power (RSRP), reference signal received quality (RSRQ), and the like through reception of a reference signal (RS). In LTE, various types of RSs are defined.

For example, as RSs of a downlink, a cell specific reference signal (CRS), a demodulation reference signal (DMRS), an MBMS single frequency network (MBFSFN) reference signal, a positioning reference signal (PRS), and a channel state information reference signal (CSI-RS) are defined. The CRS is mainly used for channel estimation and measurement for data decoding. The DMRS is mainly used for channel estimation for data decoding. The MBFSFN reference signal is used during multimedia broadcast multicast services (MBMS). The PRS is used for estimation of a position of an UE. The CSI-RS is mainly used for estimating channel quality of the downlink.

In addition, as RSs of downlink, for example, a demodulation reference signal (DMRS) and a sounding reference signal (SRS) are defined. The DMRS is mainly used for channel estimation for data reception, and transmitted in relation to a PDSCH and a PDCCH. The SRS is mainly used for estimating channel quality of an uplink for CQI and scheduling, and has no relation to a PDSCH and a PDCCH.

(Interference Control)

There are various interference control technologies for improving communication quality. Representative interference control qualities include, for example, Inter-Cell Interference Coordination (ICIC), beam forming (BF), and the like. In addition, ICIC includes frequency-domain ICIC and time-domain ICIC.

Frequency-Domain ICIC

Frequency-domain ICIC is an interference control scheme in which different frequency resources are used between communication nodes (between cells). Frequency resources can include, in LTE for example, subcarriers, resource blocks (RBs), subbands (a set of resource blocks), component carriers (CCs) (a set of RBs or subbands), or the like. Specific examples of frequency-domain ICIC will be described below with reference to FIGS. 4 and 5.

Figure 4:
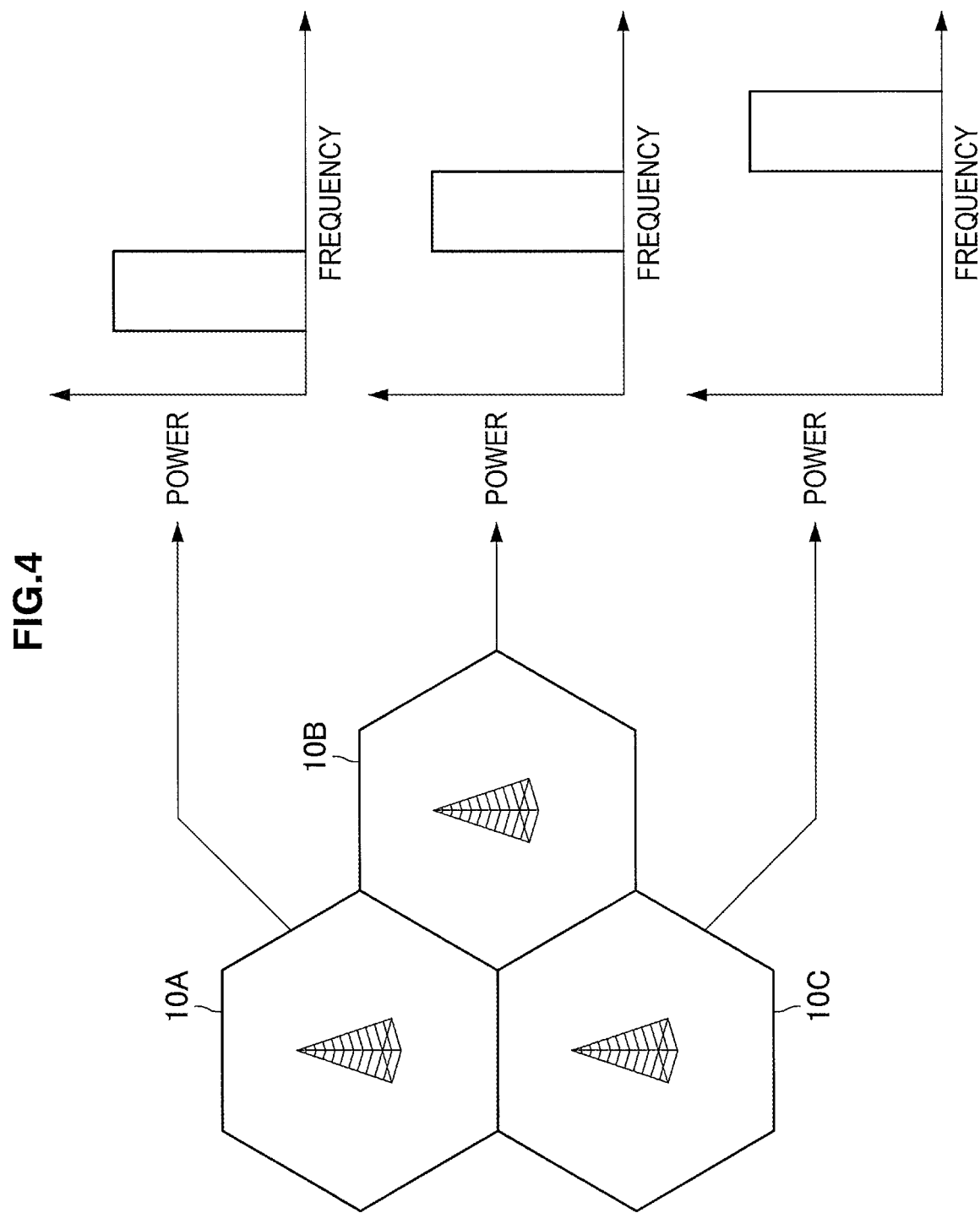
FIG. 4 is an illustrative diagram for describing a first example of frequency-domain ICIC.

FIG. 4 is an illustrative diagram for describing a first example of frequency-domain ICIC. Referring to FIG. 4, three cells 10A, 10B, and 10C are shown. In addition, frequency bands (and power thereof) used in respective cells are shown. For example, available frequency bands are divided into three bands and each of the three bands is used by the corresponding cell 10 as shown in the example. Accordingly, interference between the cells 10 is suppressed.

Figure 5:
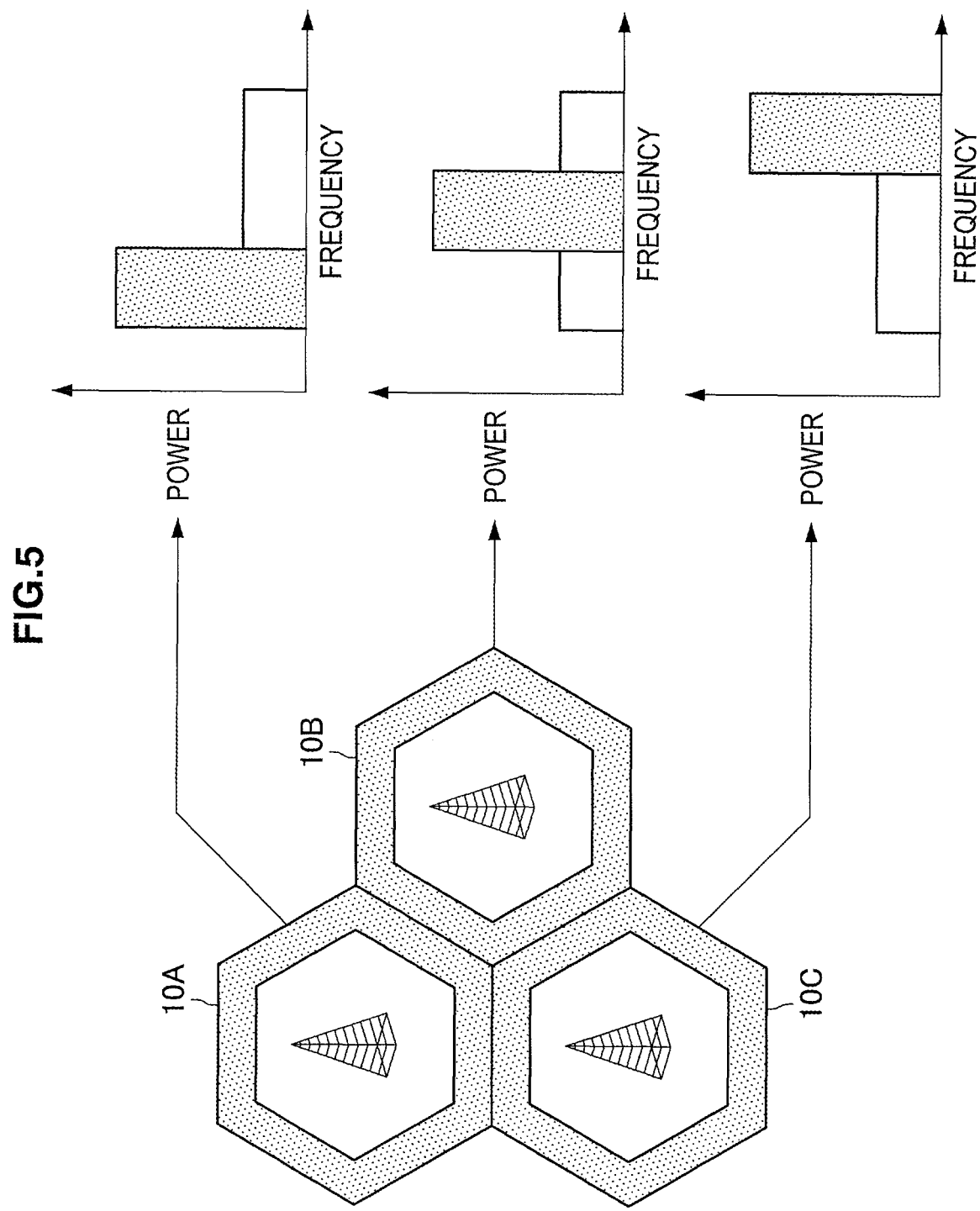
FIG. 5 is an illustrative diagram for describing a second example of frequency-domain ICIC.

FIG. 5 is an illustrative diagram for describing a second example of frequency-domain ICIC. Referring to FIG. 5, the three cells 10A, 10B, and 10C are shown as in FIG. 5. In addition, with respect to each cell, a frequency band (and power thereof) used at the center part of the cell and a frequency band (and power thereof) used around the cell edge are shown. For example, available frequencies are divided into three bands, each of the three bands has a large amount of power in the corresponding cell 10, and as a result, is used over the entire corresponding cell 10. In other words, each of the three bands is also used in the cell edge of the corresponding cell 10. Each of the three bands causes a small amount of power in non-corresponding cells 10, and as a result, is used in the center parts of the non-corresponding cells 10. In other words, each of the three bands is not used in the cell edges of the non-corresponding cells 10. Accordingly, interference is suppressed particularly in the cell edges in which interference easily occurs in the cells 10. ICIC described above is sometimes also referred to as soft frequency reuse (SFR), partial frequency reuse (PFR), or fractional frequency reuse (FFR).

Note that, in the interference control technology described above, influence of a delay on a backhaul line (i.e., delay in transmission and reception of information regarding control) is considered to be extremely trifling as long as a frequency resource used in each cell is not dynamically changed.

Time-Domain ICIC

Time-domain ICIC is an interference control scheme in which different time resources are used between communication nodes (or cells). Time resources include, in LTE for example, time units of systems such as slots, subframes, radio frames, and the like. In LTE, time-domain ICIC gains particular attention in relation to a heterogeneous network (HetNet). Specific examples of time-domain ICIC will be described below with reference to FIGS. 6 and 7.

Figure 6:
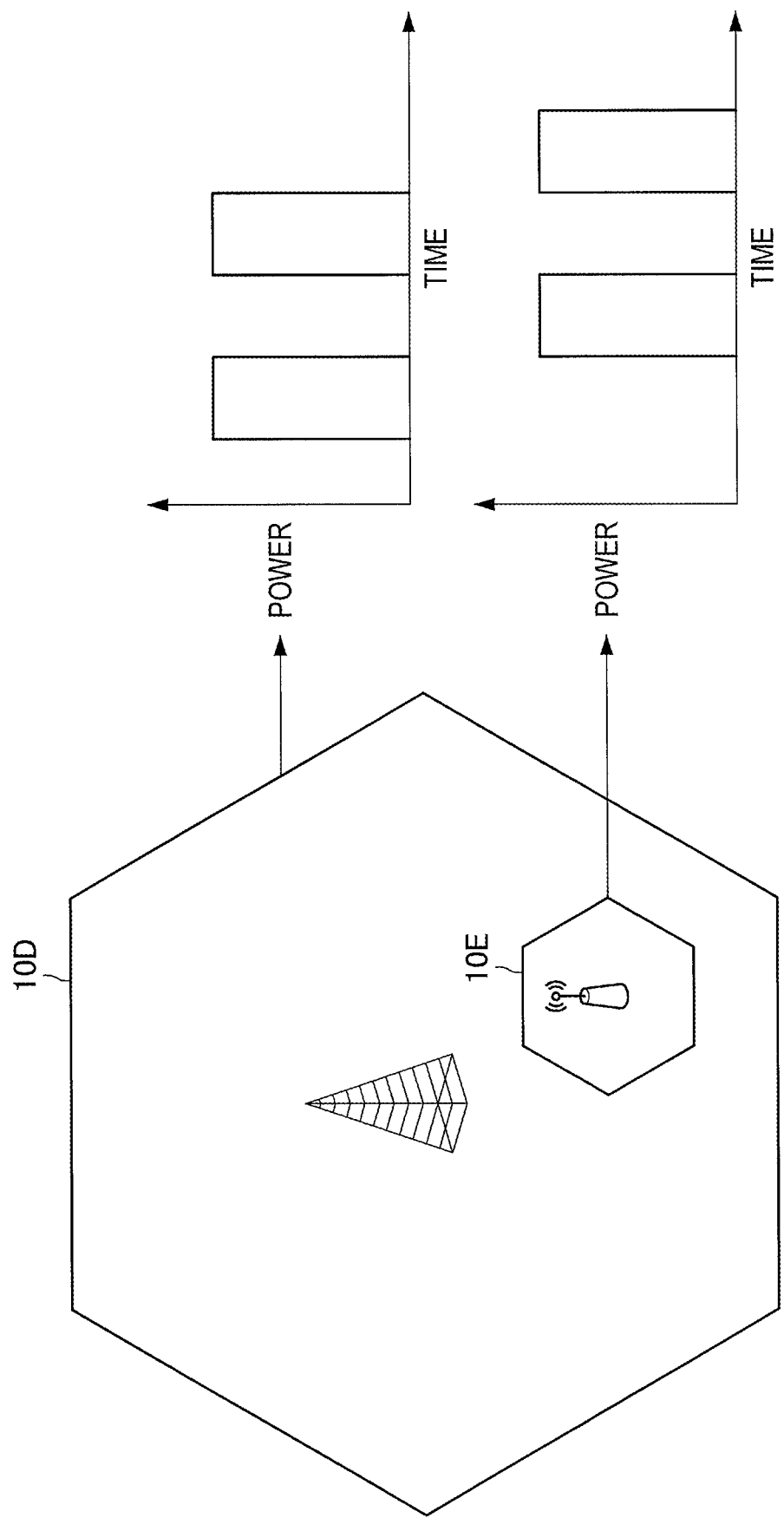
FIG. 6 is an illustrative diagram for describing a first example of time-domain ICIC.

FIG. 6 is an illustrative diagram for describing a first example of time-domain ICIC. Referring to FIG. 6, a cell 10D which is a macrocell and a cell 10E which is a small cell are shown. In addition, relationships between times and transmission powers of the respective cells 10 are shown. In other words, times at which communication is performed in respective cells are shown. As in the example, for example, communication in the cell 10E stops during the time at which communication is performed in the cell 10D, and communication in the cell 10E is performed during the time at which communication stops in the cell 10D. Accordingly, interference between the cells 10 is suppressed. A time at which communication in a macrocell (i.e., the cell 10D) stops as above is also referred to as an Almost Blank Subframe (ABS) in LTE. It should be noted that a time unit during which communication in a macrocell stops is not limited to a subframe unit, and may be another time unit.

Figure 7:
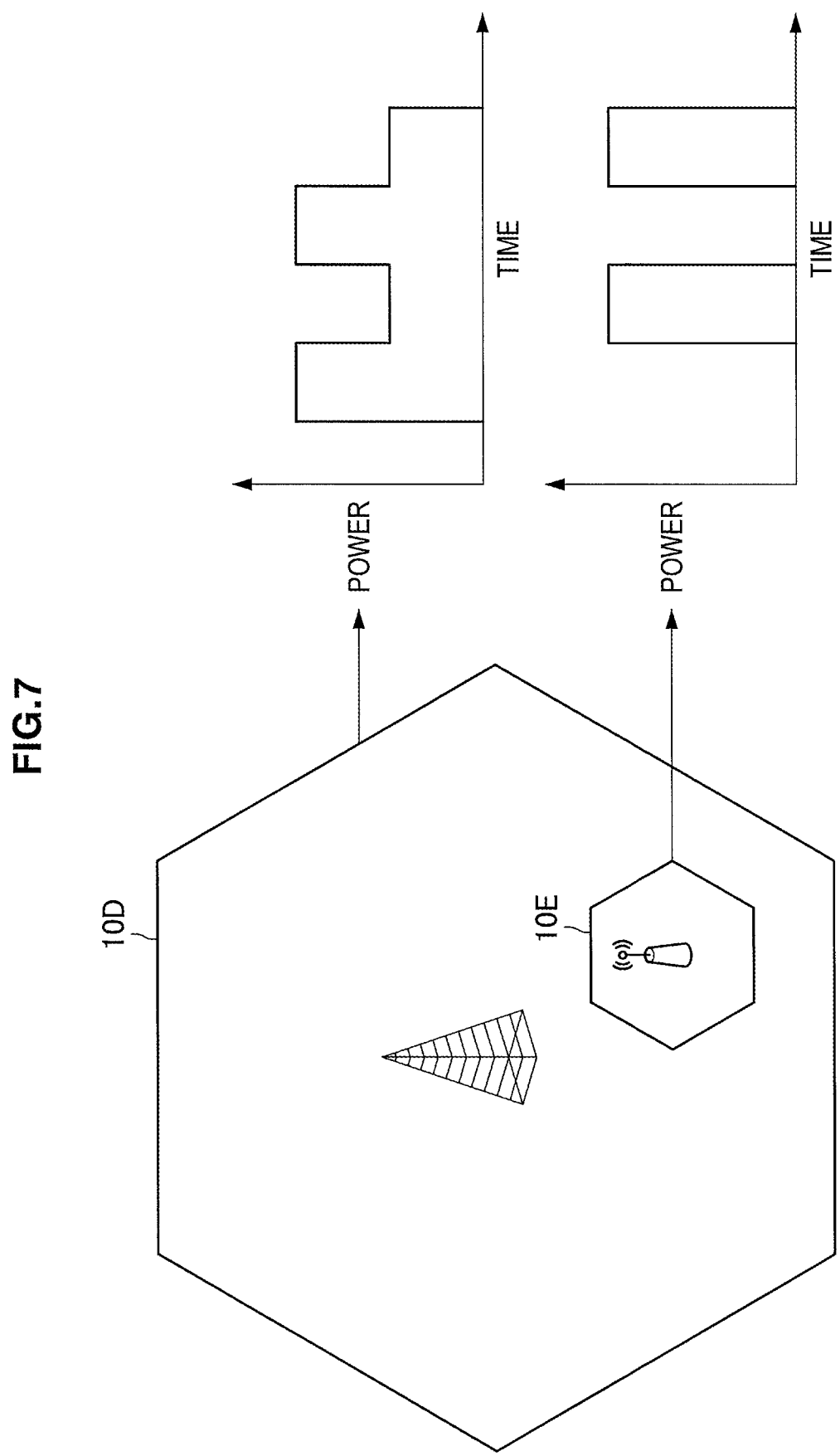
FIG. 7 is an illustrative diagram for describing a second example of time-domain ICIC.

FIG. 7 is an illustrative diagram for describing a second example of time-domain ICIC. Referring to FIG. 7, the cell 10D which is a macrocell and the cell 10E which is a small cell are shown as in FIG. 6. In addition, relationships between times and transmission powers of respective cells 10 are shown. For example, communication in the cell 10E stops during the time at which a large volume of power is used in communication in the cell 10D, and communication in the cell 10E is performed during the time at which a small volume of power is used in communication in the cell 10E. Accordingly, while interference between the cells 10 is suppressed, a waste of a communication capacity of the cell 10D (i.e., macrocell) is suppressed. Such an ABS is called a Reduced Power ABS.

As described above, the concept called ABS has been introduced in LTE in order to realize time-domain ICIC. Simply speaking, there are mainly two techniques as techniques for realizing an ABS. The first technique among the two is to allocate no ABS to any UE. The second technique among the two is to use a special subframe called an MBSFN subframe. Hereinbelow, available radio resources when each of the first and second techniques is adopted will be described with reference to FIGS. 8 and 9.

Figure 8:
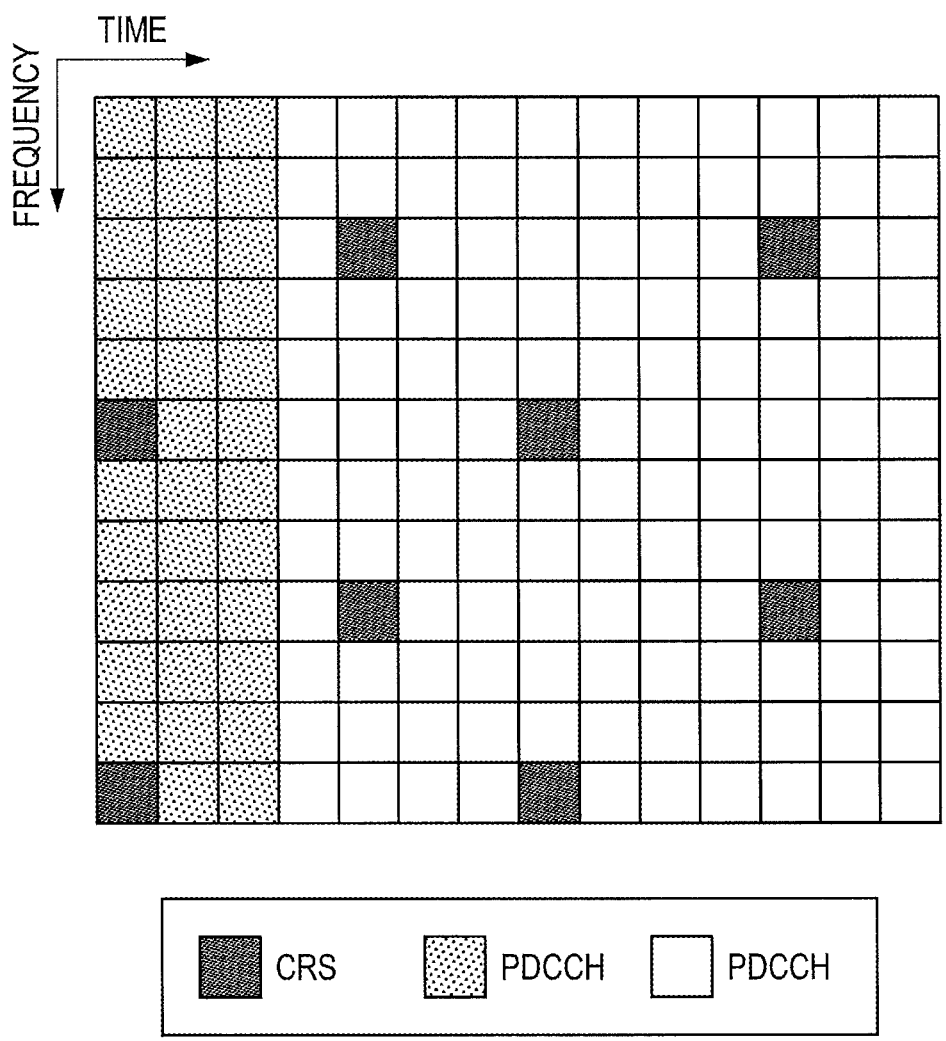
FIG. 8 is an illustrative diagram for describing a first example of radio resources available in an ABS.

FIG. 8 is an illustrative diagram for describing a first example of radio resources available in an ABS. Referring to FIG. 8, two RBs are shown in one subframe. In this example, the first technique has been employed. When the first technique is employed, while transmission of signals on PDSCHs stops within the subframe, signals on PDCCH and CRSs are transmitted. In other words, in an ABS, radio resources on which no CRS is transmitted among radio resources in the period of the PDSCHs are available.

Figure 9:
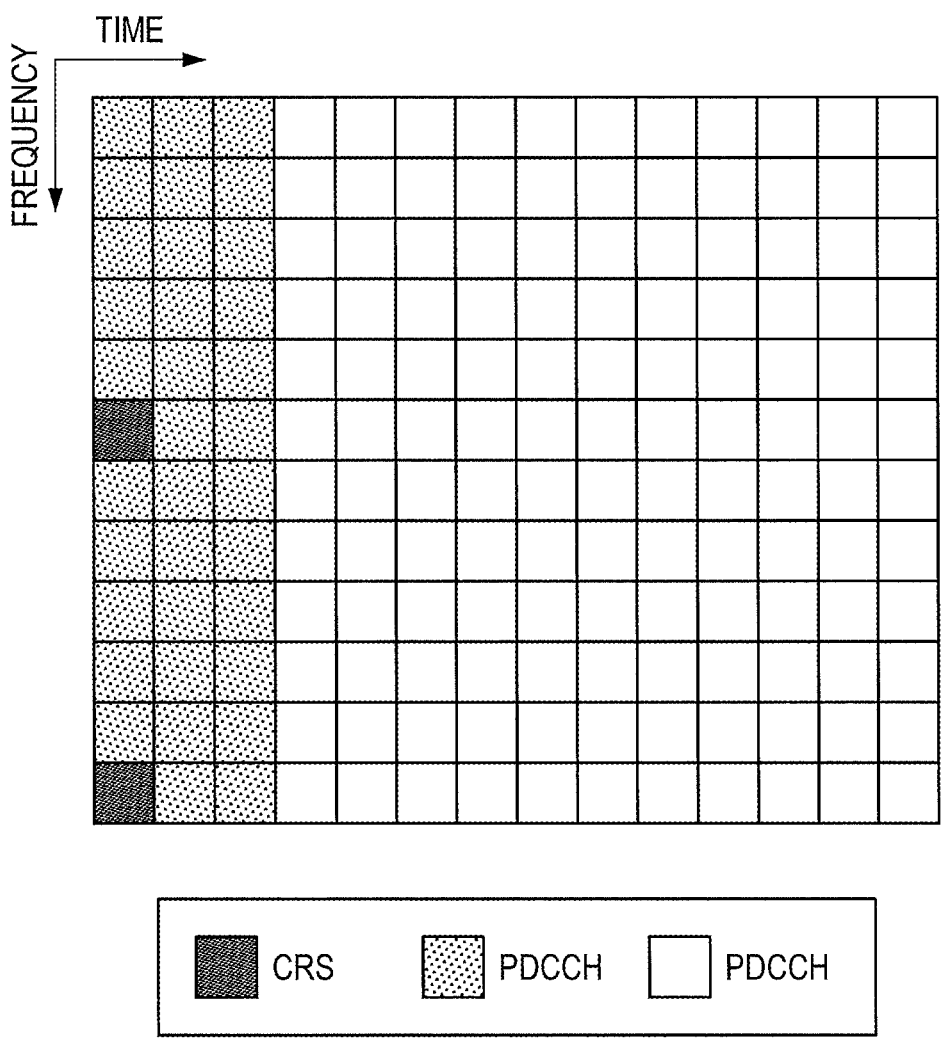
FIG. 9 is an illustrative diagram for describing a second example of radio resources available in an ABS.

FIG. 9 is an illustrative diagram for describing a second example of radio resources available in an ABS. Referring to FIG. 9, two RBs are shown in one subframe. In this example, the second technique has been employed. When the second technique is employed, while a signal on a physical MBMS channel (PMCH) and a CRS in a period of the PMCH stop, a signal on PDCCHs and CRSs in the period of the PDCCHs are transmitted. In other words, all radio resources in the period of PDSCHs are available.

It should be noted that, in time-domain ICIC, it is necessary to share a timing of an ABS between cells. Thus, influence of a delay on a backhaul line (i.e., delay in transmission and reception of information regarding control) is considered to be greater than in frequency-domain ICIC described above. By using some consecutive subframes as ABSs, however, influence at timings other than a switching timing can also be lessened.

Beam Forming (BF)

Beam forming (BF) is a technology for controlling directivity of radio waves by adjusting the phase of each of a plurality of antenna elements of a communication node which has the antenna elements. The communication node can also dynamically change directivity of radio waves. There are several types of BF.

For example, in the first type of BF, a directivity of a radio wave is fixed. In other words, a beam formed by a communication node is fixed. Through this type of BF, for example, a communication area (for example, a cell) of a communication node (for example, a base station) can be set to a desired area.

In addition, in the second type of BF, for example, a beam toward a communication partner (for example, a terminal device) of a communication node (for example, a base station) is formed. Through this type of BF, for example, communication quality can be improved. With this type of BF, time resources and/or a direction of a beam for each time resource can be controlled.

In addition, in the third type of BF, for example, a beam for reducing interference with another communication node (for example, a neighboring base station) in communication is formed. In other words, a beam is formed such that a direction of the other communication node and/or of a communication partner of the other communication node is at a null point. This type of BF is also referred to as null steering. With this type of BF, interference with another communication node in communication is suppressed. As a result, communication quality of another cell is improved. Also with this type of BF, time resources and/or a direction of a beam for each time resource can be controlled.

It should be noted that influence of a delay on a backhaul line (i.e., delay in transmission and reception of information regarding control) is considered to be different according to the types of BF. For example, influence of a delay on a backhaul line in the first and the second types of BF is considered to be not large. On the other hand, influence of a delay on a backhaul line in the third type of BF is considered to possibly be large because a direction of a beam depends on a scheduling result of another cell, a position of a terminal device in another cell, and the like.

(Coordinated Multi-Point (CoMP) Transmission and Reception)

As a technology for improving communication quality, there is coordinated multi-point transmission and reception. CoMP transmission and reception is a technique in which a plurality of coordinated communication nodes (for example, base stations) transmit a signal to one communication node (for example, a terminal device).

CoMP transmission and reception includes individual technologies such as Joint Transmission (JT), Dynamic Point Selection (DPS), and the like. In JT, a plurality of communication nodes simultaneously transmit the same signal to one communication node. In addition, in DPS, a communication node dynamically selected from a plurality of communication nodes transmits a signal to one communication node.

In CoMP transmission and reception, communication is controlled so that communication quality (for example, a communication rate, a signal-to-noise ratio (SINR), and the like) is improved. When JT is performed, for example, space-time coding over a plurality of communication nodes for gaining diversity of transmission, use of a transmission weight according to a channel state in each of a plurality of communication nodes, spatial multiplexing, and the like can be performed. In addition, when DPS is performed, a communication node which will perform transmission can be selected based on CSIs of a plurality of communication nodes. These operations can be said to be diversity of transmission and reception, spatial multiplexing, and selection of an antenna when MIMO antennas are divided and present in a plurality of communication nodes. It should be noted that the plurality of communication nodes use the same frequency resource and time resource.

For example, there are several examples of an operation of a communication system for CoMP transmission and reception. The examples of operations of a communication system for CoMP transmission and reception will be described with reference to FIGS. 10 and 11.

Figure 10:
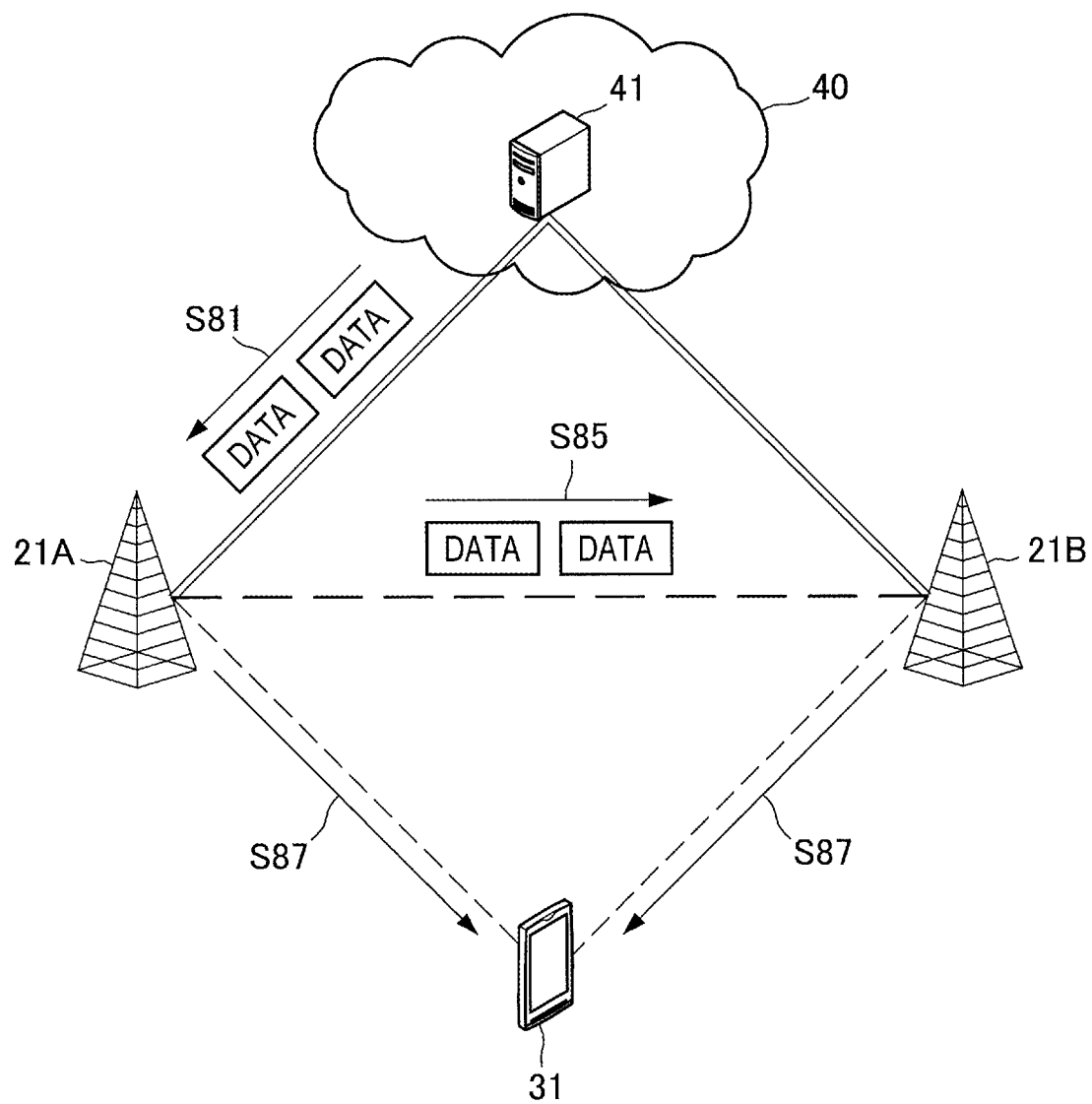
FIG. 10 is an illustrative diagram for describing a first example of an operation of a communication system for CoMP transmission and reception.

FIG. 10 is an illustrative diagram for describing the first example of the operation of the communication system for CoMP transmission and reception. Referring to FIG. 10, two evolved Node Bs (eNBs) 21A and 21B, a user equipment (UE) 31, and a mobility management entity (MME) 41 are shown. The MME 41 is positioned in an Evolved Packet Core (EPC) 40 which is a core network. In this example, the eNB 21A and eNB 21B perform CoMP transmission and reception to and from the UE 31, and the CoMP transmission and reception is controlled by the eNB 21A and/or the eNB 21B. First, the eNB 21A receives data from the EPC 40 (S81), decides to perform CoMP (S83), and transmits information regarding CoMP transmission and reception (control information and data) to and from the eNB 21B via an X2 interface (S85). Thereby, the eNB 21A and the eNB 21B perform CoMP transmission and reception to and from the UE 31 (S87).

Figure 11:
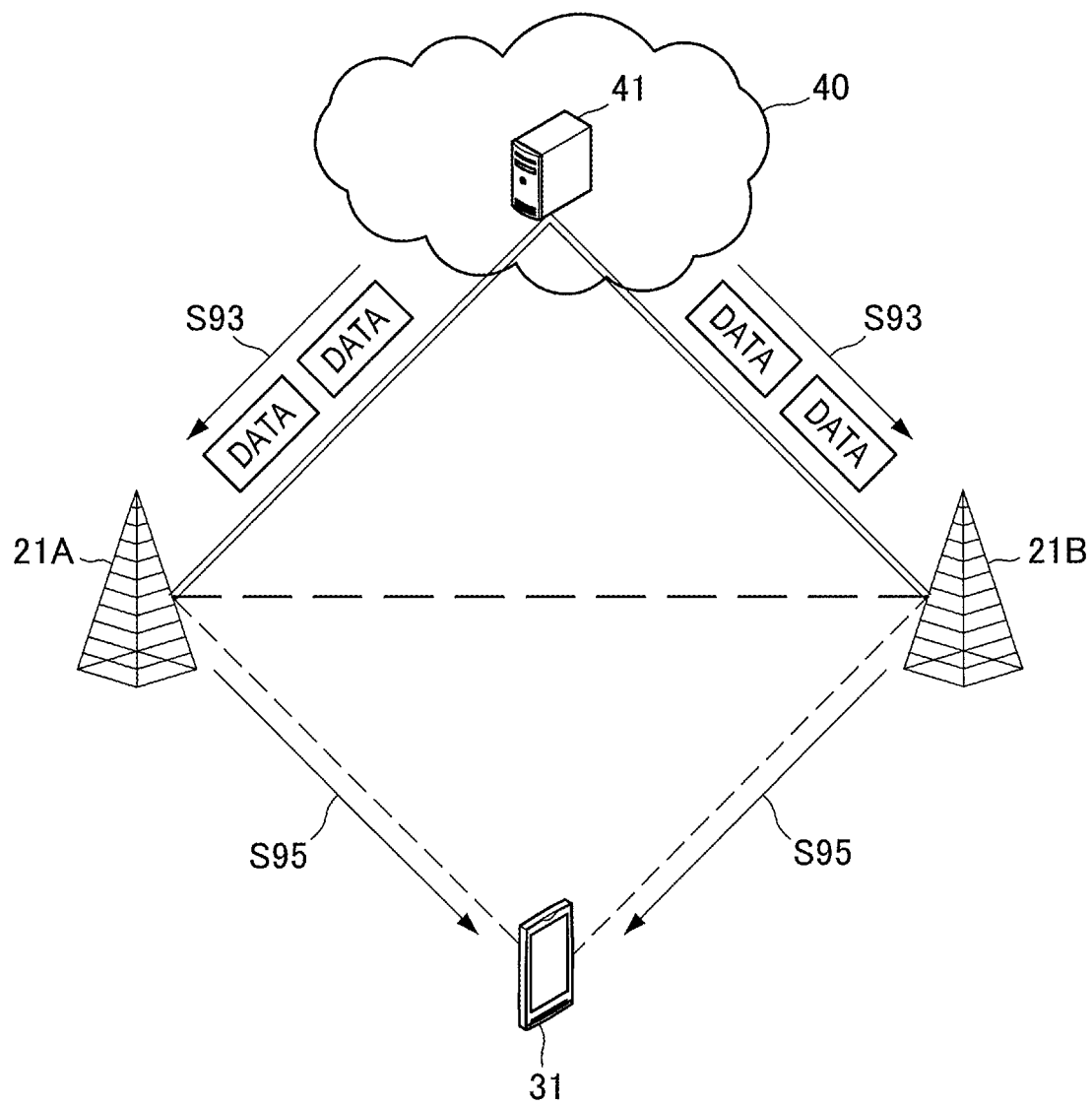
FIG. 11 is an illustrative diagram for describing a second example of an operation of a communication system for CoMP transmission and reception.

FIG. 11 is an illustrative diagram for describing the second example of the operation of the communication system for CoMP transmission and reception. Referring to FIG. 11, the two eNBs 21A and 21B, the UE 31, and the MME 41 are shown as in FIG. 10. In this example, the eNB 21A and eNB 21B perform CoMP transmission and reception to and from the UE 31, and control over CoMP transmission and reception is performed by the MME. First, the MME 41 decides to perform CoMP transmission and reception (and a radio resource with which CoMP transmission and reception is performed) (S91), and transmits information regarding CoMP transmission and reception (control information and data) to the eNB 21A and eNB 21B via an S1 interface (S93). Then, the eNB 21A and eNB 21B perform CoMP transmission and reception to and from the UE 31 (S95).

CoMP transmission and reception is not limited to a plurality of base stations (for example, eNBs), and can be performed by different types of communication nodes. CoMP transmission and reception may be performed by, for example, two or more of base stations (including a base station of a macrocell, and a base station in a small cell), and remote radio heads (RRHs), relay stations, and mater terminals of a localized network (LN).

It should be noted that, in CoMP transmission and reception, transmission data and control information (CSI, transmission weights, information on radio resources, and the like) are shared between a plurality of communication nodes via a backhaul line. In addition, in CoMP transmission and reception, influence of a delay on a backhaul line (i.e., a delay in transmission and reception of information regarding control (transmission data and control information)) is considered to be greater than in the above-described interference control technologies.

(Backhaul Line)

A communication node (for example, a base station) of a communication system communicates with another communication nodes through a backhaul line. Although a backhaul line appears to directly connect communication nodes to each other as a logical path, it can connect communication nodes through another communication node as a physical path. In addition, a backhaul line can be implemented in various forms in view of a usage aspect and physical medium. Hereinbelow, specific examples of these points in LTE will be described with reference to FIG. 12.

Figure 12:
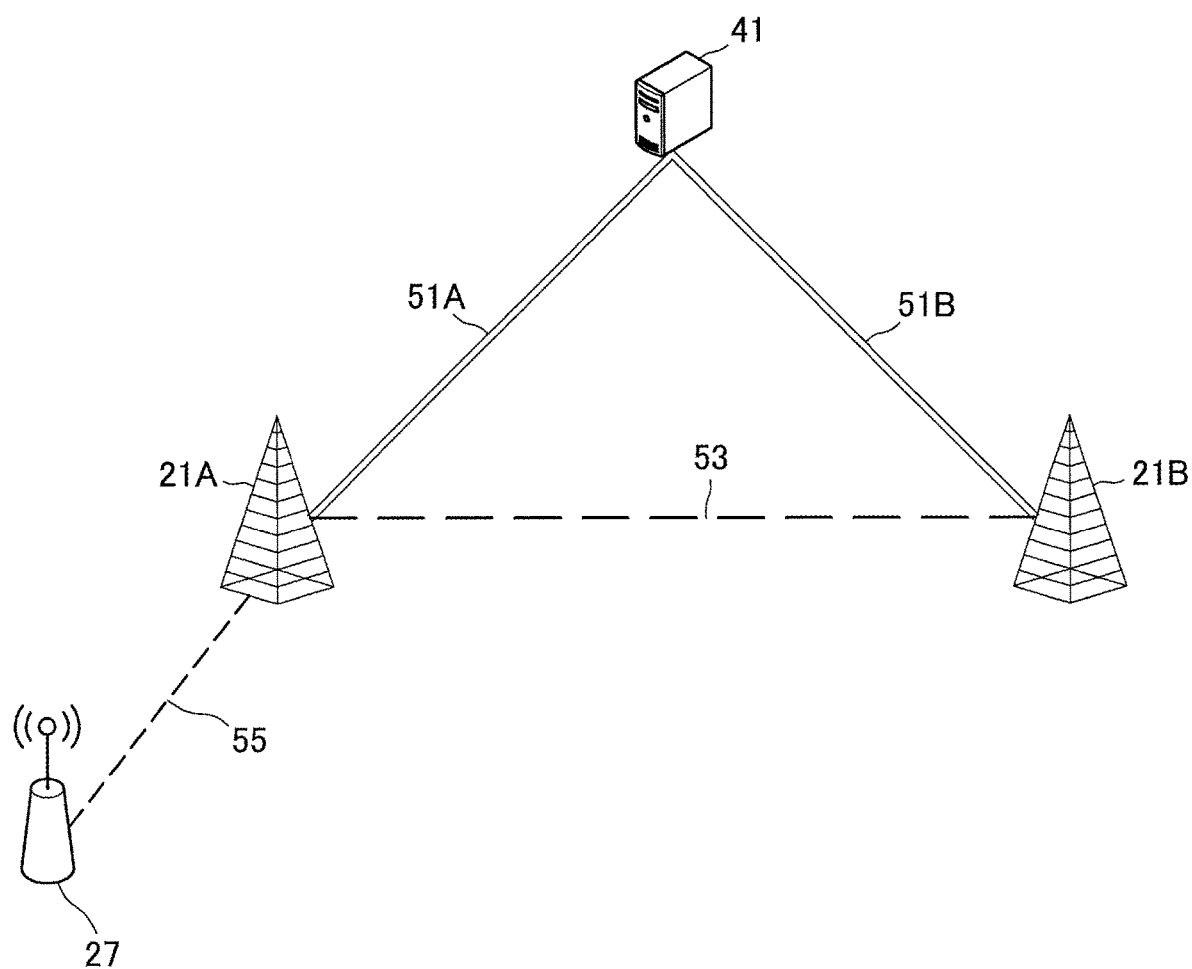
FIG. 12 is an illustrative diagram for describing specific examples of backhaul lines in LTE.

FIG. 12 is an illustrative diagram for describing specific examples of backhaul lines in LTE. Referring to FIG. 12, the eNBs 21A and 21B and the MME 41 are shown. In addition, backhaul lines 51 between the eNBs 21 and the core network node (for example, the MME 41) and another backhaul line 53 between the eNB 21A and eNB 21B are shown. The backhaul lines 51 are called S1 interfaces as logical paths between the core network node and the eNBs, and the backhaul line 53 is called an X2 interface as a logical path between the eNBs.

Firstly, the backhaul lines 51 and the backhaul line 53 also appear to be lines directly connecting communication nodes as a logical path, but can be a line passing another communication node as a physical path. As the other communication node, for example, there are a router, a switch, and the like. In this manner, communication quality (for example, a delay in communication) of a physical path can change according to its way of passing a communication node.

Secondly, the backhaul lines 51 and the backhaul line 53 may be dedicated lines or shared lines (public lines) from the perspective of a usage aspect. For example, dedicated lines are prepared by an operator of a communication system for eNBs of a macrocell, eNBs of a picocell, and the like. On the other hand, for example, public lines (for example, an ADSL line, a CATV line, an optical line, and the like) are used by eNBs of femtocells installed in houses and offices. In addition, public lines can be used by eNBs of a macrocell, eNBs of picocells, and the like, for example, to reduce cost. Generally, while stability of dedicated lines in terms of communication quality is high, stability of shared lines (public lines) in terms of communication quality is low.

Thirdly, the backhaul lines 51 and the backhaul line 53 may include wired lines or wireless lines from the perspective of physical media. For example, for the purpose of reducing a cost for installing a wired line, such as installing an eNB at a place at which securing a wired line is not possible, a wireless line, instead of a wired line, is included in the physical path. In addition, a master terminal of a localized network (LN) can use a wireless line as a backhaul line. Generally, stability of wired lines in terms of communication quality is high, while stability of wireless lines (public lines) in terms of communication quality is low.

Now, examples of the technologies and quality of backhaul lines will be described using FIGS. 13 and 14. FIGS. 13 and 14 are illustrative diagrams for describing first and second examples of types and quality of backhaul technologies. The example shown in FIG. 13 describes Table 6.1-1 of TR36.932 of 3GPP. On the other hand, the example shown in FIG. 14 describes Table 6.1-2 of TR36.932 of 3GPP. Latency and throughput are different according to the technologies of backhaul lines as shown in the tables.

(Technical Problem)

As described above, in control (interference control, CoMP transmission and reception, and the like) over a plurality of communication nodes (for example, a plurality of base stations), information regarding control (control information, data transmitted according to control, and the like) is transmitted through a backhaul line. In technologies of the related art, however, delays in transmission and reception on such a backhaul line (or irregular delays among backhaul lines) are not considered. For this reason, there is a possibility of a time at which information regarding control is to be acquired significantly deviating between two nodes among a plurality of communication nodes. As a result, there is concern of control by the communication nodes not being performed at a proper time.

Furthermore, there is a high possibility in future communication systems of introduction of the form of operating HetNet for improvement in communication capacities. In other words, there is a high possibility of increasing introduction of eNBs for picocells, femtocells, and the like. For this reason, it is expected in communication systems that backhauls lines that exhibit various levels of communication quality will be mixed. When control over a plurality of communication nodes (interference control, CoMP transmission and reception, and the like) is performed, in such a communication situation, it is easily considered that the control is not performed at a proper timing due to the quality of the backhaul lines, unlike a situation of the past in which a dedicated line is used as a backhaul line.

Therefore, an embodiment of the present disclosure enables control over a plurality of communication nodes to be performed properly.

2. Schematic Configuration of Communication System According to Embodiment

Figure 15:
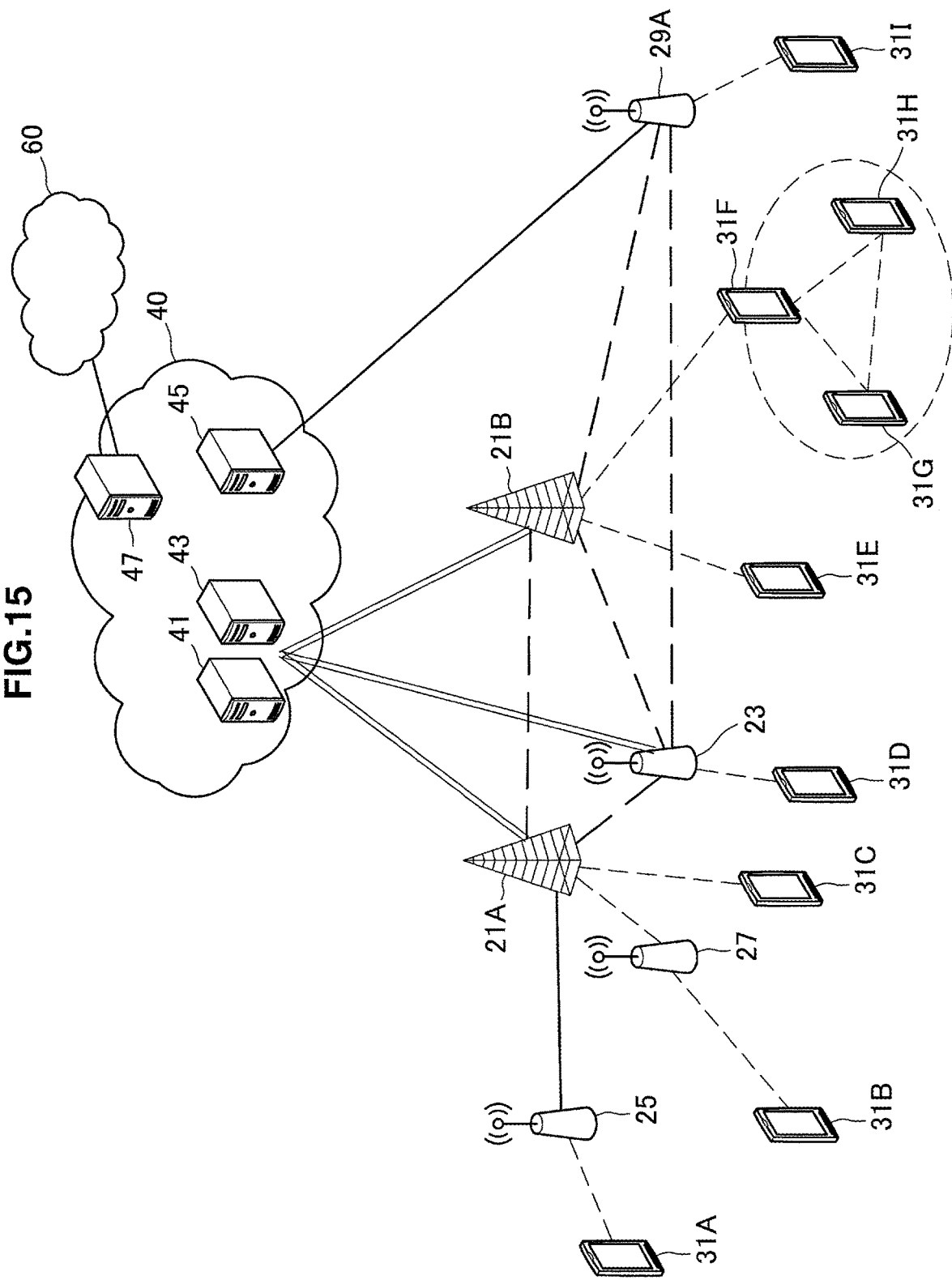
FIG. 15 is an illustrative diagram for describing an example of a schematic configuration of a communication system according to an embodiment of the present disclosure.

Next, a schematic configuration of a communication system 1 according to an embodiment of the present disclosure will be described with reference to FIG. 15. FIG. 15 is an illustrative diagram for describing an example of the schematic configuration of the communication system 1 according to the present embodiment. Referring to FIG. 15, the communication system 1 includes an Evolved Universal Terrestrial Radio Access Network (E-UTRAN) which is a radio access network and the EPC 40 which is a core network. In addition, the communication system 1 includes macro eNBs (MeNBs) 21, a pico eNB (PeNB) 23, an RRH 25, a relay node (RN) 27, a home eNB (HeNB) 29, and UEs 31 as radio access network nodes. In addition, the communication system 1 includes an MME 41, a serving gateway (S-GW) 43, an HeNB gateway (HeNB-GW) 45, and a packet data network gateway (PDN-GW) 47 as core network nodes. In this example, the communication system 1 is a system based on LTE, LTE-Advanced, or a communication system equivalent thereto.

The MeNBs 21 perform radio communication with the UEs 31 positioned within the macrocell. The PeNB 23 performs radio communication with the UEs 31 positioned within the picocell. The picocell, for example, is partly or entirely overlapped by the macrocell. In addition, the MeNBs 21 and the PeNB 23 communicate with a core network node (MME 41 or S-GW 43) through a backhaul lines. The backhaul lines are called the S1 interface as a logical path. In addition, the two MeNBs 21, the two PeNBs 23, or the MeNBs 21 and the PeNBs 23 communicate with each other through backhaul lines. The backhaul lines are called an X2 interface as a logical path. Each of the backhaul lines includes, as a physical path, one or more physical lines. In addition, the one or more physical lines may only be wired lines or include a wireless line.

The RRH 25 includes wireless parts among the eNBs (for example, an antenna and a radio frequency (RF) circuit), and performs radio communication with the UEs 31 positioned within a cell. The RRH 25 is installed separately from other parts of the eNBs. As an example, the RRH 25 is a radio part of the pico eNB, and other parts of the pico eNB are implemented in a device of the macro eNB 21A. In this case, the RRH 25 communicates with the macro eNB 21A through a backhaul line. This backhaul line is any physical wired line (for example, an optical fiber cable).

The RN 27 performs relaying between an eNB and the UEs 31. In other words, the RN 27 performs radio communication with the UEs 31 positioned within the communicable range of the RN 27. In addition, the RN 27 communicates with an eNB through a backhaul line. In this example, the eNB is the MeNB 21A. In addition, the backhaul line is called a Un interface as a logical path, and is a wireless line physically.

The HeNB 29 is a compact eNB installed in a house, an office, or the like. The HeNB 29 is also called a femtocell eNB. The HeNB 29 performs radio communication with an UE 31 positioned within a home cell (or a femtocell). The HeNB 29 communicates with a core network node (HeNB-GW 45) through a backhaul line. In addition, the HeNB 29 communicates with the MeNBs 21, the PeNB 23, or another HeNB 29 through the backhaul line. Such a backhaul line includes, as physical paths, one or more physical lines. In addition, the one or more physical lines may only be wired lines or include a wireless line.

The UEs 31 communicate with communication nodes such as the MeNBs 21, the PeNB 23, the RRH 25, the RN 27, the HeNB 29, and the like. The UEs 31, for example, can simultaneously communicate with a plurality of communication nodes. In addition, a localized network (LN) for device-to-device (D2D) communication is formed by, for example, a plurality of UEs 31. In this case, a master terminal of the LN (i.e., any of the plurality of UEs 31) controls radio communication on the LN. In addition, the master terminal communicates with the MeNBs 21, the PeNB 23, the RRH 25, the RN 27, or the HeNB 29 through a backhaul line for the LN. The backhaul line is called a Uu interface as a logical path, and may be a wireless line or a wired line physically.

It should be noted that the PDN-GW 47 enables connection with an external network 60 (for example, the Internet).

Entity Relating to Present Embodiment

Particularly in the present embodiment, the communication system 1 includes a control entity 100. The control entity 100 controls application of a control scheme to communication nodes. In addition, the communication system 1, for example, includes an execution entity 200 in addition to the control entity 100. The execution entity 200 executes control in the control scheme to be applied, and/or acquires and provides quality-related information regarding quality of a backhaul line.

The control entity 100 may be mounted in any of the communication nodes mentioned above included in the communication system 1, or may be mounted in an independent device from the above-described communication nodes. The control entity 100, for example, is mounted in any core network node (for example, the MME 41). The execution entity 200 may be mounted in each of the communication nodes included in the communication system 1, or may be mounted in some communication nodes. As an example, the execution entity 200 can be mounted in the radio access network nodes (the MeNBs 21, the PeNB 23, the RRH 25, the RN 27, and the HeNB 29).

3. Configuration of Each Entity

Figure 16:
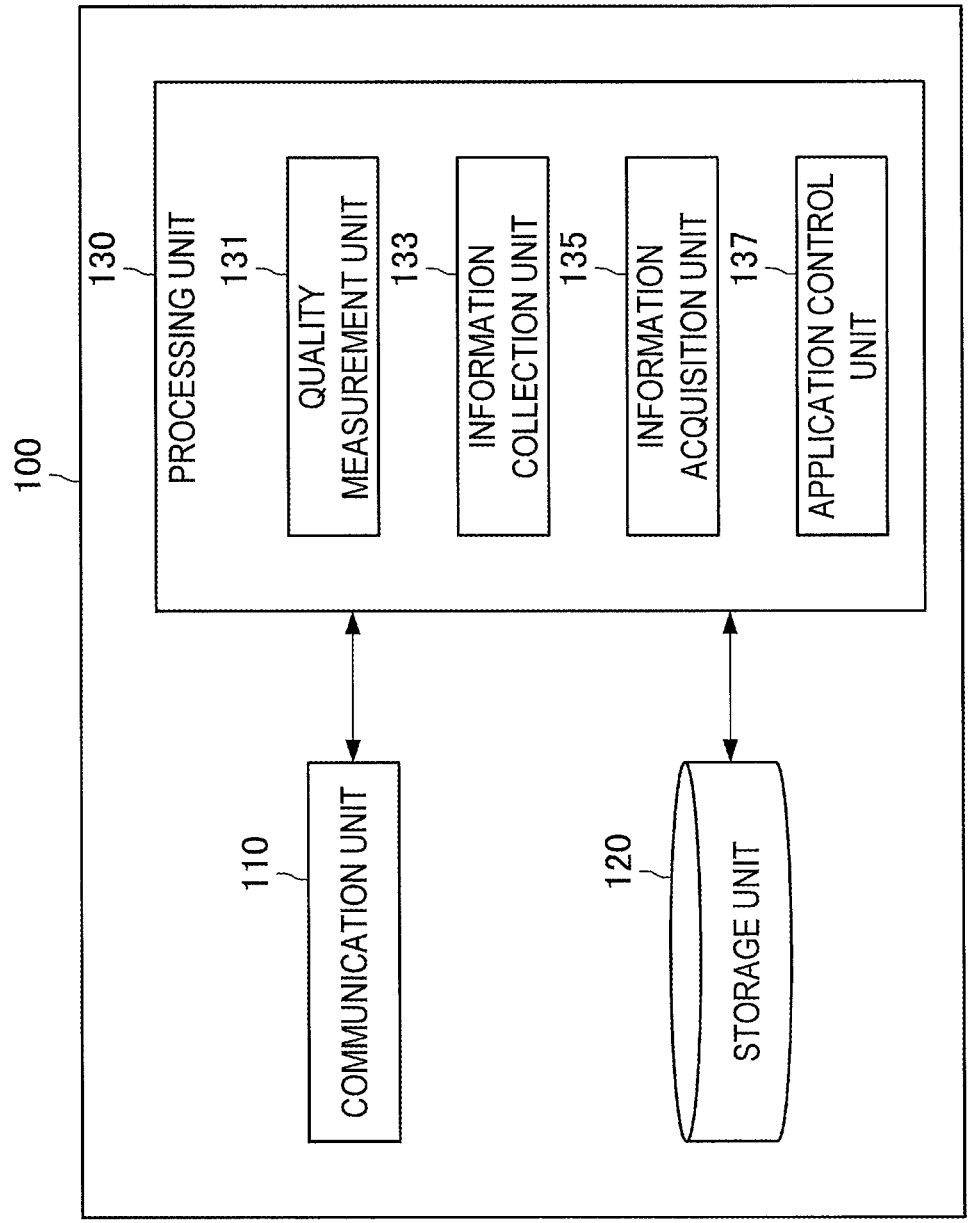
FIG. 16 illustrates an example of a configuration of a control entity according to an embodiment.
Figure 17:
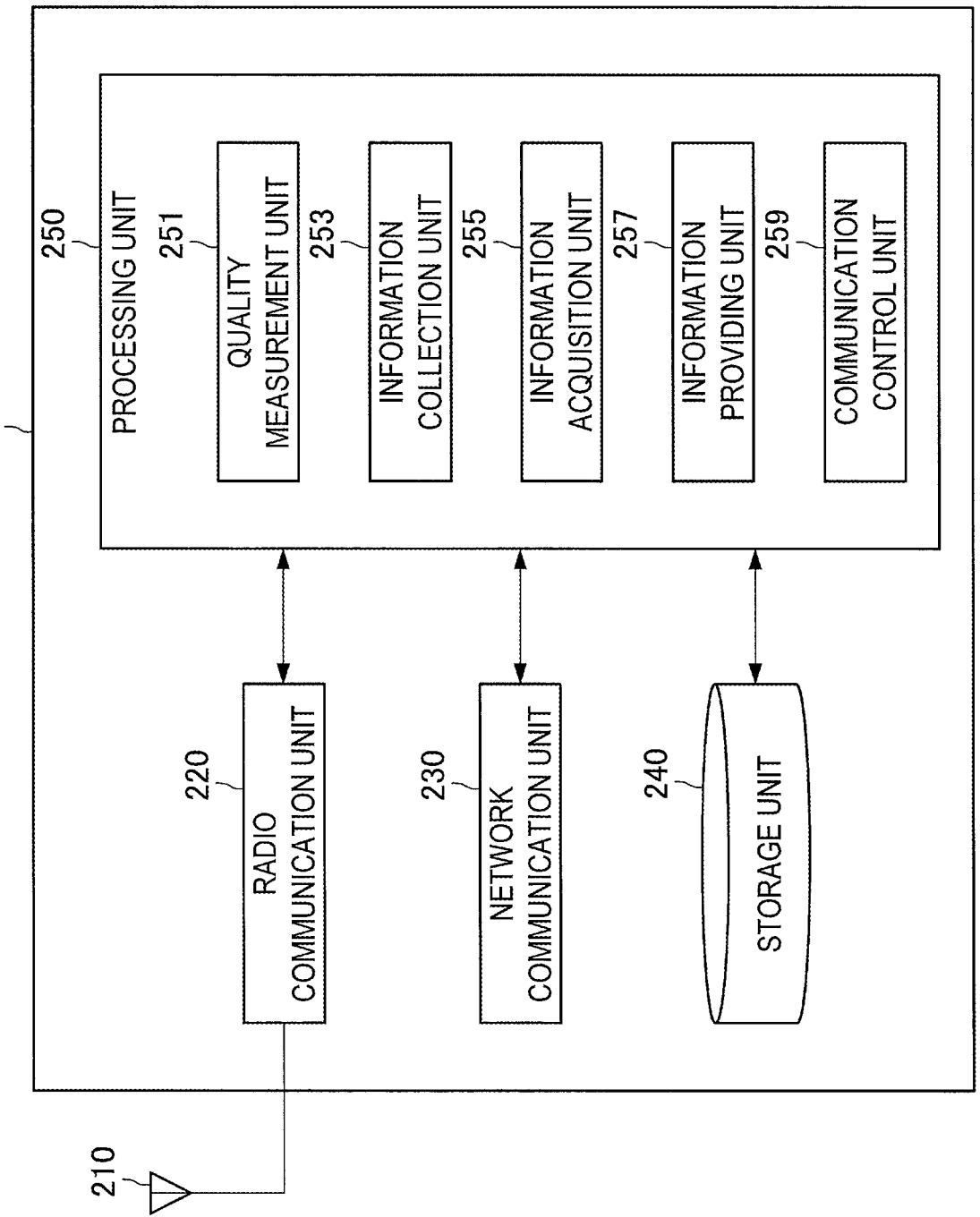
FIG. 17 is a block diagram showing an example of a configuration of an execution entity according to an embodiment.

Next, configurations of the control entity 100 and the execution entity 200 according to the present embodiment will be described with reference to FIGS. 16 and 17.

<3.1. Configuration of Control Entity>

First, an example of the configuration of the control entity 100 according to the present embodiment will be described with reference to FIG. 16. FIG. 16 is a block diagram showing the example of the configuration of the control entity 100 according to the present embodiment. Referring to FIG. 16, the control entity 100 includes a communication unit 110, a storage unit 120, and a processing unit 130. As an example, the control entity 100 is mounted in the core network nodes (for example, the MME 41).

(Communication Unit 110)

The communication unit 110 communicates with other communication nodes. The communication unit 110 communicates with other communication nodes through, for example, a backhaul line. The other communication nodes include, for example, the MeNBs 21, the PeNB 23, the RRH 25, the RN 27, the HeNB 29, and/or the core network node.

(Storage Unit 120)

The storage unit 120 temporarily or permanently stores programs and data for operations of the control entity 100. The storage unit 120 stores, for example, quality-related information regarding quality of a backhaul line.

(Processing Unit 130)

The processing unit 130 provides various functions of the control entity 100. The processing unit 130 includes a quality measurement unit 131, an information collection unit 133, an information acquisition unit 135, and an application control unit 137.

(Quality Measurement Unit 131)

The quality measurement unit 131 measures quality of a backhaul line. For example, the quality measurement unit 131 measures quality of a backhaul line through a measurement procedure of the quality of a backhaul line, and generates quality-related information regarding the quality of the backhaul line (hereinafter referred to as "backhaul quality information"). The measurement procedure will be described below.

In addition, for example, the quality measurement unit 131 causes the generated backhaul quality information to be stored in the storage unit 120.

(Information Collection Unit 133)

The information collection unit 133 collects backhaul quality information from another device.

For example, the information collection unit 133 acquires backhaul quality information through a collection procedure of quality-related information regarding quality of a backhaul line (i.e., the backhaul quality information). The collection procedure will be described below.

In addition, for example, the information collection unit 133 causes the collected backhaul quality information to be stored in the storage unit 120.

(Information Acquisition Unit 135)

The information acquisition unit 135 acquires the quality-related information regarding the quality of the backhaul line (i.e., backhaul quality information) to be used for providing control-related information regarding control in a radio communication control scheme over a communication node to which the control scheme is applied.

Backhaul Quality Information to be Acquired

The above-described backhaul quality information is generated through, for example, the measurement procedure of the quality of the backhaul line. Then, the information acquisition unit 135 acquires the generated backhaul quality information.

In addition, the backhaul quality information is collected from another device through, for example, the collection procedure with regard to the backhaul quality information. Then, the information acquisition unit 135 acquires the collected backhaul quality information. To be specific, for example, the quality measurement unit 131 generates the backhaul quality information through the measurement procedure and causes the information to be stored in the storage unit 120, or the information collection unit 133 collects the backhaul quality information generated by another communication node through the measurement procedure and causes the information to be stored in the storage unit 120. Then, the information acquisition unit 135 acquires the backhaul quality information.

It should be noted that, even when the control entity 100 does not have backhaul quality information, the control entity can use backhaul quality information possessed by another device due to such collection through the collection procedure.

Control Scheme

The above-described control scheme is a scheme for improving a communication capacity of the communication system which includes the communication nodes.

As a first example, the control scheme includes a scheme for suppressing interference in radio communication in which two or more communication nodes respectively participate (hereinafter referred to as an "interference control scheme"). The interference control scheme includes, for example, frequency-domain ICIC, time-domain ICIC, BF (null steering), and the like.

As a second example, the control scheme includes CoMP transmission and reception.

Communication Node to which Control Scheme is Applied

The communication node to which the control scheme is applied is, for example, a base station, a relay station, or a terminal device which controls radio communication on a localized network formed by a plurality of terminal devices.

In the present embodiment, the communication node is the execution entity 200 (or a communication node in which the execution entity 200 is mounted) which executes control in the control scheme. To be more specific, for example, the communication node is any of the MeNBs 21, the PeNB 23, the RRH 25, the RN 27, the HeNB 29, and/or the core network node.

Control-Related Information and Backhaul Line

The control-related information regarding control in the control scheme includes, for example, control information for control in the control scheme, and/or data to be transmitted under the control.

Case of Interference Control

To be specific, when the control scheme is the interference control scheme, for example, the control-related information includes control information for interference control (for example, a control command).

As an example, the control-related information (control information) is provided to the execution entity 200 (for example, a MeNB 21) by the control entity 100 (for example, the MME 41). In this case, a backhaul line to be used for providing the control-related information (control information) is a backhaul line between the control entity 100 and the execution entity 200 (for example, the S1 interface).

Case of CoMP Transmission and Reception

In addition, when the control scheme is CoMP transmission and reception, for example, the control-related information includes data to be transmitted in CoMP transmission and reception.

As an example, the data to be transmitted in CoMP transmission and reception is provided by one of two execution entities 200 (for example, the MeNB 21) involved in the CoMP transmission and reception to the other. In this case, a backhaul line to be used for providing the control-related information is a backhaul line between the two execution entities 200 (for example, the X2 interface).

As another example, the data to be transmitted in CoMP transmission and reception may be provided to the execution entity 200 (for example, a MeNB 21) involved in the CoMP transmission and reception by the control entity 100 (for example, the MME 41). In this case, a backhaul line to be used for providing the control-related information may be, for example, the backhaul line between the control entity 100 and the execution entity 200 (for example, the S1 interface).

It should be noted that the control-related information may include control information for CoMP transmission and reception (for example, a control command), instead of the data to be transmitted in the CoMP transmission and reception (or in addition to the data to be transmitted in the CoMP transmission and reception). In this case, a backhaul line to be used for providing the control-related information may be the backhaul line between the control entity 100 and the execution entity 200 (for example, the S1 interface).

Quality of Backhaul Line

In addition, the quality of the backhaul line is, for example, delay time on the backhaul line. In this case, the backhaul quality information is information regarding delay time on the backhaul line.

It should be noted that the quality of the backhaul line is not limited to delay time. The quality of the backhaul line may include, in addition to or instead of delay time, another type of information relating to quality, for example, throughput, and the like.

(Application Control Unit 137)

The application control unit 137 controls application of the control scheme to the communication nodes based on the backhaul quality information of the quality of the backhaul line to be used for providing the control-related information.

For example, the application control unit 137 controls application of the control scheme to two or more communication nodes including the communication nodes based on the backhaul quality information. In this case, the backhaul quality information of, for example, the two or more communication nodes is acquired.

Control Scheme

In addition, the control scheme is a scheme for improving a communication capacity of the communication system which includes the communication nodes as described above.

The control scheme includes, for example, an interference control scheme. To be more specific, the interference control scheme includes, for example, frequency-domain ICIC, time-domain ICIC, BF (null steering), and the like.

By controlling application of an interference control scheme based on the backhaul quality information, for example, it is possible to select and apply a more proper interference control scheme within the constraint on the backhaul lines. Accordingly, interference can be more properly suppressed. As a result, communication quality can be improved and the communication capacity of the communication system 1 can be improved.

In addition, the control scheme includes, for example, CoMP transmission and reception.

By controlling application of CoMP transmission and reception based on the backhaul quality information, for example, CoMP transmission and reception can be applied only in a case possible within the constraint on the backhaul lines. Accordingly, while communication quality can be improved due to CoMP transmission and reception, deterioration in communication quality caused by failure of CoMP transmission and reception can be suppressed. As a result, communication quality can be improved and the communication capacity of the communication system 1 can be improved.

By controlling application of a control scheme for improving the communication quality of the communication system based on the backhaul quality information as described above, for example, communication quality can be improved and the communication capacity can be improved.

Specific Technique

First, as a first step, for example, the application control unit 137 decides to apply the control scheme to two or more control entities 200 (or two or more communication nodes in which the execution entity 200 is mounted) based on the information of backhaul quality.

As an example, when the control scheme is the interference control scheme, the application control unit 137 selects one of frequency-domain ICIC, time-domain ICIC, and BF (null steering) based on the backhaul quality information, and decides to apply the selected interference control scheme. In addition, as another example, when the control scheme is CoMP transmission and reception, the application control unit 137 decides whether to apply CoMP transmission and reception based on the backhaul quality information.

Next, as a second step, for example, the application control unit 137 applies the control scheme to the two or more execution entities 200 (or the two or more communication nodes in which the execution entity 200 is mounted). That is, the application control unit 137 causes the two or more execution entities 200 to execute control in the control scheme.

As an example, the application control unit 137 transmits a control command for control in the control scheme to the control entity 200. As a result, the control entity 200 executes control in the control scheme.

Application of Control in Unit of Group

A plurality of communication nodes to which the control scheme is applied are classified into one or more groups based on information regarding the plurality of communication nodes. Then, based on the quality-related information regarding one or more communication nodes included in each group, the application control unit 137 controls application of the control scheme to the one or more communication nodes for each group that is included in the one or more groups.

To be specific, for example, among the communication nodes included in the communication system 1, a plurality of communication nodes to which the control scheme is applied is classified into one or more groups. Then, the application control unit 137 controls application of the control scheme for each group.

Through control of application of the control scheme in units of groups as above, optimal control can be performed for each group.

As a first example, the information regarding the plurality of communication nodes includes information on positions of the plurality of communication nodes. In other words, the plurality of communication nodes are classified into one or more groups based on the information positions of the plurality of communication nodes.

Accordingly, for example, communication nodes in close positions are classified into the same group, and application of the control scheme can be controlled for communication nodes in the close positions. In other words, optimal control can be performed for communication nodes that need application of the control scheme.

As a second example, the information regarding the plurality of communication nodes includes information on radio resources used by the plurality of communication nodes. In other words, the plurality of communication nodes are classified into one or more groups based on the information on radio resources used by the plurality of communication nodes. The radio resources are radio resources with any granularity, for example, a component carrier (CC), a subband, a resource block (RB), and the like.

Accordingly, communication nodes which use the same radio resource can be classified into the same group, and application of the control scheme can be controlled for each of the communication nodes which use the same radio resource. In other words, optimal control can be performed for each communication node that need application of the control scheme.

As a third example, the information regarding the plurality of communication nodes may include the quality-related information regarding quality of a backhaul line (i.e., backhaul quality information) used for providing the control-related information to the plurality of communication nodes. In other words, the plurality of communication nodes may be classified into one or more groups based on the backhaul quality information corresponding to the plurality of communication nodes.

Accordingly, for example, communication nodes having similar quality of backhaul lines (for example, delay time of the backhaul lines, types of the backhaul lines (wired or wireless)) are classified into the same group, and thus application of the control scheme can be controlled for each of the communication nodes having similar quality of the backhaul lines. For this reason, it is possible to, for example, select a control scheme which exhibits a superior effect (for example, time-domain ICIC, BF (null steering), or the like) among a plurality of control schemes (for example, a plurality of interference control schemes) and apply the scheme to communication nodes having favorable quality of the backhaul lines. Alternatively, for example, a control scheme (for example, CoMP transmission and reception) can be applied to communication nodes having favorable quality of the backhaul lines with a higher frequency. It should be noted that, since interference can occur between the groups due to the classification based on the backhaul quality information, when interference which can occur is acceptable, it is desirable to perform classification based on backhaul quality information.

As described above, for example, control over application of a control scheme is performed for each group. Accordingly, more proper control is possible.

Decision in Consideration of Adjustment of Operation Timing

It should be noted that, when application of a control scheme is decided, adjusting an operation timing of a communication node may be considered. This adjustment is made to reduce a difference in delay time of backhaul lines between communication nodes. With this adjustment, operation timings of the communication nodes can differ. Thus, by considering adjustment of operation timings of communication nodes (i.e., by considering adjusted operation timings of the communication nodes) when application of a control scheme is decided, the application of the control scheme can be decided more properly. This adjustment of operation timings will be described below in detail.

As described above, the application control unit 137 controls application of a control scheme based on backhaul quality information.

Accordingly, when it is not possible to properly apply a control scheme due to a delay on a backhaul line (or irregular delay), application of the control scheme can be avoided. As an example, in application of a control scheme (for example, BF (null steering)) to two eNBs, control-related information is transmitted to one eNB without delay and to the other eNB with a long delay. If the control scheme is applied to them in this case, there is a possibility of the application to the one eNB in time and the application to the other eNB not in time. In such a case, application of the control scheme can be avoided. It should be noted that, when there is no problem in application of a control scheme, the control scheme can be applied considering a delay on a backhaul line (or irregular delay). In this manner, control over a plurality of communication nodes (for example, interference control, and CoMP transmission and reception) can be performed more properly.

More details on control of application of a control scheme will be described below.

<3.2. Configuration of Execution Entity>

Next, an example of the configuration of the execution entity 200 according to the present embodiment will be described with reference to FIG. 17. FIG. 17 is a block diagram showing the example of the configuration of the execution entity 200 according to the present embodiment. Referring to FIG. 17, the execution entity 200 includes an antenna unit 210, a radio communication unit 220, a storage unit 230, a storage unit 240, and a processing unit 250. The execution entity 200, for example, is mounted in the MeNBs 21, the PeNB 23, the RRH 25, the RN 27, and the HeNB 29.

(Antenna Unit 210)

The antenna unit 210 receives a radio signal and outputs the received signal to the radio communication unit 220. Further, the antenna unit 210 transmits a transmission signal output by the radio communication unit 220.

(Radio Communication Unit 220)

The radio communication unit 220 performs radio communication with the UEs 31 positioned within a communicable range (for example, a cell) of the execution entity 200.

(Network Communication Unit 230)

The communication unit 230 communicates with other communication nodes. The communication unit 230 communicates with other communication nodes through, for example, a backhaul line. The other communication nodes include, for example, the MeNBs 21, the PeNB 23, the RRH 25, the RN 27, the HeNB 29, and/or the core network node.

(Storage Unit 240)

The storage unit 240 temporarily or permanently stores programs and data for operations of the execution entity 200.

In addition, for example, the storage unit 240 stores quality-related information regarding quality of a backhaul line.

(Processing Unit 250)

The processing unit 250 provides various functions to the execution entity 200. The processing unit 250 includes a quality measurement unit 251, an information collection unit 253, an information acquisition unit 255, an information providing unit 257, and a communication control unit 259.

(Quality Measurement Unit 251)

The quality measurement unit 251 measures quality of a backhaul line.

For example, the quality measurement unit 251 measures quality of a backhaul line through a measurement procedure of the quality of a backhaul line, and generates quality-related information regarding the quality of the backhaul line (hereinafter referred to as "backhaul quality information"). The measurement procedure will be described below.

(Information Collection Unit 253)

The information collection unit 253 collects backhaul quality information from another device.

For example, the information collection unit 253 acquires backhaul quality information through a collection procedure of quality-related information regarding quality of a backhaul line (i.e., the backhaul quality information). The collection procedure will be described below.

In addition, for example, the information collection unit 253 causes the collected backhaul quality information to be stored in the storage unit 240.

(Information Acquisition Unit 255)

The information acquisition unit 255 acquires at least a part of the quality-related information regarding the quality of the backhaul line (i.e., backhaul quality information) to be used for providing control-related information regarding control in a radio communication control scheme over a communication node to which the control scheme is applied.

Backhaul Quality Information to be Acquired

The above-described at least a part of backhaul quality information is generated through, for example, the measurement procedure of the quality of the backhaul line. Then, the information acquisition unit 255 acquires the generated backhaul quality information.

In addition, at least a part of the backhaul quality information is collected from another device through, for example, the collection procedure with regard to the backhaul quality information. Then, the information acquisition unit 2555 acquires at least a part of the collected backhaul quality information.

To be specific, for example, the quality measurement unit 251 generates the backhaul quality information through the measurement procedure and causes the information to be stored in the storage unit 240, or the information collection unit 253 collects the backhaul quality information generated by another communication node through the measurement procedure and causes the information to be stored in the storage unit 240. Then, the information acquisition unit 255 acquires the backhaul quality information.

It should be noted that, when the execution entity 200 does not have backhaul quality information, the entity can use backhaul quality information possessed by another device due to collection through the collection procedure.

Configuration of Backhaul Line

The above-described backhaul line is, for example, a combination of a plurality of individual backhaul lines. In addition, at least a part of the backhaul quality information is information regarding quality of at least one individual backhaul line (hereinafter referred to as "individual backhaul quality information") among the plurality of individual backhaul lines.

By acquiring the information regarding the quality of the individual backhaul line, for example, not only information regarding the overall quality of the backhaul lines, but also information regarding the quality of the individual backhaul line can be provided. Accordingly, considering the quality of the individual backhaul line included in the backhaul lines, for example, application of a control scheme can be controlled more properly. In addition, by combining partial information of the backhaul lines, for example, the information regarding the overall quality of the backhaul lines can be generated or collected. For this reason, labor necessary for measuring the quality of the backhaul lines and collecting the backhaul quality information can be lessened.

(Information Providing Unit 257)

The information providing unit 257 provides at least a part of the quality-related information (i.e., backhaul quality information). In addition, the backhaul quality information is information to be used in controlling application of the control scheme to the communication nodes to which the control scheme is applied.

For example, the information providing unit 257 provides the at least a part of the backhaul quality information to the control entity 100.

Accordingly, it is possible to lessen labor of the control entity 100 measuring quality of backhaul lines.

(Communication Control Unit 259)

The communication control unit 259 applies the control scheme according to control by the control entity 100. In other words, the communication control unit 259 executes control in the control scheme according to control by the control entity 100.

For example, the control entity 100 transmits a control command for control in the control scheme. Then, the communication control unit 259 executes the control in the control scheme based on the control command.

More details of application and execution of the control scheme will be described below.

4. Accumulation of Backhaul Quality Information

Next, accumulation of backhaul quality information will be described with reference to FIGS. 18 to 44. To be specific, a measurement procedure of quality of a backhaul line and a collection procedure of backhaul quality information will be described.

<4.1. Measurement Procedure>

First, first to seventh examples of the measurement procedure with regard to quality of a backhaul line will be described with reference to FIGS. 18 to 34.

(First Example)

First, the first example of the measurement procedure will be described with reference to FIGS. 18 to 20.

Flow of Measurement Procedure

Figure 18:
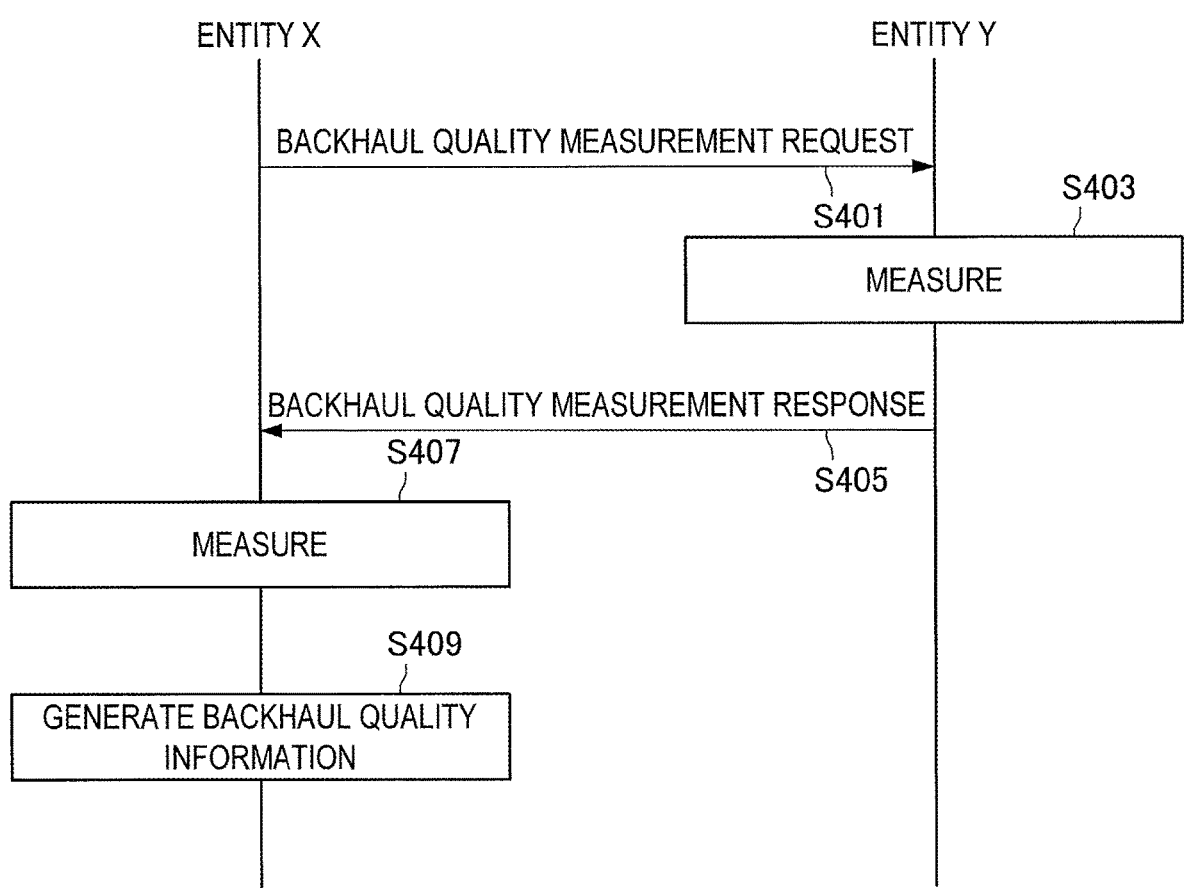
FIG. 18 is a sequence diagram showing an example of the schematic flow of a first example of a measurement procedure of quality of a backhaul line.

FIG. 18 is a sequence diagram showing an example of the schematic flow of the first example of the measurement procedure of quality of a backhaul line. Here, an entity X is, for example, the control entity 100 or the execution entity 200, and an entity Y is the execution entity 200.

First, the entity X transmits a request message regarding measurement of quality of a backhaul line, and the entity Y receives the request message (S401). This request message includes information for measuring quality of a backhaul line between the entity X and the entity Y.

Then, the entity Y measures quality of the backhaul line based on information included in the request message (and the reception time of the request message) (S403).

Then, the entity Y transmits a response message regarding measurement of quality of the backhaul line, and the entity X receives the response message (S405). This response message includes the measurement result of the quality of the backhaul line. In addition, the response message includes information for measuring quality of the backhaul line between the entity X and the entity Y.

Then, the entity X measures quality of the backhaul line based on the information included in the response message (and the reception time of the response message) (S407).

Then, the entity X generates backhaul quality information based on the measurement result of the quality of the backhaul line (S409).

Content of Request Message

FIG. 19 is an illustrative diagram for describing information elements (IEs) included in the request message according to the first example of the measurement procedure.

Referring to FIG. 19, the request message includes the transmission source of the request message (the entity X) and the destination of the request message (the entity Y).

In addition, the request message includes a request flag for the measurement of the quality of the backhaul line. This request flag indicates types of the quality of the backhaul line to be measured (for example, delay time, throughput, and the like). The request message may include a plurality of request flags. Accordingly, measurement of a plurality of types of quality can be requested with one request message. As a result, overhead is suppressed.

In addition, the request message includes a time stamp which indicates the transmission time of the request message. Accordingly, delay time of the backhaul line can be measured.

In addition, the request message includes the data size of the request message. Accordingly, throughput of the backhaul line can be easily measured.

Content of Response Message

FIG. 20 is an illustrative diagram for describing information elements (IEs) included in the response message according to the first example of the measurement procedure.

Referring to FIG. 20, the response message includes the transmission source of the response message (the entity Y) and the destination of the response message (the entity X).

In addition, the response message includes a response flag for the measurement of the quality of the backhaul line. This response flag indicates types of the measured quality of the backhaul line (for example, delay time, throughput, and the like). The response message may include a plurality of response flags. Accordingly, measurement results of a plurality of types of quality can be provided with one response message. As a result, overhead is suppressed.

In addition, the response message includes the measurement result of the quality of the backhaul line. The response message may include the measurement result of one type of quality or measurement results of two or more types of quality.

In addition, the response message includes a time stamp which indicates the transmission time of the response message and the data size of the response message, like the request message. Accordingly, delay time and throughput of the backhaul line can be measured.

Conclusion

In the first example, the measurement procedure includes transmitting and receiving one or more messages including a transmission time. Accordingly, it is possible to know the time taken to transmit a message through the backhaul line. For this reason, it is also possible to know, for example, delay time on the backhaul line.

In addition, in the first example, the measurement procedure includes measuring the quality of the backhaul line bi-directionally. Accordingly, when there is a significant quality difference between two directions, information on quality of the two directions can be obtained. In addition, even when there is a minor quality difference between two directions, more accurate information on quality can be obtained.

(Second Example)

Next, the second example of the measurement procedure will be described with reference to FIGS. 21 to 23.

Flow of Measurement Procedure

Figure 21:
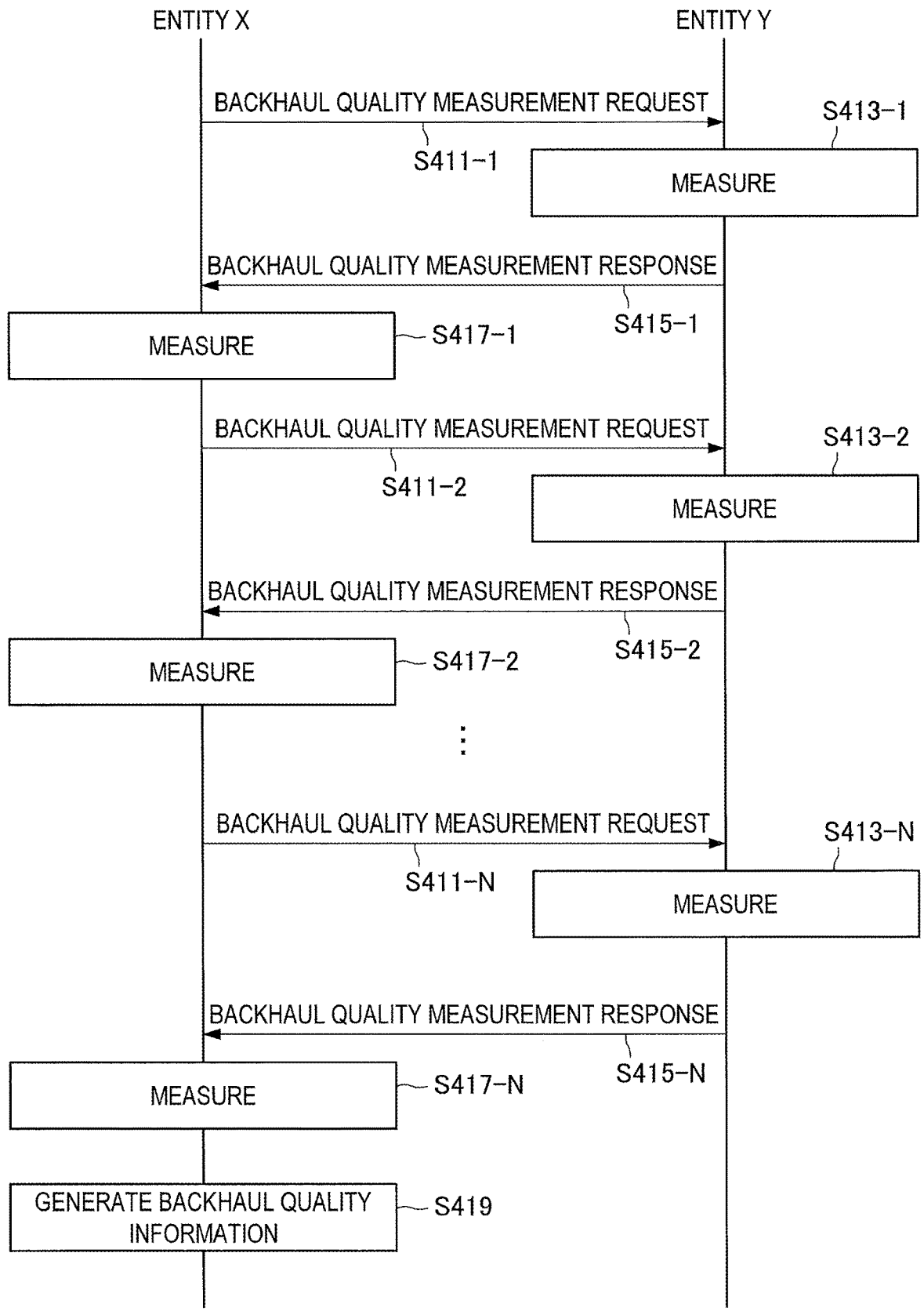
FIG. 21 is a sequence diagram showing an example of the schematic flow of a second example of a measurement procedure of quality of a backhaul line.

FIG. 21 is a sequence diagram showing an example of the schematic flow of the second example of the measurement procedure of quality of a backhaul line. Referring to FIG. 21, transmission and reception of a request message (S411), measurement based on the request message (S413), transmission and reception of a response message (S415), and measurement based on the response message (S417) are repeated a plurality of times.

Then, the entity X generates backhaul quality information based on the measurement result of the quality of the backhaul line (S419).

Content of Request Message

FIG. 22 is an illustrative diagram for describing information elements (IEs) included in a request message according to the second example of the measurement procedure. Referring to FIG. 22, the request message of the second example further includes the total number of request messages and a current request index, in addition to the information elements included in the request message according to the first example described with reference to FIG. 19. This current request index indicates the order of a request message among all request messages. With the total number of request messages, it is possible to know whether all request messages have been received or if there is a lost request message.

Content of Response Message

FIG. 23 is an illustrative diagram for describing information elements (IEs) included in a request message according to the second example of the measurement procedure. Referring to FIG. 23, the response message of the second example further includes the total number of response messages and a current response index in addition to the information elements included in the response message according to the first example described with reference to FIG. 20, the same as the request message described above.

Conclusion

In the second example, the measurement procedure includes measuring quality of the backhaul line a plurality of times. Accordingly, more accurate quality can be measured.

(Third Example)

Next, the third example of the measurement procedure will be described with reference to FIGS. 24 to 26.

Flow of Measurement Procedure

Figure 24:
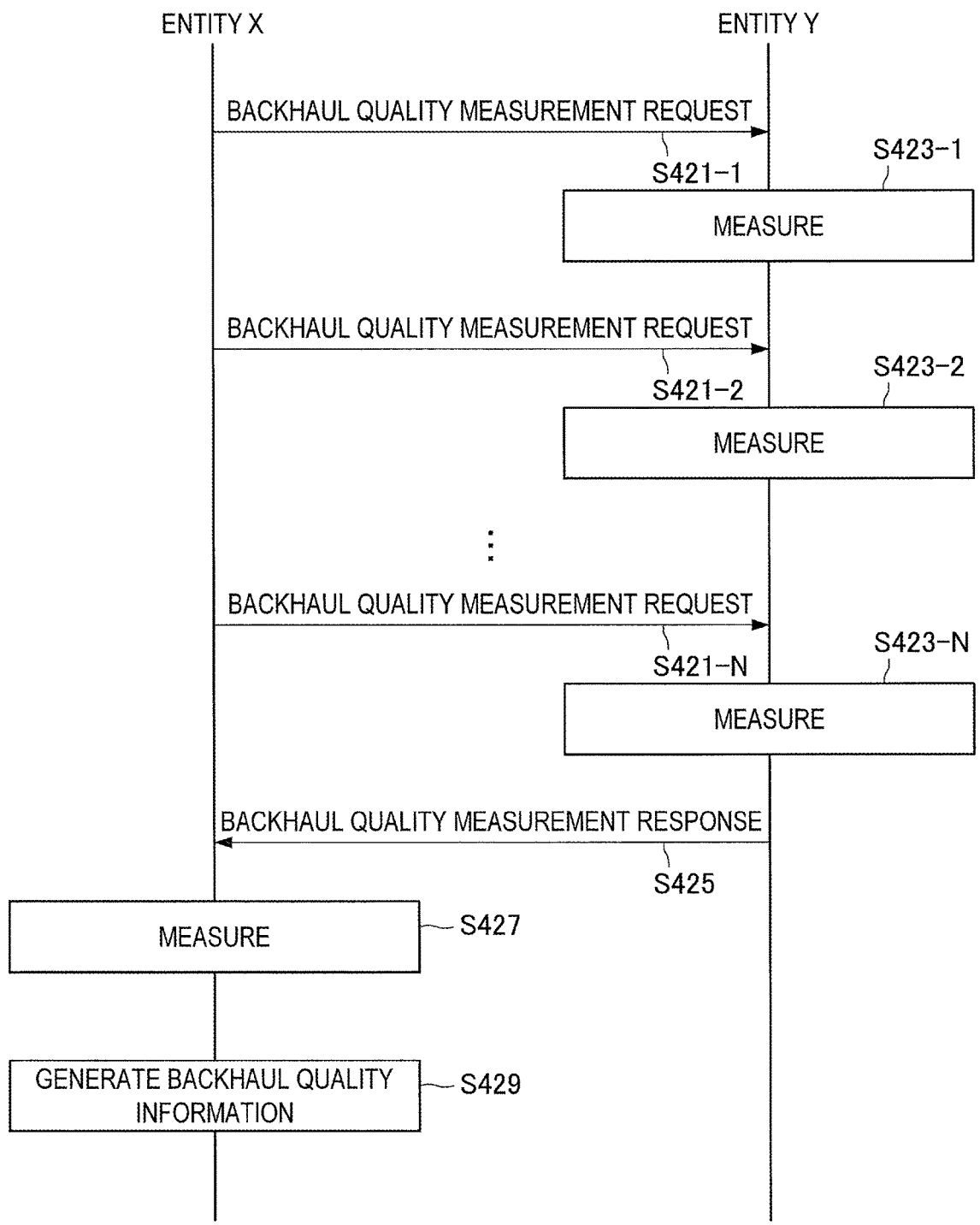
FIG. 24 is a sequence diagram showing an example of the schematic flow of a third example of a measurement procedure of quality of a backhaul line.

FIG. 24 is a sequence diagram showing an example of the schematic flow of the third example of the measurement procedure of quality of a backhaul line.

Referring to FIG. 24, transmission and reception of a request message (S421), and measurement based on the request message (S423) are repeated a plurality of times.

Then, transmission and reception of a response message (S425), measurement based on the response message (S427), and generation of backhaul quality information (S429) are performed.

Content of Request Message

FIG. 25 is an illustrative diagram for describing information elements (IEs) included in the request message according to the third example of the measurement procedure. Referring to FIG. 25, the request message of the third example further includes the total number of request messages and a current request index, like the request message of the second example described with reference to FIG. 22.

Content of Response Message

FIG. 26 is an illustrative diagram for describing information elements (IEs) included in the response message according to the third example of the measurement procedure. Referring to FIG. 26, the response message includes the measurement result of the quality of the backhaul line. Here, as the measurement result of the quality of the backhaul line, the response message of the third example may include a plurality of individual measurement results or one measurement result obtained from the plurality of individual measurement results (for example, the average value (and the variance value)). Further, in addition to the information elements included in the response message of the first example described with reference to FIG. 20, the response message of the third example further includes the total number of measurements. Accordingly, whether a packet loss has occurred can also be ascertained.

Conclusion

In the third example, the measurement procedure includes measuring quality of the backhaul line a plurality of times. Accordingly, more accurate quality can be measured.

(Fourth Example)

Next, the fourth example of the measurement procedure will be described with reference to FIGS. 27 to 28.

Flow of Measurement Procedure

Figure 27:
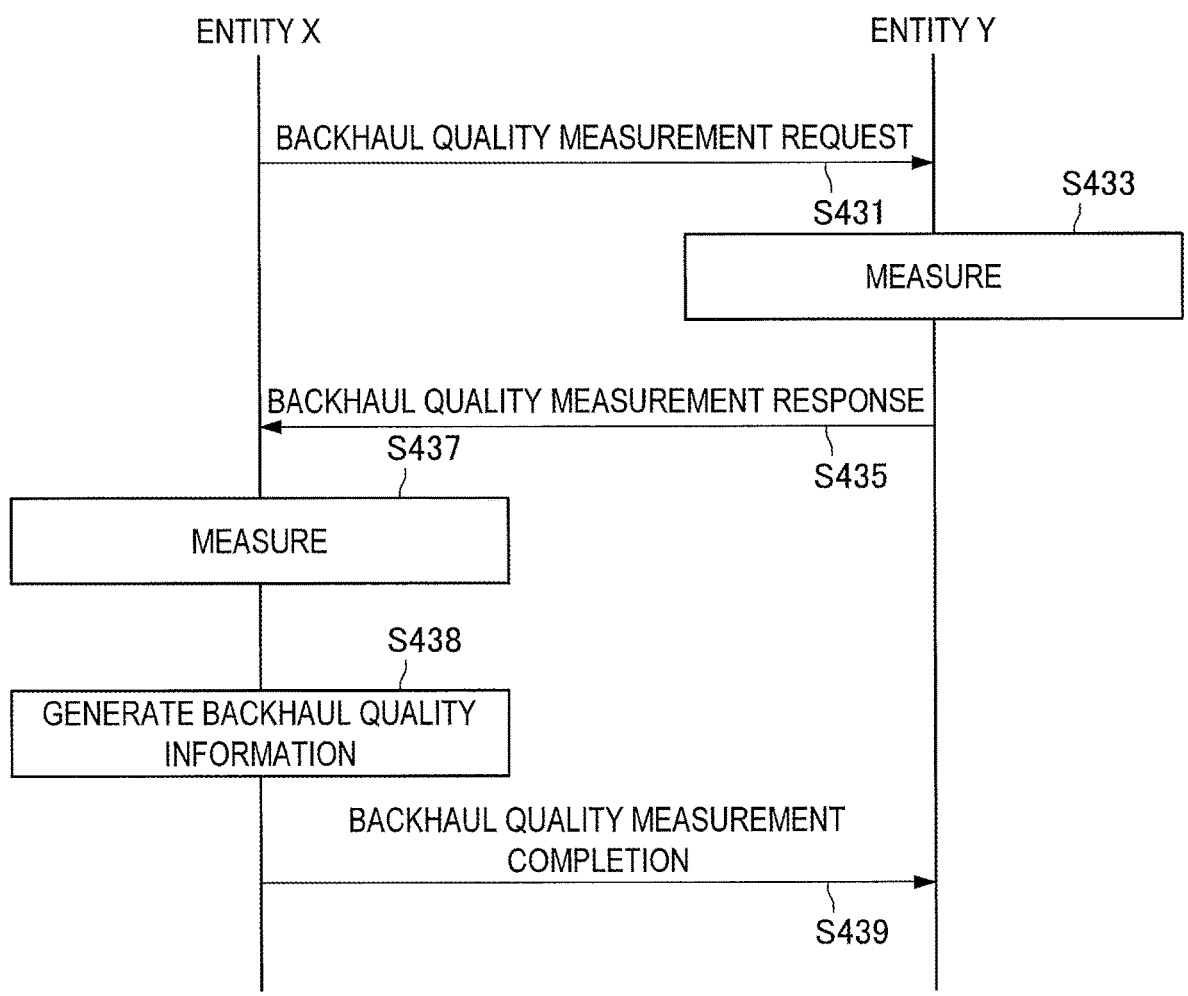
FIG. 27 is a sequence diagram showing an example of the schematic flow of a fourth example of the measurement procedure of quality of a backhaul line.

FIG. 27 is a sequence diagram showing an example of the schematic flow of the fourth example of the measurement procedure of quality of a backhaul line. Referring to FIG. 27, transmission and reception of a request message (S431), measurement based on the request message (S433), transmission and reception of a response message (S435), measurement based on the response message (S437), and generation of backhaul quality information (S438) are performed as in the first example of the measurement procedure described with reference to FIG. 18.

In addition, in the fourth example of the measurement procedure, the entity X further transmits a completion message regarding measurement of the quality of the backhaul line and the entity Y receives the completion message (SXD 439).

Content of Completion Message

FIG. 28 is an illustrative diagram for describing information elements (IEs) included in the completion message according to the fourth example of the measurement procedure.

Referring to FIG. 28, the completion message includes the transmission source of the completion message (the entity X) and the destination of the completion message (the entity Y).

In addition, the completion message includes a completion flag regarding measurement of the quality of the backhaul line. The completion flag indicates the type of the measured quality of the backhaul line (for example, delay time, throughput, or the like). The completion message may include a plurality of completion flags.

In addition, the completion message includes the measurement result of the quality of the backhaul line. For example, the measurement result is backhaul quality information. The response message may include measurement results of a plurality of types of quality.

Conclusion

In the fourth example, the measurement procedure includes sharing of measurement of the quality of the backhaul line. Accordingly, a plurality of communication nodes that are involved in measurement can obtain a measurement result.

(Fifth Example)

Next, the fifth example of the measurement procedure will be described with reference to FIGS. 29 to 30.

Flow of Measurement Procedure

First Example

Figure 29:
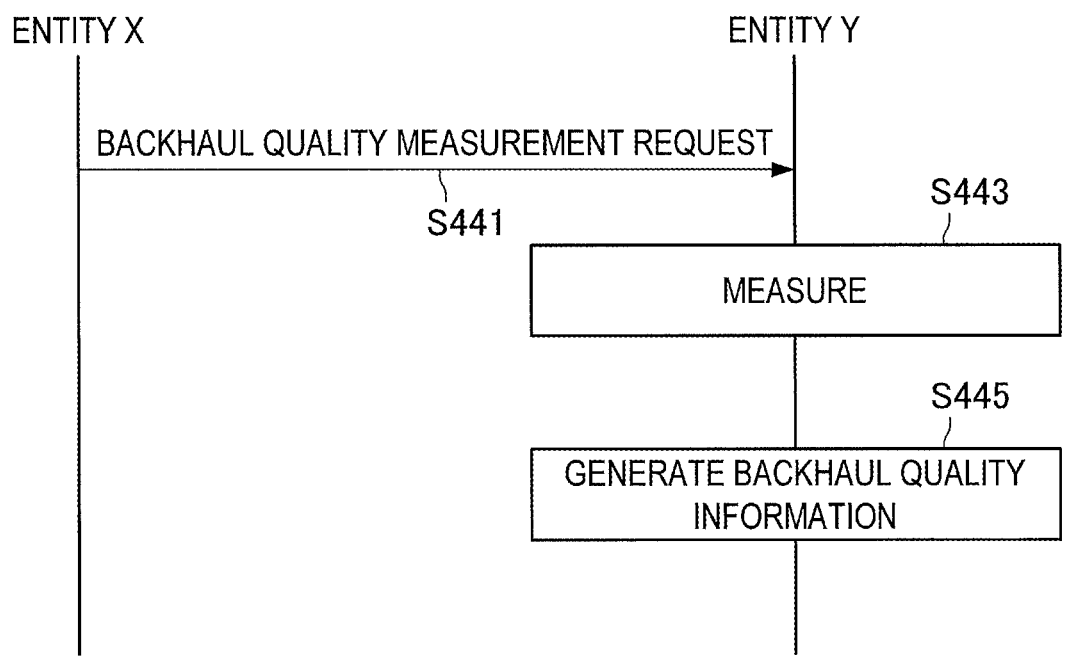
FIG. 29 is a sequence diagram showing a first example of the schematic flow of a fifth example of the measurement procedure of quality of a backhaul line.

FIG. 29 is a sequence diagram showing a first example of the schematic flow of the fifth example of the measurement procedure of quality of a backhaul line.

Referring to FIG. 29, transmission and reception of a request message (S441) and measurement based on the request message (S443) are performed. In addition, the entity Y generates backhaul quality information based on a measurement result of quality of a backhaul line (S445).

Second Example

Figure 30:
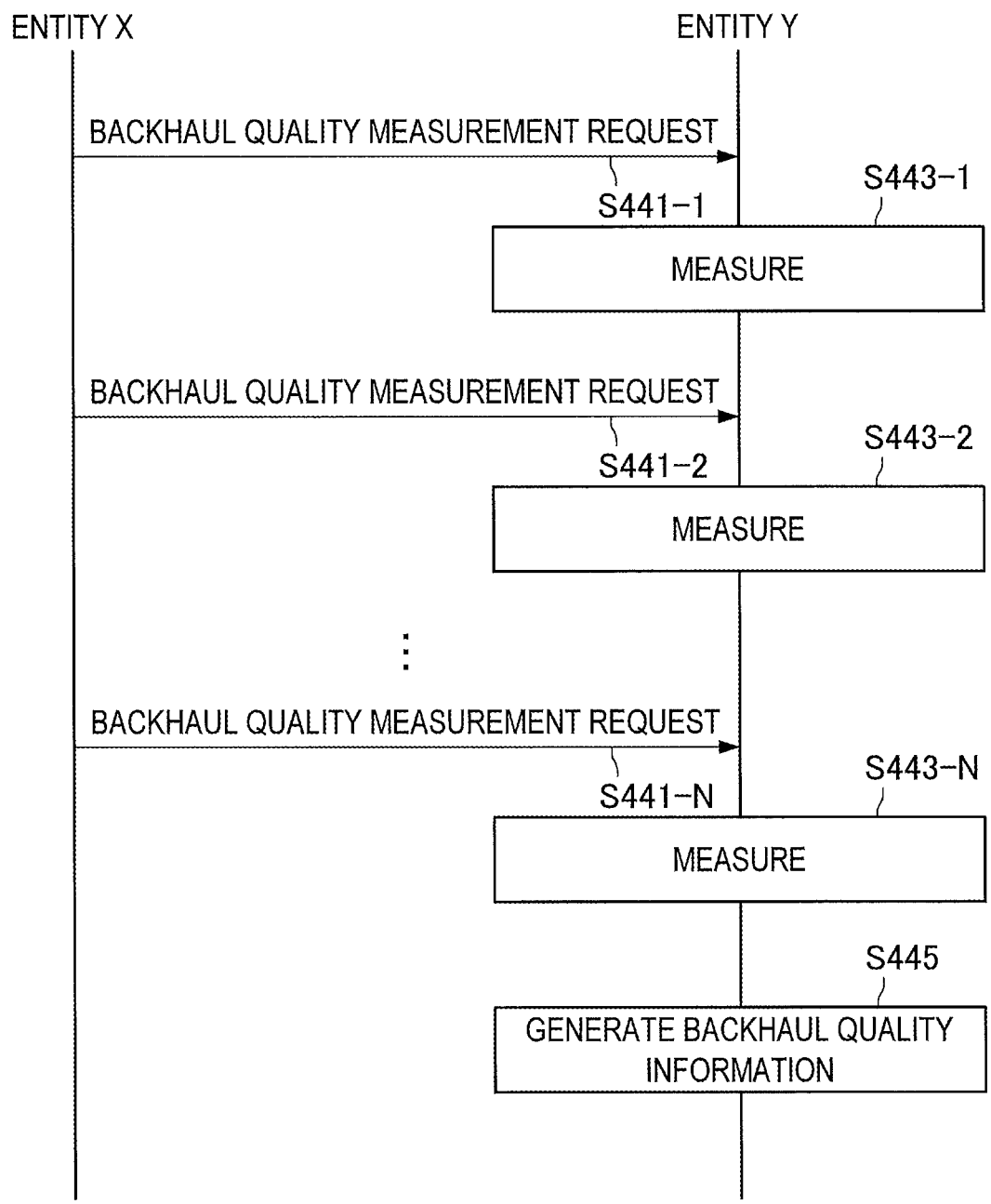
FIG. 30 is a sequence diagram showing a second example of the schematic flow of a fifth example of the measurement procedure of quality of a backhaul line.

FIG. 30 is a sequence diagram showing a second example of the schematic flow of the fifth example of the measurement procedure of quality of a backhaul line.

Referring to FIG. 30, transmission and reception of a request message (S441) and measurement based on the request message (S443) are repeated a plurality of times. In addition, the entity Y generates backhaul quality information based on a measurement result of quality of a backhaul line (S445).

Content of Request Message

The request message of the fifth example of the measurement procedure has the same content as the request message of the first example of the measurement procedure described with reference to FIG. 19.

Conclusion

In the fifth example, the measurement procedure includes measuring the quality of the backhaul line in one direction. Accordingly, overhead is suppressed.

(Sixth Example)

Next, the sixth example of the measurement procedure will be described with reference to FIG. 31.

Flow of Measurement Procedure

Figure 31:
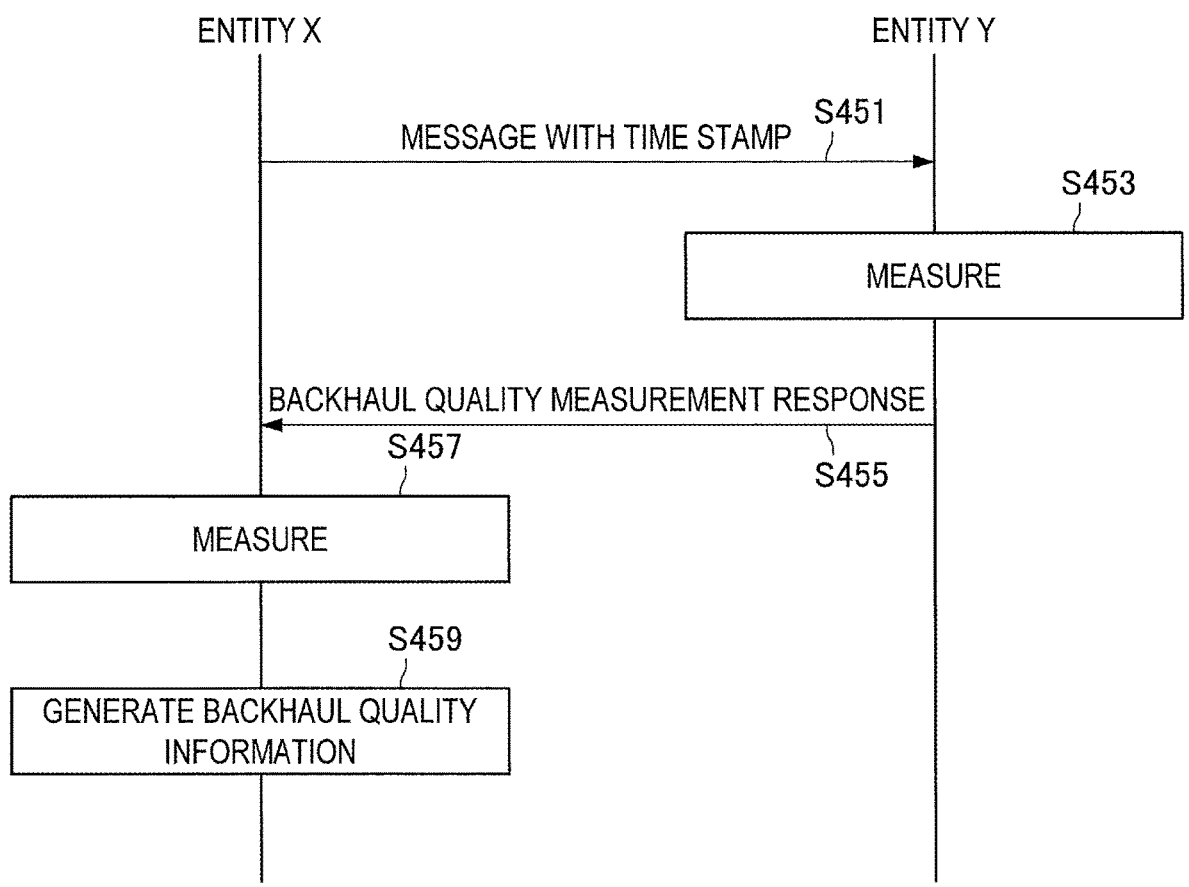
FIG. 31 is a sequence diagram showing an example of the schematic flow of a sixth example of the measurement procedure of quality of a backhaul line.

FIG. 31 is a sequence diagram showing an example of the schematic flow of the sixth example of the measurement procedure of quality of a backhaul line.

The entity X transmits any of the messages which includes a time stamp when necessary in terms of the operation, and the entity Y receives the message (S451).

Then, the entity Y measures quality of the backhaul line based on information included in the request message (and the reception time of the request message) (S453).

Then, transmission and reception of a response message (S455), measurement based on the response message (S457), and generation of backhaul quality information (S459) are performed.

Content of Response Message

The request message of the sixth example of the measurement procedure has the same content as the response message of the first example of the measurement procedure described with reference to FIG. 20.

Conclusion

In the sixth example, the measurement procedure includes transmitting and receiving a message which does not aim at measuring the quality of the backhaul line. Accordingly, overhead caused by a request message can be reduced.

Other

As still another example, measurement may be performed using the function of a protocol, for example, IEEE 1588 (Precision Time Protocol (PTP)), ping (echo request/reply of Internet Control Message Protocol (ICMP)), or the like. However, it should be noted that delay time measured particularly in ping is a round-trip time (RTT). In this case, the half value of the RTT may be regarded as delay time in one direction.

(Seventh Example)

Next, the seventh example of the measurement procedure will be described with reference to FIGS. 32 to 34.

Flow of Measurement Procedure

First Example

FIG. 32 is a sequence diagram showing a first example of the schematic flow of the seventh example of the measurement procedure of quality of a backhaul line. Here, the entity X is, for example, the control entity 100 or the execution entity 200, and the entity Y and an entity Z are execution entities 200. In this example, quality of a backhaul line between the entity X and the entity Y is measured.

First, the entity X transmits a request message regarding measurement of the quality of the backhaul line, and the entity Z receives the request message (S451). The request message is a message for requesting measurement of the quality of the backhaul line between the entity X and the entity Y.

Then, the entity Z measures the quality of the backhaul line between the entity X and the entity Z (S463).
Here, the entity Z retains a measurement result of quality of a backhaul line between the entity Z and the entity Y, and acquires backhaul quality information thereof (S464).

Then, the entity Z transmits a response message regarding the measurement of the quality of the backhaul line, and the entity X receives the request message (S465). The response message includes the measurement result of the quality of the backhaul line between the entity X and the entity Z, and the measurement result of the quality of the backhaul line between the entity Z and the entity Y.
Then, the entity X measures the quality of the backhaul line between the entity X and the entity Z (S467).

Then, the entity X generates backhaul quality information regarding the quality of the backhaul line between the entity X and the entity Y based on the measurement result of the quality of the backhaul line (S469).

It should be noted that, as an example, the backhaul line between the entity X and the entity Z is a wired line and the backhaul line between the entity Z and the entity Y is a wireless line. In this case, the entity Z is, for example, any eNB, and the entity Y is the RN 27 or a master device of an LN (UE 31F).

It should be noted that the measurement result of the quality of the backhaul line between the entity Z and the entity Y may be retained in the form of backhaul quality information regarding the quality of the backhaul line between the entity Z and the entity Y.

Second Example

FIG. 33 is a sequence diagram showing a second example of the schematic flow of the seventh example of the measurement procedure of quality of a backhaul line. Also in this example, the quality of the backhaul line between the entity X and the entity Y is measured.

First, transmission and reception of a request message (S461) and measurement based on the request message (S463) are performed as in the first example described with reference to FIG. 32.

Here, since the entity Z does not retain the measurement result of the quality of the backhaul line between the entity Z and the entity Y, the entity Z performs measurement of the quality of the backhaul line (S471 to S479). This measurement is performed in the same manner as the first example of the measurement procedure described with reference to FIG. 18.

Then, transmission and reception of a response message (S465), measurement based on the response message (S467), and generation of backhaul quality information (S469) are performed as in the first example described with reference to FIG. 32.

Content of Request Message

The request message of the fifth example of the measurement procedure has, for example, the same content as the request message of the first example of the measurement procedure described with reference to FIG. 19.

Content of Response Message

FIG. 34 is an illustrative diagram for describing information elements (IEs) included in the response message according to the seventh example of the measurement procedure. Referring to FIG. 34, the response message includes measurement results of the quality of the individual backhaul lines. For example, the response message includes the measurement result of the quality of the backhaul line between the entity X and the entity Z and the measurement result of the quality of the backhaul line between the entity Z and the entity Y.

Conclusion

In the seventh example, the backhaul lines are a combination of a plurality of individual backhaul lines. In addition, the measurement procedure includes measuring quality of at least one individual backhaul line among the plurality of individual backhaul lines.

Accordingly, application of a control scheme can be controlled more properly, for example, considering the quality of an individual backhaul line included in the backhaul lines. In addition, by combining information regarding quality of individual backhaul lines composing backhaul lines overall, for example, information regarding the overall quality of the backhaul lines can be generated. For this reason, labor necessary for measuring the quality of the backhaul lines can be lessened.

<4.2. Collection Procedure>

Next, first to sixth examples of the collection procedure of backhaul quality information will be described with reference to FIGS. 35 to 44.

(First Example)

First, the first example of the collection procedure will be described with reference to FIGS. 35 to 37.

Flow of Collection Procedure

Figure 35:
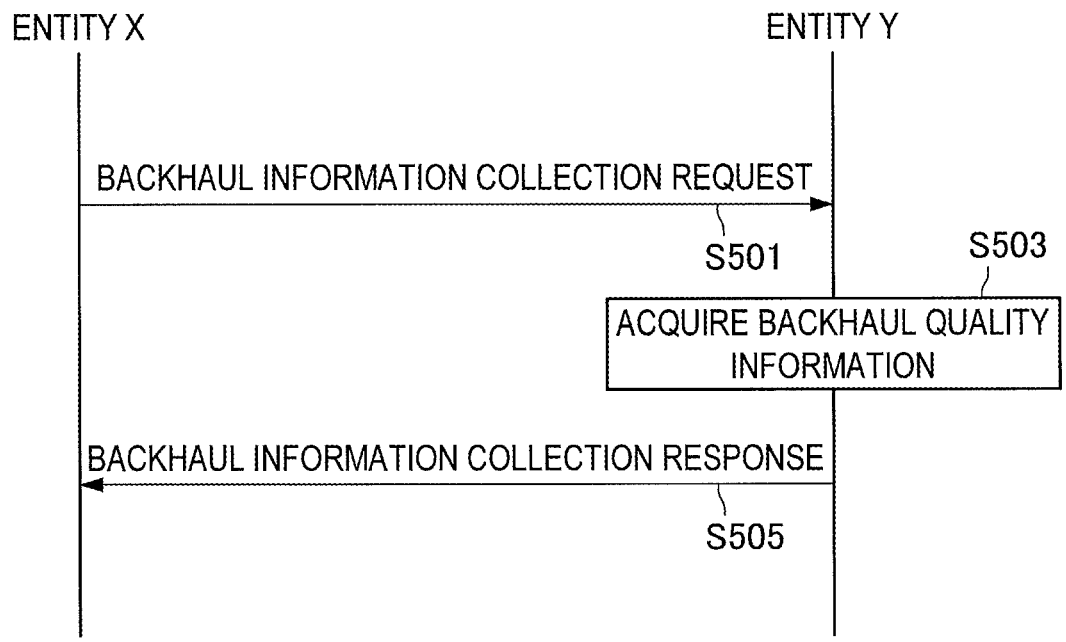
FIG. 35 is a sequence diagram showing an example of the schematic flow of a first example of a collection procedure of backhaul quality information.

FIG. 35 is a sequence diagram showing an example of the schematic flow of the first example of the collection procedure of backhaul quality information. Here, the entity X is, for example, the control entity 100 or the execution entity 200, and the entity Y is the execution entity 200.

First, the entity X transmits a request message regarding collection of information of a backhaul line and the entity Y receives the request message (S501). As an example, the request message is a message for requesting provision of the backhaul quality information regarding quality of the backhaul line between the entity Y and the entity Z (not illustrated).

Here, the entity Y retains the backhaul quality information to be collected. Thus, the entity Y acquires the backhaul quality information (S503).

Then, the entity Y transmits a response message regarding collection of information on the backhaul line and the entity X receives the response message (S505). The response message includes the backhaul quality information.

Content of Response Message

FIG. 36 is an illustrative diagram for describing information elements (IEs) included in the request message according to the first example of the collection procedure.

Referring to FIG. 36, the request message includes the transmission source of the request message (the entity X) and the destination of the request message (the entity Y). In addition, the request message includes a request flag regarding the collection of the information on the backhaul line. This request message indicates types of the backhaul quality information to be collected (for example, delay time, throughput, packet loss rate, and the like). Accordingly, a plurality of types of backhaul quality information can be collected with one request message. As a result, overhead is suppressed.

In addition, the request message includes information indicating the transmission source and the transmission destination of the backhaul line corresponding to the backhaul quality information.

Content of Response Message

FIG. 37 is an illustrative diagram for describing information elements (IEs) included in the response message according to the first example of the collection procedure.

Referring to FIG. 37, the response message includes the transmission source of the request message (the entity Y) and the destination of the request message (the entity X).

In addition, the response message includes backhaul information. This backhaul information includes backhaul quality information. Further, the request message may include one type of backhaul quality information or two or more types of backhaul quality information. In addition, the backhaul information may include information which indicates the type of a backhaul. It should be noted that, when the entity Y has no backhaul quality information to be collected, the request message may include information indicating that the entity has no backhaul quality information as the backhaul information.

In addition, the request message includes information indicating the transmission source and the transmission destination of the backhaul line corresponding to the backhaul quality information.

Conclusion

In the first example, the collection procedure includes requesting provision of the backhaul quality information and providing the backhaul quality information according to the request. Accordingly, the backhaul quality information can be actively collected.

(Second Example)

Next, the second example of the collection procedure will be described with reference to FIGS. 38 and 39.

Flow of Collection Procedure

Figure 38:
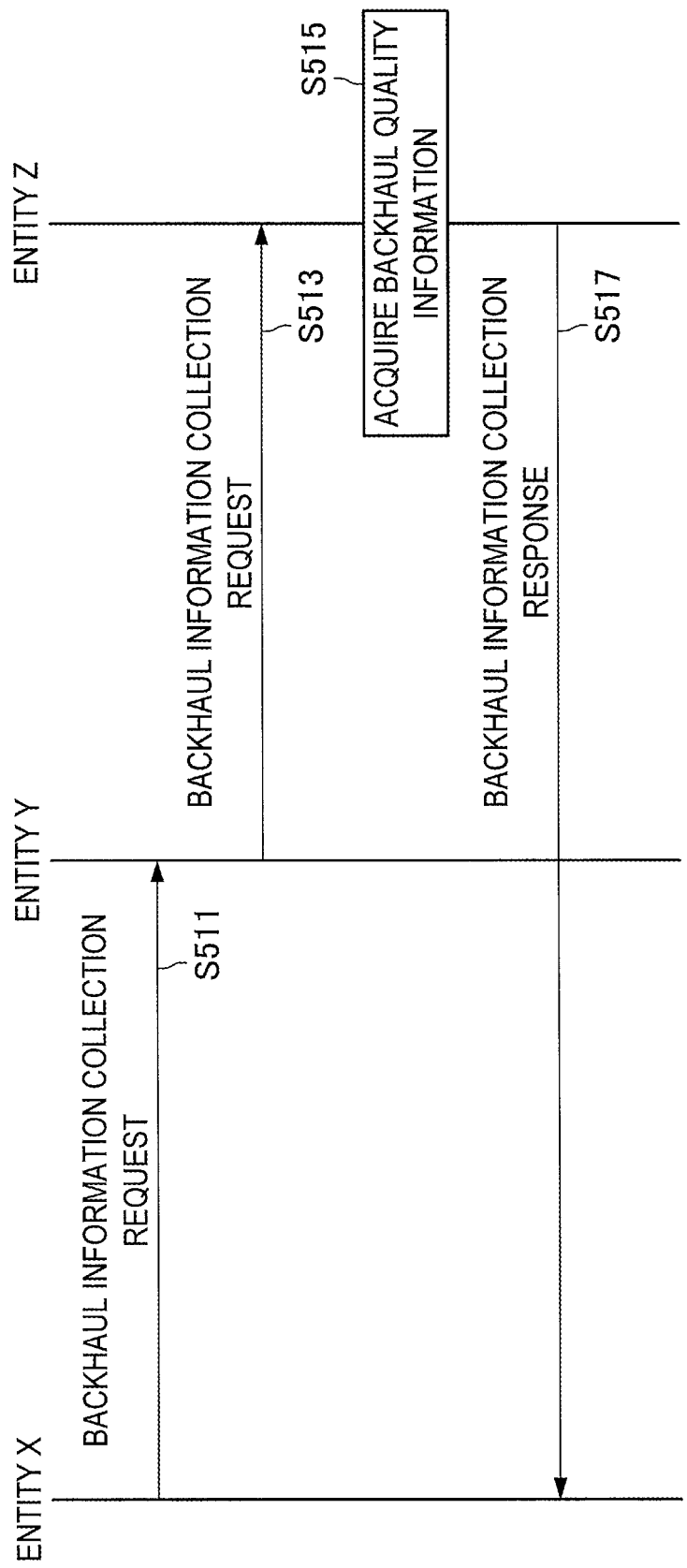
FIG. 38 is a sequence diagram showing an example of the schematic flow of a second example of a collection procedure of backhaul quality information.

FIG. 38 is a sequence diagram showing an example of the schematic flow of the second example of the collection procedure of backhaul quality information. First, the entity X transmits a request message regarding collection of information on a backhaul line and the entity Y receives the request message (S511).

Here, the entity Y is not retaining the backhaul quality information regarding quality of the backhaul line to be collected. The entity Y, however, knows the entity which retains the backhaul quality information (for example, the entity Z). Thus, the entity Y transfers the request message to the entity Z (S513).

Here, the entity Z is retaining the backhaul quality information regarding the quality of the backhaul line to be collected. Thus, the entity Y acquires the backhaul quality information (S515).

Then, the entity Z transmits a response message regarding collection of information on the backhaul line and the entity X receives the response message (S505). The response message includes the backhaul quality information.

Content of Request Message

FIG. 39 is an illustrative diagram for describing information elements (IEs) included in the request message according to the second example of the collection procedure. This request message is the request message transferred to the entity Z by the entity Y.

Referring to FIG. 39, the transferred request message includes information elements included in the request message of the first example of the collection procedure described with reference to FIG. 36. Among the information elements, however, the destination of the request message is changed from an entity which is the transfer source (the entity Y) to an entity which is the transfer destination (the entity Z) by the entity which is the transfer source (the entity Y).

For example, the transfer source (the entity Y) is further added to the request message to be transferred.

Content of Response Message

The request message of the second example of the collection procedure has, for example, the same content as the response message of the first example of the collection procedure described with reference to FIG. 37.

Conclusion

In the second example, the collection procedure includes requesting provision of the backhaul quality information and transferring the backhaul quality information to a communication node. Accordingly, labor for searching for a communication node that retains the backhaul quality information can be reduced.

(Third Example)

Next, the third example of the collection procedure will be described with reference to FIGS. 40 and 41.

Flow of Collection Procedure

Figure 40:
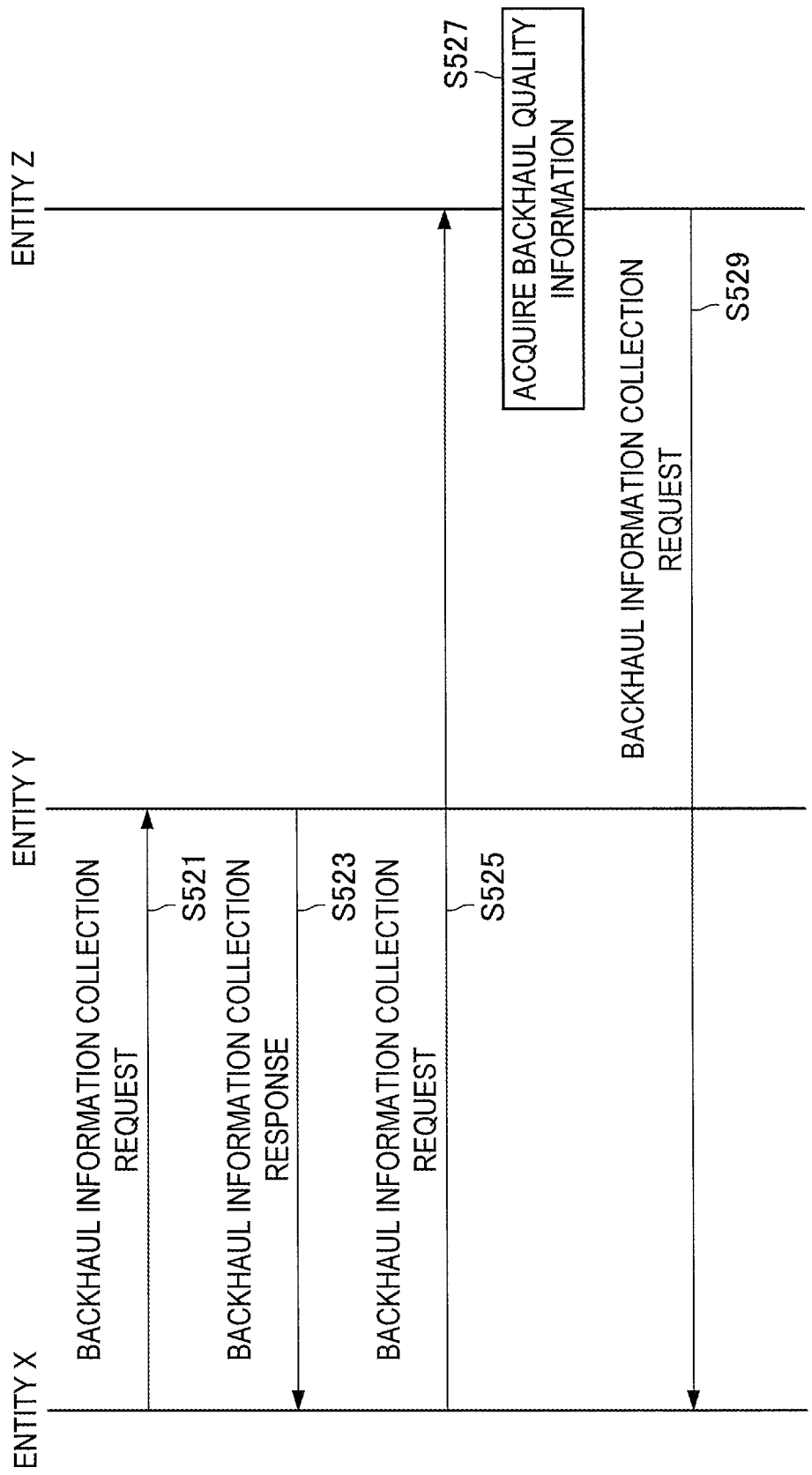
FIG. 40 is a sequence diagram showing an example of the schematic flow of a third example of a collection procedure of backhaul quality information.

FIG. 40 is a sequence diagram showing an example of the schematic flow of the third example of the collection procedure of backhaul quality information.

First, the entity X transmits a request message regarding collection of information on a backhaul line and the entity Y receives the request message (S521).

Here, the entity Y is not retaining the backhaul quality information regarding quality of the backhaul line to be collected. The entity Y, however, knows the entity which retains the backhaul quality information (for example, the entity Z). Thus, the entity Y transmits a response message including information on the entity that is retaining the backhaul quality information (for example, the entity Z), and the entity X receives the response message (S523).

Then, between the entity X and the entity Z, transmission and reception of a request message (S525), acquisition of the backhaul quality information (S527), and transmission and reception of a response message (S529) are performed.

Content of Request Message

The request message of the third example of the collection procedure has the same content as the request message of the first example of the collection procedure described with reference to FIG. 36.

Content of Response Message

FIG. 41 is an illustrative diagram for describing information elements (IEs) included in the response message according to the third example of the collection procedure. The response message is a response message to be transmitted to an entity that is a requesting source (the entity X) by an entity that does not retain the backhaul quality information (the entity Y).

Referring to FIG. 41, the request message includes the information elements included in the request message of the first example of the collection procedure described with reference to FIG. 36. For example, the backhaul information includes information indicating that the backhaul quality information is not included. In addition, the request message further includes information on the destination (the entity Z) which receives the request for providing the backhaul quality.

It should be noted that the request message transmitted by the entity Z to the entity X has, for example, the same content as the response message of the first example of the collection procedure described with reference to FIG. 36.

Conclusion

In the third example, the collection procedure includes requesting provision of the backhaul quality information and giving a notification on the communication node which has the backhaul quality information if necessary. Accordingly, labor for searching for a communication node which retains the backhaul quality information can be reduced.

In addition, in the third example, the time taken from transmission of the request message to reception of the response message can be shortened in comparison to the second example. In addition, since transferring is not included in the third example, the collection procedure becomes simple.

(Fourth Example)

Next, the fourth example of the collection procedure will be described with reference to FIG. 42.

Flow of Collection Procedure

Figure 42:
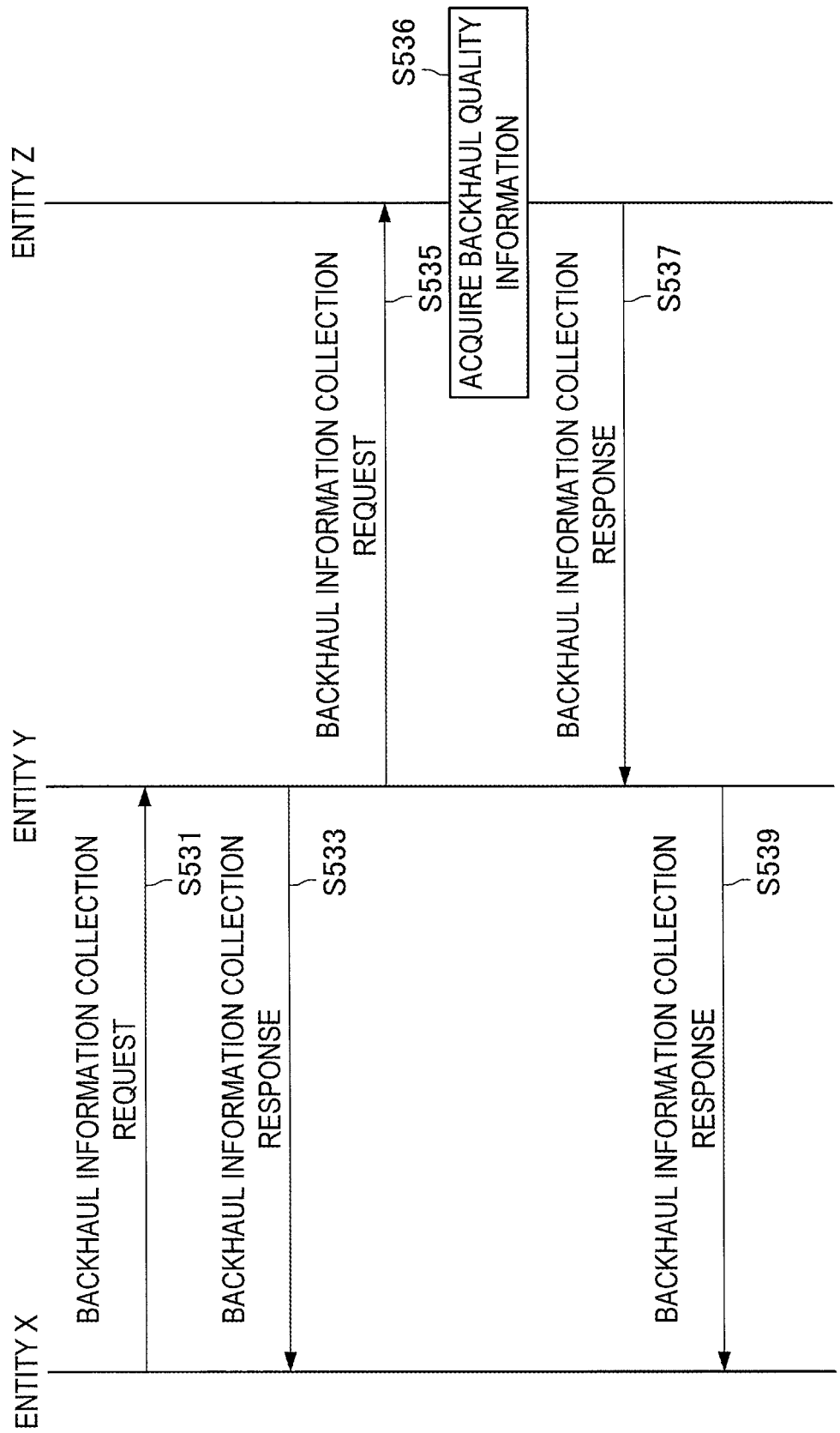
FIG. 42 is a sequence diagram showing an example of the schematic flow of a fourth example of a collection procedure of backhaul quality information.

FIG. 42 is a sequence diagram showing an example of the schematic flow of the fourth example of the collection procedure of backhaul quality information. Referring to FIG. 42, transmission and reception of a request message (S531) and transmission and reception of a response message (S533) are performed between the entity X and the entity Y as in the third example of the collection procedure. In addition, the entity Y knows that the entity Z is retaining backhaul quality information to be collected.

Then, transmission and reception of a request message (S535), acquisition of the backhaul quality information (S536), and transmission and reception of a response message (S537) are performed between the entity Y and the entity Z, rather than between the entity X and the entity Z.

Then, the entity Y transmits a response message regarding collection of information on the backhaul line and the entity X receives the response message (S539). The response message includes the backhaul quality information.

Content of Request Message

The request message of the fourth example of the collection procedure has the same content as the request message of the first example of the collection procedure described with reference to FIG. 36.

Content of Response Message

Among the response messages of the fourth example of the collection procedure, the first response message (i.e., the response message transmitted in S533 of FIG. 42) has the same content as the request message of the third example of the collection procedure described with reference to FIG. 41. The backhaul information, however, does not include the information which indicates that the backhaul quality information is not included, and thus, for example, the backhaul information has no information.

In addition, among the response messages of the fourth example of the collection procedure, the second response message (the response message transmitted in S539 of FIG. 42) has the same content as the request message of the first example of the collection procedure described with reference to FIG. 36.

Conclusion

In the fourth example, the collection procedure includes requesting provision of the backhaul quality information, and further requesting provision of the backhaul quality information from the communication node that has the backhaul quality information. Accordingly, labor for the requesting source (the entity X) in the collection procedure of the backhaul quality information can be reduced. Further, overhead can be reduced.

(Fifth Example)

Next, the fifth example of the collection procedure will be described with reference to FIG. 43.

Flow of Collection Procedure

Figure 43:
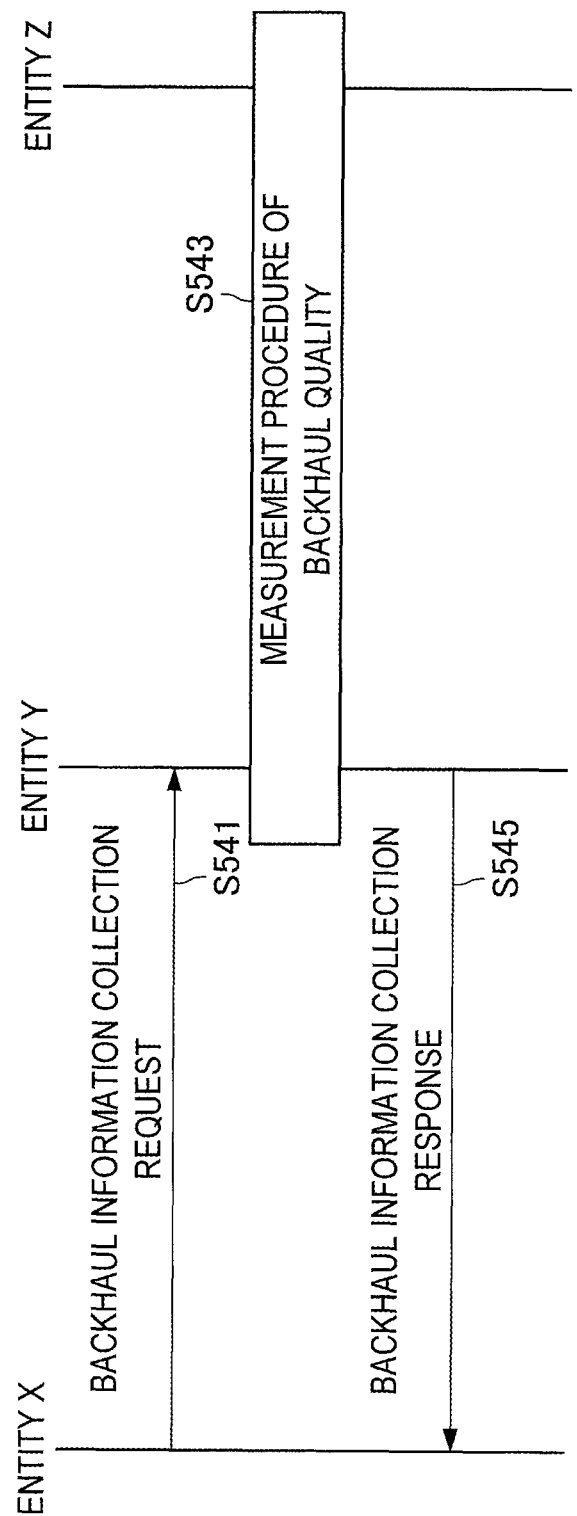
FIG. 43 is a sequence diagram showing an example of the schematic flow of a fifth example of a collection procedure of backhaul quality information.

FIG. 43 is a sequence diagram showing an example of the schematic flow of the fifth example of the collection procedure of backhaul quality information.

With reference to FIG. 43, the entity X transmits a request message regarding collection of information on a backhaul line and the entity Y receives the request message (S541).

Here, the entity Y is not retaining backhaul quality information to be collected, but can generate the backhaul quality information through a measurement procedure. Thus, the backhaul quality measurement procedure is performed between the entity Y and the entity Z and thereby the backhaul quality information to be collected is obtained (S543).

Then, the entity Y transmits a response message regarding collection of information on the backhaul line and the entity X receives the response message (S539). The response message includes the backhaul quality information.

Content of Request Message

The request message of the fifth example of the collection procedure has the same content as the request message of the first example of the collection procedure described with reference to FIG. 36.

Content of Response Message

The response message of the fifth example of the collection procedure has the same content as the response message of the first example of the collection procedure described with reference to FIG. 37.

Conclusion

The collection procedure of the fifth example includes generating the backhaul quality information regarding the quality of the backhaul line through the backhaul line quality measurement procedure. Accordingly, labor for the requesting source (the entity X) in the collection procedure of the backhaul quality information can be reduced. Further, overhead can be reduced.

(Sixth Example)

Next, the sixth example of the collection procedure will be described with reference to FIG. 44.

Note that, in the sixth example of the collection procedure, backhaul line information to be collected is a combination of a plurality of individual backhaul lines. To be specific, for example, backhaul quality information to be collected is backhaul quality information regarding quality of the backhaul line between the entity Y and the entity Z. Further, the backhaul lines include an individual backhaul line between the entity Y and an entity W and an individual backhaul line between an entity W and the entity Z.

Flow of Collection Procedure

An example of the schematic flow of the sixth example of the collection procedure is the same as the example of the schematic flow of the first example of the collection procedure described with reference to FIG. 35.

Content of Response Message

The response message of the sixth example of the collection procedure has the same content as the response message of the first example of the collection procedure described with reference to FIG. 37.

Content of Response Message

FIG. 44 is an illustrative diagram for describing information elements (IEs) included in the response message according to the sixth example of the collection procedure. Referring to FIG. 44, the response message includes backhaul information (backhaul quality information and the like) of the individual backhaul lines. For example, the response message includes backhaul information regarding the backhaul line between the entity Y and the entity W and backhaul information regarding the backhaul line between the entity W and the entity Z.

Conclusion

In the sixth example, the backhaul lines are a combination of the plurality of individual backhaul lines. In addition, the collection procedure includes collecting information regarding the quality of at least one individual backhaul line among the plurality of individual backhaul lines.

Accordingly, considering the quality of an individual backhaul line included in the backhaul lines, for example, application of a control scheme can be controlled more properly. In addition, by collecting information regarding the quality of the individual backhaul lines and combining the information, for example, information regarding the overall quality of the backhaul lines can be collected. For this reason, labor necessary for collecting the information regarding the quality of the backhaul lines can be lessened.

(Other)

It should be noted that, as a technique for collecting backhaul quality information, a request message may be broadcast instead of transmitting the request message to an individual entity. Accordingly, desired backhaul quality information can be collected more quickly.

In addition, an entity serving as a transmission source of a request message may start a timer for collecting backhaul quality information after transmitting the request message. This timer is set with a predetermined period. When no response message is received within the period, for example, the entity determines that collection of the backhaul quality information fails. In addition, when an entity serving as a transmission source of a response message collects backhaul quality information by proxy, for example, the entity serving as the transmission source of the request message may change (for example, prolong) the period of the timer from the content of the response message.

In addition, a request message regarding measuring quality of a backhaul line and/or a response message regarding measuring quality of a backhaul line may include information that indicates a transmission time (time stamp). Accordingly, the quality of the backhaul line can also be measured in the collection procedure.

5. Control of Application of Control Scheme

Next, control of application of a control scheme will be described with reference to FIGS. 45 to 57. Specifically, a decision of application of a control scheme and application and execution of a control scheme will be described.

<5.1. Decision of Application of Control Scheme>

First, a specific example of a decision of application of a control scheme will be described with reference to FIG. 45. As described above, this decision is performed by the control entity 100.

(Unit of Application of Control Scheme)

As described above, a plurality of communication nodes to which a control scheme is applied are classified into, for example, one or more groups, and application of the control scheme to the one or more groups is controlled.

As described above, the plurality of communication nodes are classified into one or more groups based on information on positions of the plurality of communication nodes and information on radio resources used by the plurality of communication nodes, as an example. It should be noted that the plurality of communication nodes may be classified into one or more groups based further on backhaul quality information corresponding to the plurality of communication nodes.

It should be noted that processes described below (computation of an index and decision of application of a control scheme) are performed in each group.

(Computation of Index Used in Deciding Application of Control Scheme)

First, an index T used in deciding to apply a control scheme is computed for two or more communication nodes (i.e., two or more communication nodes included in a group) that are targets of the application of the control scheme. As an example, quality of a backhaul line is delay time, and the index is an index regarding delay time.

First Example of Index

As a first example, the index T is the difference between the worst value and the best value of the quality of a backhaul line used for providing control-related information to the two or more communication nodes.

For example, the quality of a backhaul line i among target backhaul lines is set to $T_i$ and the quality of a backhaul line j among the target backhaul lines is set to $T_j$, the index T is expressed as follows.

$$T = \max_{i,j}|T_i - T_j| \qquad \text{[Math 1]}$$

For example, when three backhaul lines from the control entity 100 (for example, the MME 41) to three execution entities 200 (for example, MeNBs 21) are target backhaul lines, quality of the backhaul lines are set to $T_1$, $T_2$, and $T_3$. In this case, T is set to the largest value among $|T_1-T_2|$, $|T_2-T_3|$, and $|T_3-T_1|$.

By using the index T obtained as above, application of a control scheme can be controlled in accordance with a presumable worst case.

It should be noted that the index may not necessarily be the difference between the worst value and the best value. Since there is also a case in which excluding the best value and the worst value is desirable in a statistical point of view, for example, in such a case, the index may be the difference between, for example, the m-th bad vale and the n-th good value. The m and n may be predetermined by a communication node which computes the index T (for example, the control entity 100), or may be designated by another communication node in the communication system 1.

In addition, the index may be the worst value, rather than the difference between the worst value and the best value. Also in this case, application of a control scheme is controlled in accordance with a presumable worst case.

Second Example of Index

As a second example, the index T may be the average (or variance (for example, standard deviation)) of differences between quality of backhaul lines used for providing control-related information to the two or more communication nodes and a reference value.

Alternatively, the index T may be statistical information (for example, average value, standard deviation, or the like) of the quality of backhaul lines.

As an example, when the index T is the average value of quality of backhaul lines, and the number of target backhaul lines is $N_T$, and the quality of a backhaul line i among the target backhaul lines is set to $T_i$, the index T is expressed, for example, as follows.

$$T = \frac{\sum_{i=1}^{N_T} T_i}{N_T} \quad \text{[Math 2]}$$

As another example, when the index T is the standard deviation of the quality of the backhaul lines, and the number of target backhaul lines is $N_T$, and the quality of the backhaul line i among the target backhaul lines is set to $T_i$, the index T is expressed, for example, as follows.

$$T = \sqrt{\frac{\sum_{i=1}^{N_T} (T_i - T_{ave})^2}{N_T}} \quad \text{[Math 3]}$$

$$T_{ave} = \frac{\sum_{i=1}^{N_T} T_i}{N_T}$$

(Specific Example of a Decision of Application of Control Scheme)

Interference Control Scheme

For example, the control scheme includes an interference control scheme. To be more specific, the control scheme includes, for example, a plurality of interference control schemes (for example, frequency-domain ICIC, time-domain ICIC, BF (null steering), and the like). A decision to apply a control scheme of this case will be described below.

The control entity 100 (application control unit 137), for example, selects one interference control scheme among the plurality of interference control schemes based on the backhaul quality information. The control entity 100 (application control unit 137), for example, selects one interference control scheme among the plurality of interference control schemes based on the index T computed from the backhaul quality information. A specific example of this point will be described below with reference to FIG. 45.

FIG. 45 is an illustrative diagram for describing the specific example of the decision of application of an interference control scheme. Referring to FIG. 45, respective interference control scheme and application conditions thereof are shown. When, the index T (for example, delay time or variance of delay time) exceeds a threshold value $T_{D1}$, application of frequency-domain ICIC in which influence of a delay of a backhaul line is seldom received is decoded. In addition, when the index T is equal to or lower than a threshold value $T_{D4}$, application of BF (null steering) in which influence of a delay of a backhaul line is easily received but highly efficient use of radio resources is exhibited is decided. In this manner, an interference control scheme corresponding to the index T is selected and application of the selected interference control scheme is decided.

Then, as a second step, the control entity 100 (application control unit 137) provides information regarding control in the interference control scheme (for example, a control command) to each communication node (execution entities 200) to which the interference control scheme is applied via each backhaul line.

As described above, an interference control scheme is selected and the selected interference control scheme is applied. Accordingly, interference control suitable for the quality of the backhaul lines can be performed.

Coordinated Multi-Point (CoMP) Transmission and Reception

The control scheme includes, for example, CoMP transmission and reception. A decision of application of the control scheme of this case will be described below.

For example, the control entity 100 (application control unit 137) decides whether to apply CoMP transmission and reception based on the backhaul quality information. For example, when the index T exceeds a certain threshold value (in other words, delay time (or the variance of delay time) among backhaul lines is large), no application of CoMP transmission and reception is decided. In addition, when the index T does not exceed a certain threshold value (in other words, delay time (or the variance of delay time) among backhaul lines is not large), application of CoMP transmission and reception is decided.

As described above, whether to apply CoMP transmission and reception is decided. Accordingly, CoMP transmission and reception is performed as long as the quality of the backhaul lines allows CoMP transmission and reception.

<5.2. Application and Execution of Control Scheme>

Next, specific examples of application and execution of a control scheme will be described with reference to FIGS. 46 to 57. As described above, the application is performed by the control entity 100, and the execution is performed by the execution entity 200.

(Common Feature for Control Scheme)

First, common features for the control schemes (for example, frequency-domain ICIC, time-domain ICIC, BF, and CoMP transmission and reception) with regard to application and execution of a control scheme will be described.

Flow of Process

Application of Control Scheme in Downlink (DL)

FIG. 46 is an illustrative diagram for describing the flow of a process of application and execution of a control scheme in downlink.

First, the control entity 100 transmits a control command to the execution entity 200 (S601). This control command includes information indicating the type of a control scheme, a parameter necessary for controlling in the control scheme, and the like. The content of the control command of each control scheme will be described below in detail. Then, the execution entity 200 transmits a command response message (S603). With this command response message, the control entity 100 can ascertain the reception state of the control command.

Then, the execution entity 200 changes an operation parameter for controlling in the control scheme indicated by the control command based on the control command (S605). Accordingly, control in the control scheme is performed. Then, the execution entity 200 transmits control information (scheduling information, a modulation and coding set (MCS), precoder information, and the like), and data in downlink (S607). For example, the control information is transmitted on a PDCCH, and the data is transmitted on a PDSCH. Then, the UE 31 transmits ACK/NACK to the execution entity 200 (S609).

It should be noted that, when the control scheme is CoMP transmission and reception, transmission of data to the execution entity 200 which performed CoMP transmission and reception can be further performed at least prior to transmission of the control information and the data by the execution entity 200 (S607).

Application of Control Scheme in Uplink (UL)

FIG. 47 is an illustrative diagram for describing the flow of a process of application and execution of a control scheme in uplink.

First, the control entity 100 transmits a control command to the execution entity 200 (S621). Then, the execution entity 200 transmits a command response message (S623). Then, the execution entity 200 changes an operation parameter for controlling in the control scheme indicated by the control command based on the control command (S625). Accordingly, control in the control scheme is performed. Then, the execution entity 200 transmits control information (scheduling information, a modulation and coding set (MCS), precoder information, and the like) in downlink (S627). For example, the control information is transmitted on a PDCCH. Then, the UE 31 transmits data in uplink according to scheduling information of uplink (S629). For example, the data is transmitted on a PUSCH. Then, the execution entity 200 transmits ACK/NACK to the UE 31 (S631).

It should be noted that, instead of or along with the change of the operation parameter in the execution entity 200, a change of an operation parameter may be performed in the UE 31. In this case, the control entity 200 transmits the operation parameter to the UE 31, and the UE 31 may receive and set the operation parameter. As an example, when BF (null steering) is performed by the UE 31, a parameter for the BF (for example, an antenna weighting factor, transmission power, or the like) is transmitted to the UE 31, and set by the UE 31.

Content of Command Response Message

FIG. 48 is an illustrative diagram for describing an example of the content of a command response message to a control command. Referring to FIG. 48, the command response message includes the transmission source (execution entity 200) of the command response message, and the destination (control entity 100) of the command execution message. In addition, the command response message includes ACK or NACK. Further, when NACK is included, the command response message includes the reason for NACK. The reason can be helpful for the control entity 100 to deal with a following situation.

Category of Reason

FIG. 49 is an illustrative diagram for describing an example of categories of the reason for NACK included in the command response message. Referring to FIG. 49, the categories of the reason for NACK include, for example, error detection resulting from a communication error (index 0), incompatible with a control scheme (index 1), out-of-range of the amount of control parameters (index 2), out-of-range of a control start time (index 3), and others (index 4).

(Feature of Frequency-Domain ICIC)

Next, features of frequency-domain ICIC will be described.

Content of Command Response Message

FIG. 50 is an illustrative diagram for describing an example of the content of a control command of frequency-domain ICIC.

Referring to FIG. 50, first, the control command includes the transmission source of the control command (the control entity 100) and the destination of the control command (the execution entity 200).

In addition, the control command includes the control scheme class ID for identifying the control scheme. In this case, the control scheme class ID is a class ID of frequency-domain ICIC.

In addition, the control command includes information indicating when the control command is to be applied (for example, a time at which execution of control in the control scheme is started). Further, the control command includes information of a frequency resource to be used in frequency-domain ICIC (an RB, an RB group, a CC, a set thereof, or the like). The execution entity 200 changes an operation parameter so that resource allocation (scheduling) is performed in the range of the frequency resource indicated by the control command from the time indicated by the control command. As a result, frequency-domain ICIC is realized.

It should be noted that, when FFR is used, the execution entity 200 may perform resource allocation (scheduling) of a frequency resource other than the frequency resource indicated by the control command. In addition, the control command may include information that indicates a frequency resource that is not supposed to be used in frequency-domain ICIC, instead of information that indicates a frequency resource that is supposed to be used in frequency-domain ICIC. In this case, the execution entity 200 may change the operation parameter so that resource allocation (scheduling) is performed in the range of the frequency resource other than the frequency resource indicated by the control command.

Furthermore, when FFR is used, the control command includes information that indicates the amount of power.

Flow of Process of Execution Entity

Figure 51A:
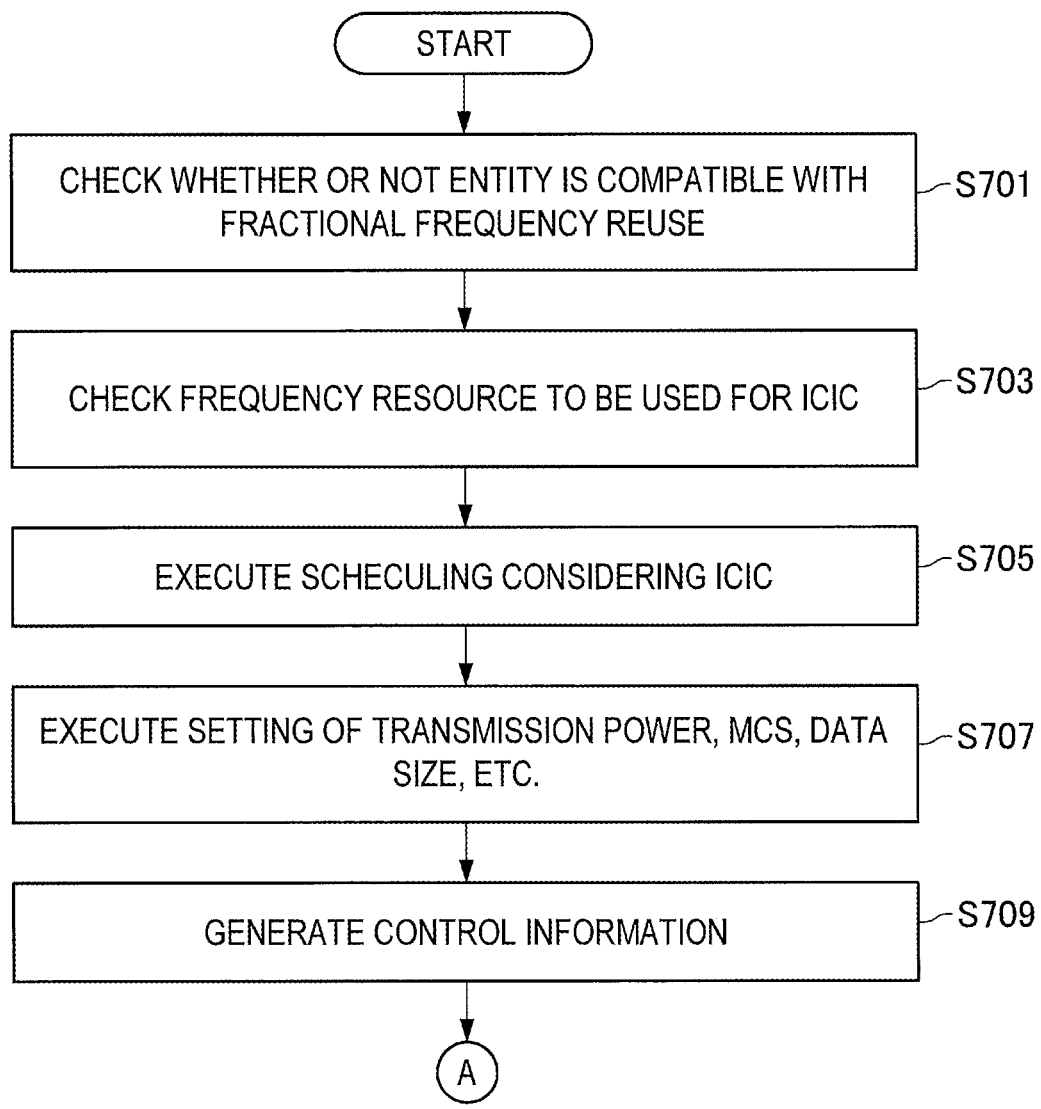
FIG. 51A is (the first half of) a flowchart showing an example of the schematic flow of a process of an execution entity when frequency-domain ICIC is applied.
Figure 51B:
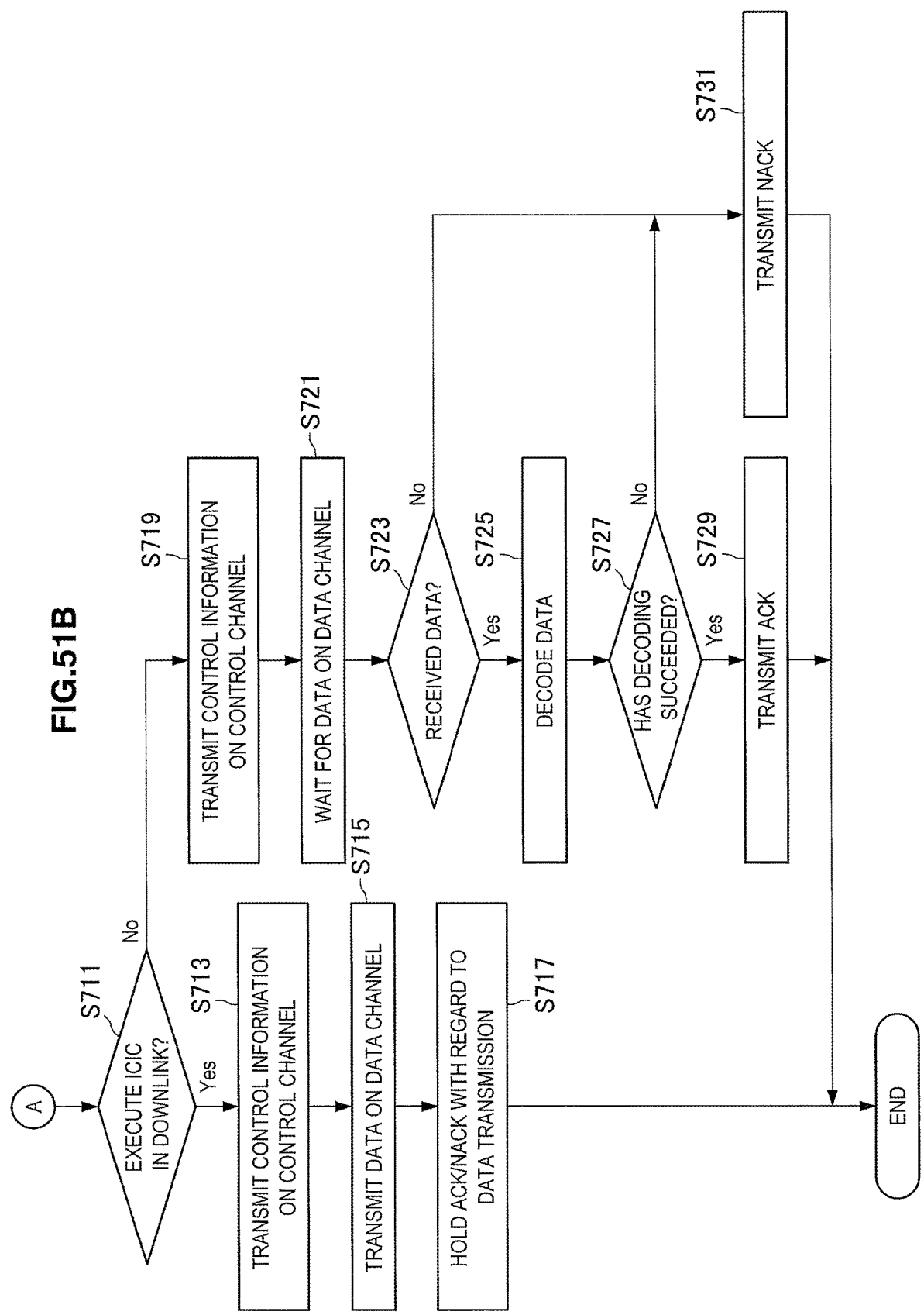
FIG. 51B is (the second half of) the flowchart showing the example of the schematic flow of the process of the execution entity when frequency-domain ICIC is applied.

FIGS. 51A and 51B are flowcharts showing an example of the schematic flow of a process of the execution entity 200 when frequency-domain ICIC is applied. This process is executed after reception of a control command from the control entity 100.

The execution entity 200 checks whether the entity is compatible with FFR (S701). In addition, the execution entity 200 checks a frequency resource to be used for ICIC (S703). Then, the execution entity 200 performs scheduling considering ICIC (S705). In addition, the execution entity 200 performs a setting of transmission power, an MCS, a data size, and the like (S707). Further, the execution entity 200 generates control information to be provided to a communication partner (UE 31) (S709).

Then, when ICIC is executed in downlink (S711: Yes), the execution entity 200 transmits data on a data channel (for example, a PDSCH) (S715) while transmitting the control information on a control channel (for example, a PDCCH) (S713). Then, the execution entity 200 waits for ACK/NACK with respect to the data transmission (S717).

On the other hand, when ICIC is executed in uplink (S711: No), the execution entity 200 transmits the control information on a control channel (for example, a PDCCH) (S719), and waits for data to be transmitted in uplink on a data channel (for example, a PDSCH) (S721). Then, when the data is received (S723: Yes), the execution entity 200 decodes the data (S725). Further, when decoding has succeeded (S727: Yes), the execution entity 200 transmits ACK (S729), or when decoding has failed (S727: No), the execution entity transmits NACK (S731). It should be noted that, when no data has been received (S723: No), the execution entity 200 also transmits NACK (S731).

(Feature of Time-Domain ICIC)

Next, features of time-domain ICIC will be described.

Content of Command Response Message

FIG. 52 is an illustrative diagram for describing an example of the content of a control command of time-domain ICIC.

Referring to FIG. 52, the transmission source of the control command, the destination of the control command, the control scheme class ID, and information that indicates when the control command is to be applied are included, like the control command of frequency-domain ICIC described with reference to FIG. 50. In this example, the control scheme class ID is the class ID of time-domain ICIC.

Particularly in time-domain ICIC, the control command includes information of a time resource (a subframe, a subframe group, a radio frame, a set thereof, or the like) to be used in time-domain ICIC. The execution entity 200 changes an operation parameter so that resource allocation (scheduling) is performed in the range of the time resource indicated by the control command from a time indicated by the control command. As a result, time-domain ICIC is realized.

It should be noted that, when Reduced Power ABS is used, the execution entity 200 may perform resource allocation (scheduling) of a time resource other than the time resource indicated by the control command. In addition, the control command may include information that indicates a time resource that is not supposed to be used in time-domain ICIC, instead of information that indicates a time resource that is supposed to be used in time-domain ICIC. In this case, the execution entity 200 may change the operation parameter so that resource allocation (scheduling) is performed in the range of the time resource other than the time resource indicated by the control command.

Furthermore, when Reduced Power ABS is used, the control command includes information that indicates the amount of power.

Flow of Process of Execution Entity

Figure 53A:
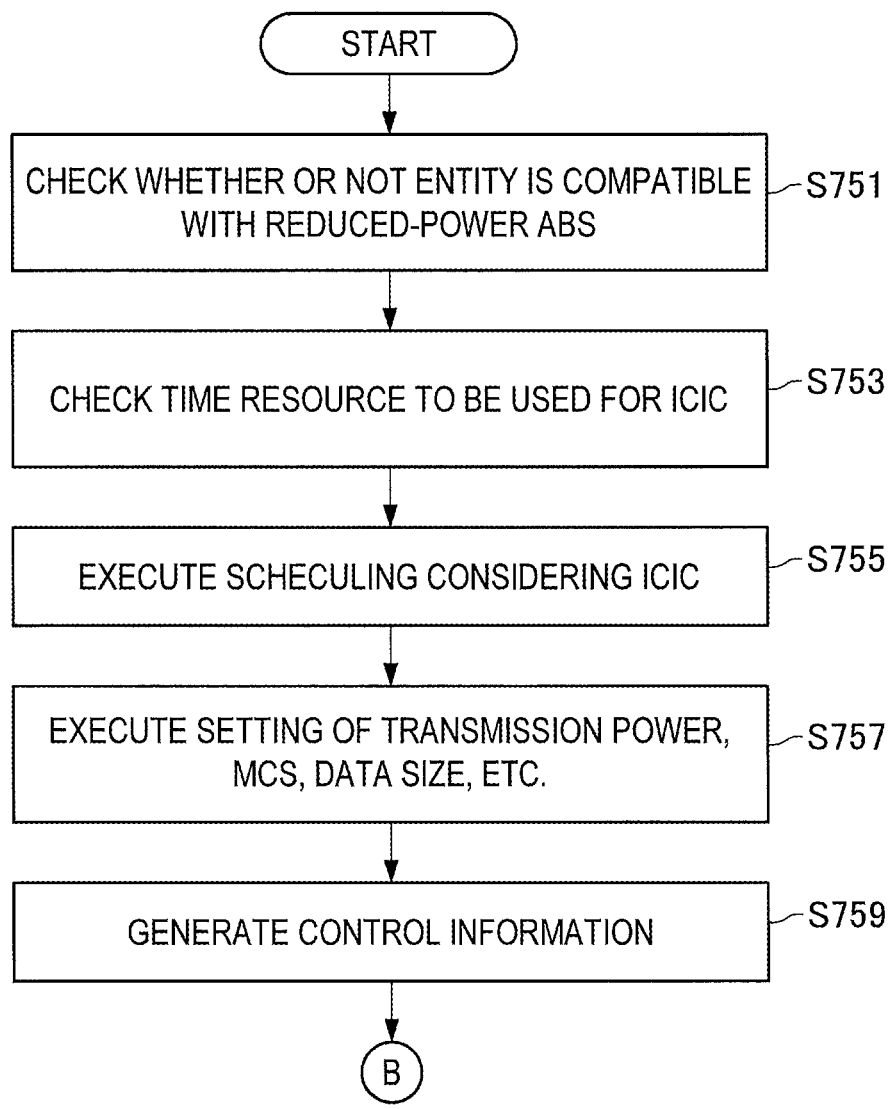
FIG. 53A is (the first half of) a flowchart showing an example of the schematic flow of a process of an execution entity when time-domain ICIC is applied.
Figure 53B:
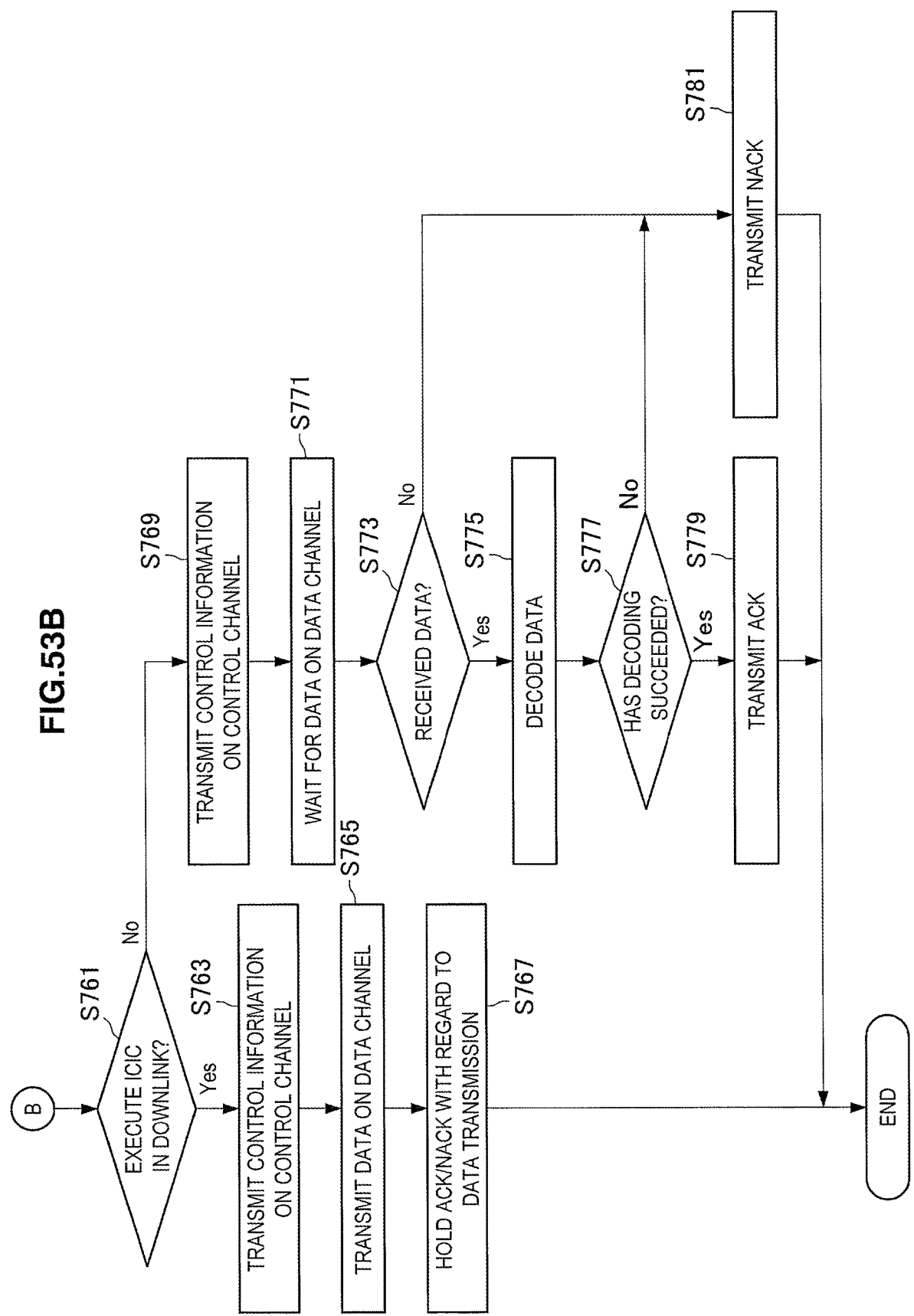
FIG. 53B is (the second half of) the flowchart showing the example of the schematic flow of the process of the execution entity when time-domain ICIC is applied.

FIGS. 53A and 53B are flowcharts showing an example of the schematic flow of a process of the execution entity 200 when time-domain ICIC is applied. This process is executed after reception of a control command from the control entity 100. The execution entity 200 checks whether the entity is compatible with Reduced Power ABS (S751). In addition, the execution entity 200 checks a time resource to be used for ICIC (S753). Then, the execution entity 200 performs scheduling considering ICIC (S755). In addition, the execution entity 200 performs a setting of transmission power, an MCS, a data size, and the like (S757). Further, the execution entity 200 generates control information to be provided to a communication partner (UE 31) (S759).

Then, when ICIC is executed in downlink (S761: Yes), the execution entity 200 transmits data on a data channel (for example, a PDSCH) (S765) while transmitting the control information on a control channel (for example, a PDCCH) (S763). Then, the execution entity 200 waits for ACK/NACK with respect to the data transmission (S767). On the other hand, when ICIC is executed in uplink (S761: No), the execution entity 200 transmits the control information on a control channel (for example, a PDCCH) (S769), and waits for data to be transmitted in uplink on a data channel (for example, a PDSCH) (S771). Then, when the data is received (S773: Yes), the execution entity 200 decodes the data (S775). Further, when decoding has succeeded (S777: Yes), the execution entity 200 transmits ACK (S779), or when decoding has failed (S777: No), the execution entity transmits NACK (S781). It should be noted that, when no data has been received (S773: No), the execution entity 200 also transmits NACK (S781).

(Feature of Beam Forming (Null Steering))

Next, features of BF (null steering) will be described.

Content of Command Response Message

FIG. 54 is an illustrative diagram for describing an example of the content of a control command of time-domain ICIC.

Referring to FIG. 52, the transmission source of the control command, the destination of the control command, the control scheme class ID, and information that indicates when the control command is to be applied are included, like the control command of frequency-domain ICIC described with reference to FIG. 50. In this example, the control scheme class ID is the class ID of BF.

Particularly in BF, the control command includes information that indicates a weighting factor (or a set thereof) to be used. The execution entity 200 changes an operation parameter so that BF is performed with the weighting factor indicated by the control command from the time indicated by the control command. As a result, BF (null steering) is realized.

It should be noted that, instead of or along with the weighting factor of an antenna, the control command may include information that indicates an angular range to be covered by BF.

Flow of Process of Execution Entity

Figure 55:
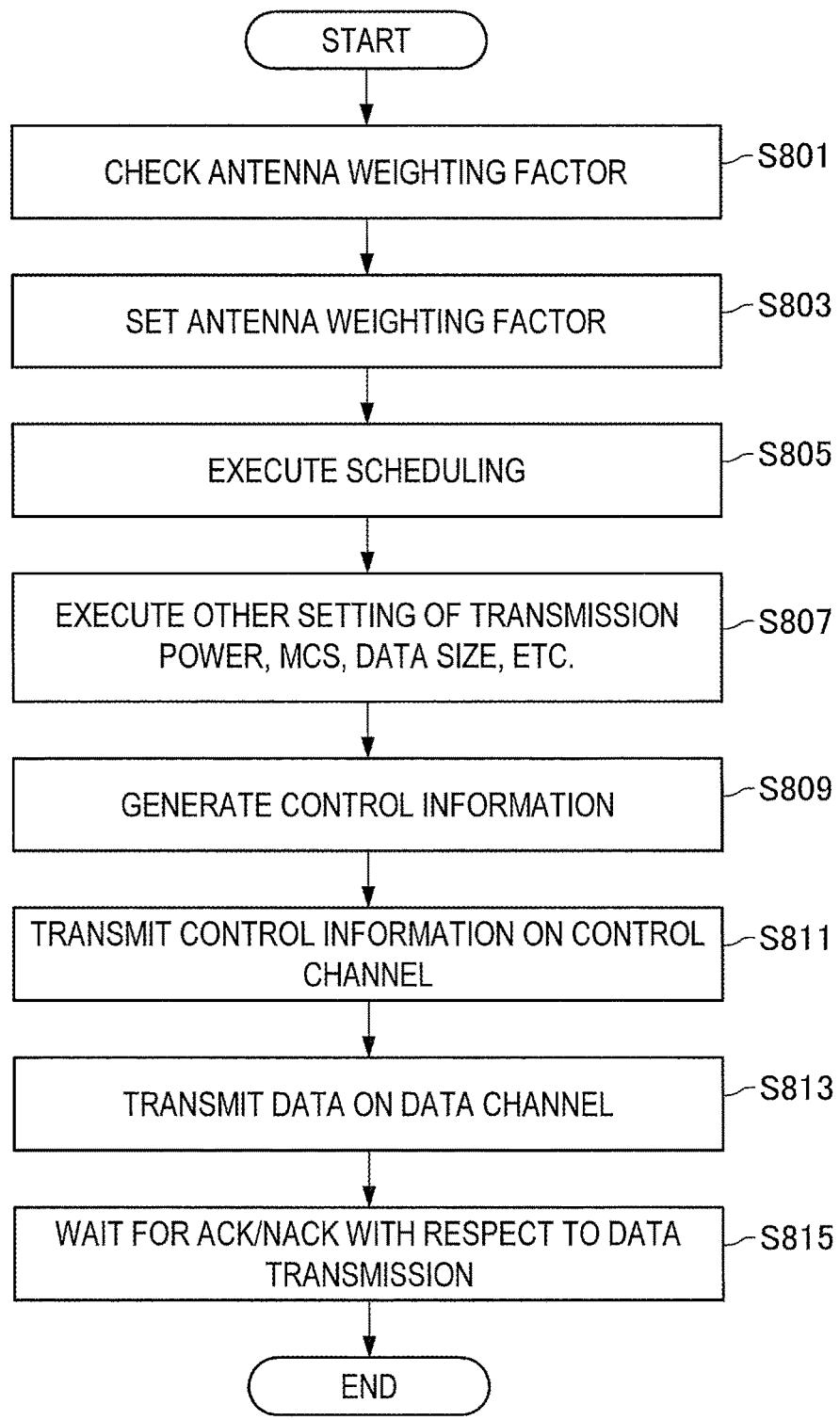
FIG. 55 is a flowchart showing an example of the schematic flow of a process of an execution entity 200 when BF (null steering) is applied.

FIG. 55 is a flowchart showing an example of the schematic flow of a process of the execution entity 200 when BF (null steering) is applied. This process is executed after reception of a control command from the control entity 100.

The execution entity 200 checks the weighting factor of an antenna from the control command (S801), and sets antenna weighting (S803). In addition, the execution entity 200 performs scheduling (S805), and performs a setting of transmission power, an MCS, a data size, and the like (S807). Then, the execution entity 200 generates control information to be provided to a communication partner (UE 31) (S809).

Then, the execution entity 200 transmits data on a data channel (for example, a PDSCH) (S813) while transmitting the control information on a control channel (for example, a PDCCH) (S811). Then, the execution entity 200 waits for ACK/NACK with respect to the data transmission (S815).

It should be noted that, although the example in which BF (null steering) is performed by the execution entity 200 in downlink has been described with reference to FIG. 55, BF (null steering) may be performed by the UE 31 in uplink. In this case, the execution entity 200 may transmit various parameters (for example, the antenna weighting factor, transmission power, etc.) to the UE 31, and the UE 31 may receive and set the various parameters. In addition, the UE 31 may transmit data on a data channel according to control information. Accordingly, the UE 31 can transmit data while performing BF (null steering).

(Feature of CoMP Transmission and Reception)

Next, features of CoMP transmission and reception will be described.

Content of Command Response Message

FIG. 56 is an illustrative diagram for describing an example of the content of a control command of CoMP transmission and reception.

Referring to FIG. 56, the transmission source of the control command, the destination of the control command, the control scheme class ID, and information that indicates when the control command is to be applied are included, like the control command of frequency-domain ICIC described with reference to FIG. 50. In this example, the control scheme class ID is the class ID of CoMP transmission and reception. Particularly in CoMP transmission and reception, the control command includes the ID of the execution entity 200 involved in the CoMP transmission and reception and the ID of a UE to which CoMP transmission and reception is applied.

Furthermore, particularly in CoMP transmission and reception, the control command includes information of a frequency resource to be used (an RB, a set of RBs, a set thereof, or the like) and a time resource to be used (a subframe, a subframe group, or a set of them, or the like). It should be noted that a frequency resource and a time resource may be decided by the execution entity 200 later, not by the control entity 100.

In addition, the control command includes the ID of a precoder to be used.

Flow of Process of Execution Entity

Figure 57A:
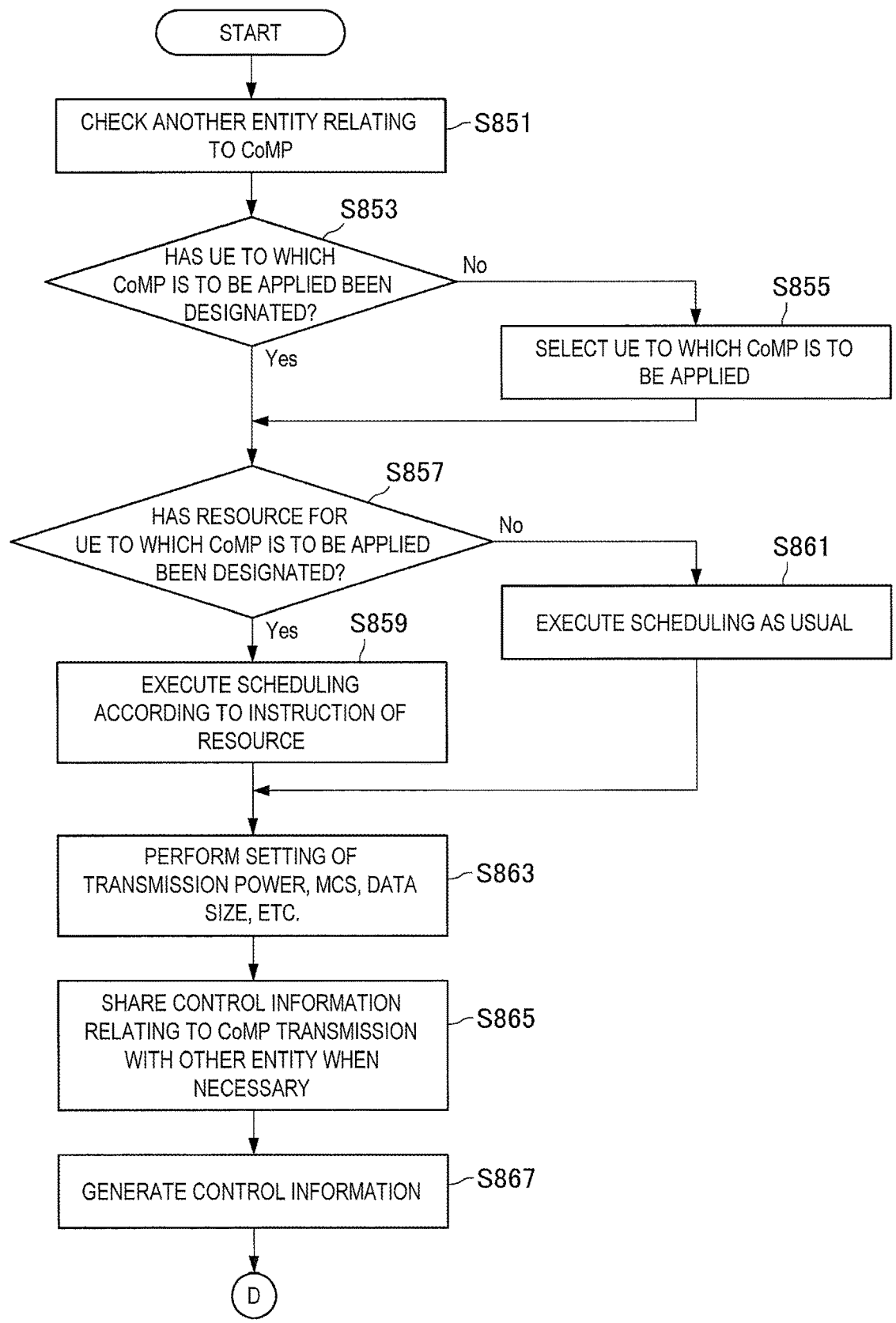
FIG. 57A is (the first half of) a flowchart showing an example of the schematic flow of a process of an execution entity when CoMP transmission and reception is applied.
Figure 57B:
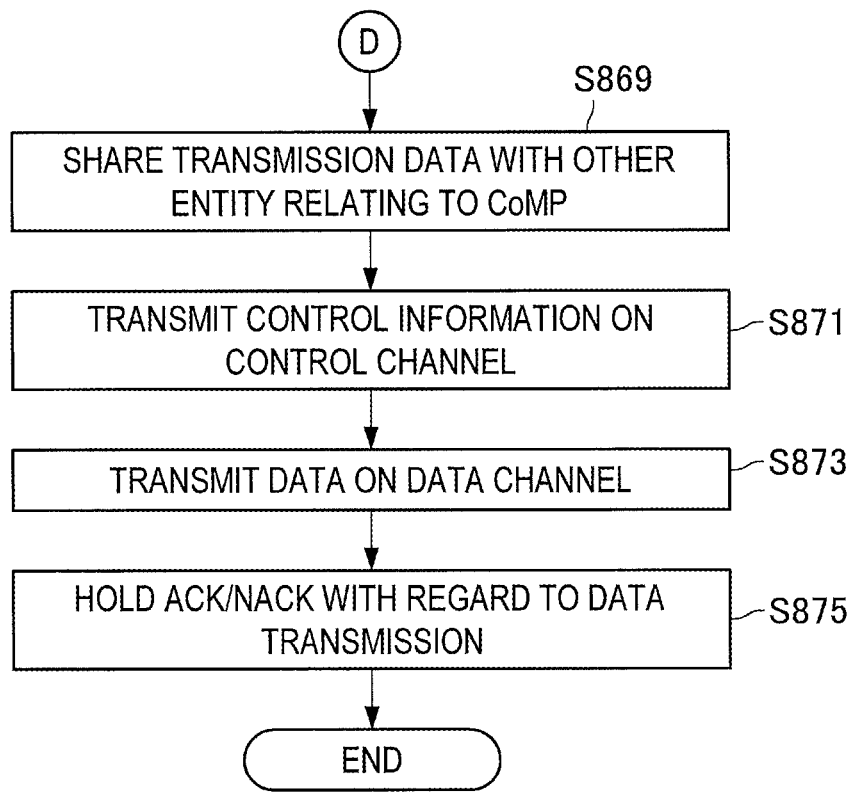
FIG. 57B is (the second half of) the flowchart showing the example of the schematic flow of the process of the execution entity when CoMP transmission and reception is applied.

FIGS. 57A and 57B are flowcharts showing an example of the schematic flow of a process of the execution entity 200 when CoMP transmission and reception is applied. This process is executed after reception of a control command from the control entity 100.

The execution entity 200 checks another entity relating to CoMP transmission and reception (S851). Then, when no UE to which CoMP transmission and reception is to be applied has been designated (S853: No), the execution entity 200 selects a UE to which CoMP transmission and reception is to be applied (S855).

In addition, when a resource has been designated to the UE to which CoMP transmission and reception is to be applied (S857: Yes), the execution entity 200 performs scheduling according to an instruction of the resource (S859). On the other hand, when no resource has been designated to the UE to which CoMP transmission and reception is to be applied (S857: No), the execution entity 200 performs scheduling as usual (S861). Further, the execution entity 200 performs a setting of transmission power, an MCS, a data size, and the like (S863).

In addition, the execution entity 200 shares control information relating to CoMP transmission and reception (the UE to which CoMP transmission and reception is to be applied, scheduling information, the MCS, the data size, and the like) with the other entity relating to CoMP transmission and reception when necessary (S865). Further, the execution entity 200 generates control information to be provided to a communication partner (UE 31) (S867).

Further, the execution entity 200 shares transmission data with the other entity relating to CoMP transmission and reception (S869).

Then, the execution entity 200 transmits data on a data channel (for example, a PDSCH) (S873) while transmitting the control information on a control channel (for example, a PDCCH) (S871). Then, the execution entity 200 waits for ACK/NACK with respect to the data transmission (S875).

It should be noted that, although the example in which CoMP transmission and reception in downlink is performed has been described with reference to FIGS. 57A and 57B, CoMP transmission and reception may be performed in uplink. In other words, data transmitted from the UE 31 may be received and combined by both of the execution entity 200 and the other entity. In this case, rather than sharing and transmitting transmitted data in a coordinated manner, the execution entity 200 and the other execution entity receive the data transmitted from the UE 31 together and one of the execution entity 200 and the other execution entity may combine the received data. According, CoMP transmission and reception in uplink is possible.

6. Others

Next, adjustment of an operation timing, filtering of backhaul quality information, and setting of an application time of a control command will be described with reference to FIGS. 58 to 65.

<6.1. Adjustment of Operation Timing>

First, adjustment of an operation timing will be described with reference to FIGS. 58 to 65.

Quality of a backhaul line is a very important matter as described above, and it also significantly influences decision of application of a control scheme. For this reason, adjusting an operation timing in the execution entity 200 is effective to reduce the influence of the quality of a backhaul line and improve superiority of application of a control scheme.

An operation timing of a base station such as an eNB, for example, is sometimes adjusted using, for example, a time of a Global Positioning System (GPS), or the like. An operation timing, however, is not adjusted according to quality of a backhaul line. This is because there is almost no problem when an operator of a communication system facilitates backhaul lines.

Adjustment Procedure of Operation Timing

Figure 58:
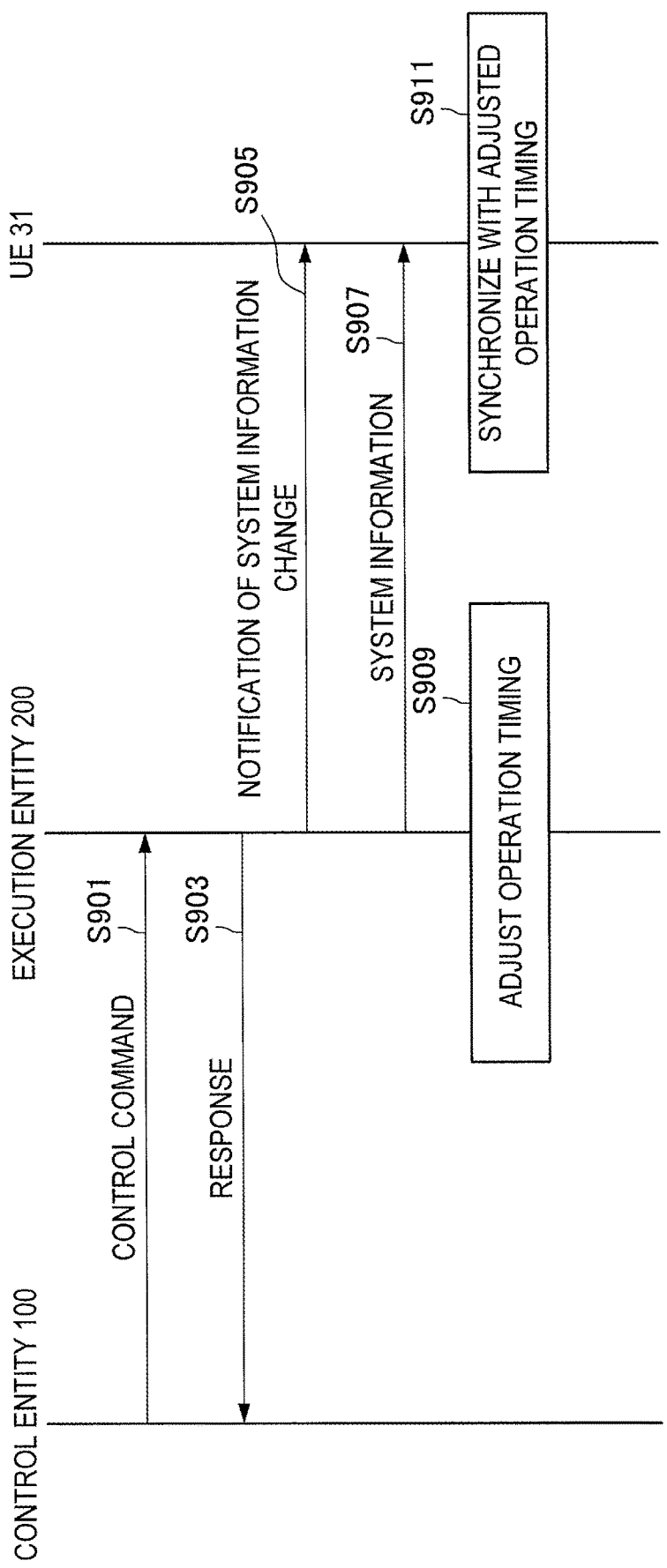
FIG. 58 is a sequence diagram showing an example of the schematic flow of the adjustment procedure of an operation timing of the execution entity.

FIG. 58 is a sequence diagram showing an example of the schematic flow of an adjustment procedure of an operation timing of the execution entity 200.

The control entity 100 transmits a control command for adjusting an operation timing, and the execution entity 200 receives the control command (S901). Then, the execution entity 200 transmits a response message to the control command (S903).

Then, the execution entity 200 performs notification of a system information change (S905), and then gives a notification of changed system information (S907).

Then, the execution entity 200 adjusts an operation timing to a predetermined timing (S909), and the UE 31 synchronizes to the adjusted operation timing (S911).

Content of Control Command

FIG. 59 is an illustrative diagram for describing information elements (IEs) included in a control command for adjusting an operation timing. Referring to FIG. 59, the control command includes the transmission source and the destination of the control command. In addition, the control command includes information on the adjustment amount of the operation timing and information on when adjustment is to start (adjustment start time).

Content of Response Command

FIG. 60 is an illustrative diagram for describing information elements (IEs) included in a response message to the control command for adjusting the operation timing. Referring to FIG. 60, the response message includes information on the transmission source and the destination of the response message. In addition, the response message includes ACK/NACK. Further, when NACK is included, the response message includes the reason for NACK. With the information of the reason, the control entity 100 can ascertain a time at which the operation timing can be adjusted, information on an adjustable amount of the operation timing, and the like, and thus can attempt readjustment. Hereinbelow, categories of the reason will be described with specific examples with reference to FIG. 61.

FIG. 61 is an illustrative diagram for describing an example of the categories of the reason for NACK included in the response message to the control command for adjusting the operation timing. Referring to FIG. 61, the categories of the reason for NACK include, for example, error detection resulting from a communication error (index 0), no response to adjustment of the operation timing (index 1), out-of-range of the adjustment amount of the operation timing (index 2), out-of-range of an operation timing adjustment start time (index 3), and others (index 4).

Content of Notification of System Information Change

FIG. 62 is an illustrative diagram for describing information elements (IEs) regarding adjustment of an operation timing included in a notification of a system information change. Referring to FIG. 62, the notification of the system information change includes a flag for indicating that the operation timing will be adjusted, and scheduling information of system information including information regarding the adjustment. Accordingly, the UE 31 can ascertain whether the operation timing will be adjusted, and when the information regarding the adjustment of the operation timing will be transmitted when adjustment has been performed.

Content of System Information

FIG. 63 is an illustrative diagram for describing information elements (IEs) regarding adjustment of the operation timing included in the system information. Referring to FIG. 63, the system information includes information of the transmission source of a control message, information of the adjusted amount of the operation timing, and information of when the operation timing will be adjusted (operation timing adjustment time).

Process of Execution Entity in Operation Timing Adjustment Procedure

Figure 64:
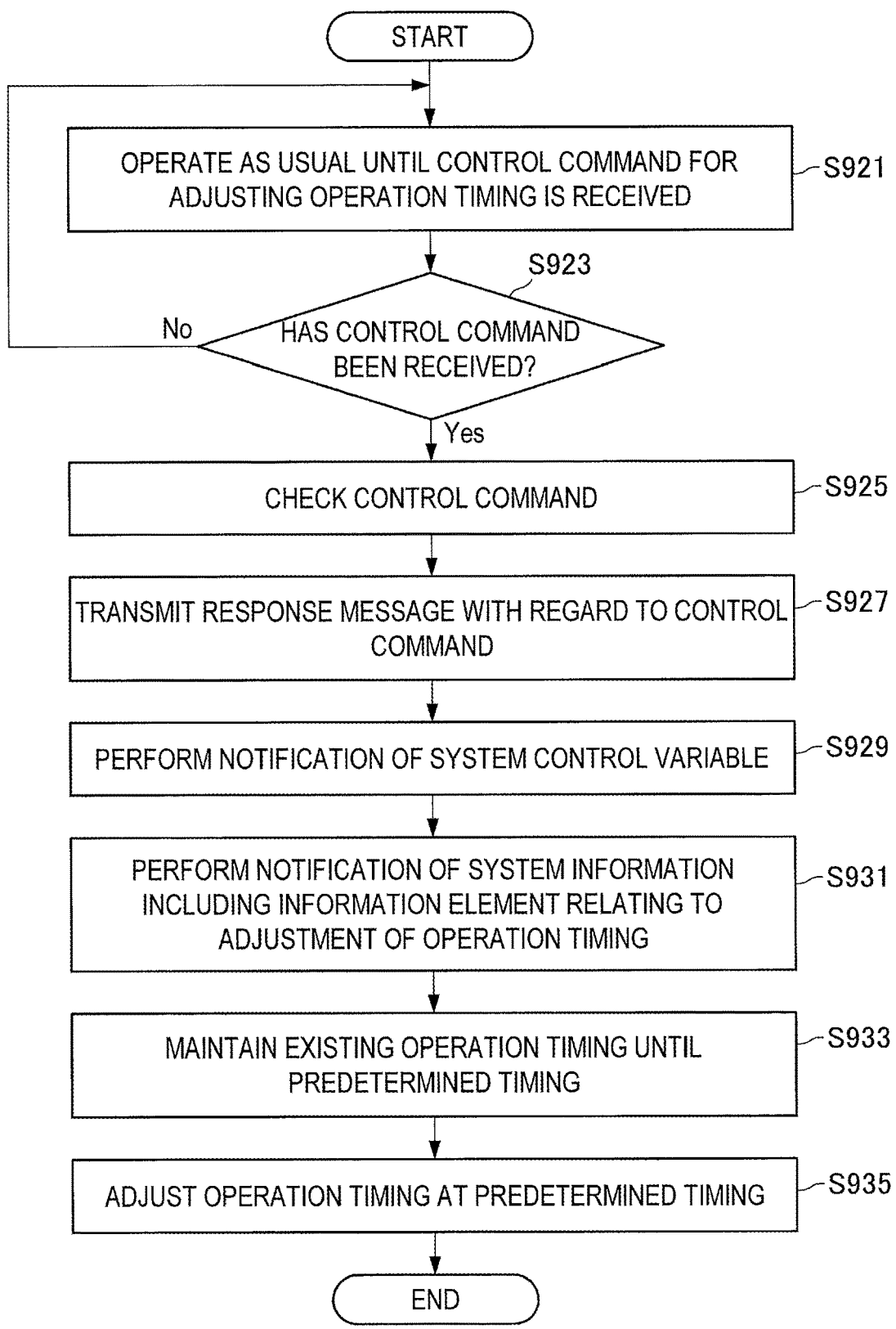
FIG. 64 is a sequence diagram showing an example of the schematic flow of a process of an execution entity in an operation timing adjustment procedure.

FIG. 64 a sequence diagram showing an example of the schematic flow of a process of the execution entity 200 in an operation timing adjustment procedure. The execution entity 200 operates as usual until a control command for adjusting the operation timing is received (S921), and when a control command has been received (S923: Yes), the execution entity checks the control command (S925), and transmits a response message with respect to the control command (S927).

Then, the execution entity 200 performs notification of a system information change (S929), and then gives a notification of system information including information elements regarding adjustment of the operation timing (S931). In addition, the execution entity 200 maintains the existing operation timing until a predetermined time (S933), and then adjusts the operation timing at the predetermined timing (S935). Then, the process ends.

Operation of UE in Operation Timing Adjustment Procedure

Figure 65:
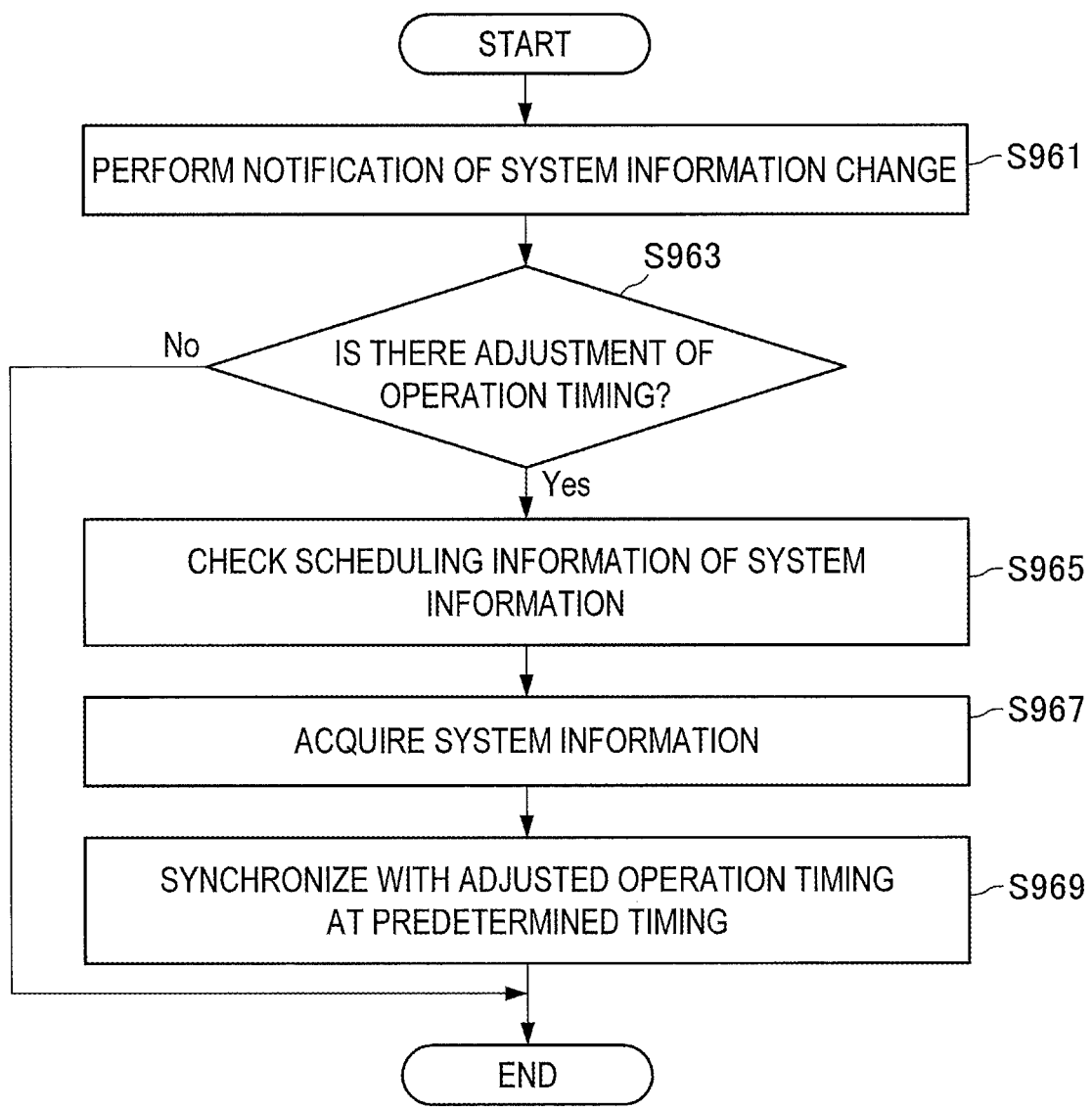
FIG. 65 is a sequence diagram showing an example of the schematic flow of a process of an UE in the operation timing adjustment procedure.

FIG. 65 is a sequence diagram showing an example of the schematic flow of a process of a UE 31 in the operation timing adjustment procedure.

Upon receiving the notification of the system information change, the UE 31 checks the notification (S961), and determines whether there is adjustment of the operation timing (S963). When there is no adjustment of the operation timing, the process ends.

When there is adjustment of the operation timing, the UE 31 checks scheduling information of the system information (S965), and when the system information is notified of thereafter, the UE acquires the system information (S967). Then, the UE 31 synchronizes with the adjusted operation timing at a predetermined timing (S969). Then, the process ends.

<6.2. Filtering of Backhaul Quality Information>

Next, filtering of backhaul quality information will be described. There is a possibility of a certain entity (for example, the control entity 100, the execution entity 200, or the like) accumulating a plurality of samples of backhaul quality information for the same backhaul line according to a passage of time. Therefore, the backhaul quality information regarding the backhaul line can also be smoothed by processing the plurality of samples.

The backhaul quality information includes, for example, information of quality (for example, delay time) of the backhaul line. Thus, when a k-th sample of the quality of a backhaul line i is set to $T_{i,k}$ and the number of samples is set to $N_{sample}$, smoothed backhaul quality $T_i$ can be expressed by the average value as follows.

$$T_i = \frac{\sum_{i=1}^{N_{sample}} T_{i,k}}{N_{sample}} \quad \text{[Math 4]}$$

It should be noted that the number of samples $N_{sample}$ may be decided by an entity having samples or may be designated by any entity (for example, the control entity 100).

As another example in addition to the average value, a filtering coefficient can also be used. For example, when a k-th sample of the quality of a backhaul line i is set to $T_{i,k}$ and a filtering coefficient is set to a, backhaul quality $T_i(n)$ when the number of samples is n can be expressed as follows.

$$T_i(n) = (1-a)T_i(n-1) + aT_{i,n} \quad \text{[Math 5]}$$

It should be noted that the filtering coefficient a may also be decided by an entity having samples, or may be designated by any entity (for example, the control entity 100). In addition, the filtering coefficient a is defined as follows, and a variable k may be decided or designated.

$$a = \left(\frac{1}{2}\right)^{\frac{k}{4}} \quad \text{[Math 6]}$$

As still another example, without processing the plurality of samples, the latest sample may be used as quality of the backhaul line as follows.

$$T_i(n) = T_{i,n} \quad \text{[Math 7]}$$

It should be noted that this corresponds to a case in which number of samples $N_{sample}$ is 1 in the example of the average value and a case in which the filtering coefficient a is 1 in the example using the filtering coefficient a.

For example, the above information of the quality of the backhaul line is included in the backhaul quality information.

<6.3. Setting of Application Timing of Control Command>

Next, a setting of an application timing of a control command will be described.

As described above, a control command includes information that indicates when the control command is to be applied (for example, a time at which execution of control in a control scheme is started) as an information element. This information is set by, for example, the control entity 100.

As an example, the information can be set based on the quality (for example, delay time) of the backhaul line between the execution entity 200 that is a control target (for example, the execution entity 200 classified into the same group) and the control entity 100 which transmits the control command.

A time at which execution of control in a control scheme is started is set based on, for example, the worst quality (longest delay time) among the quality (for example, delay time) of a plurality of backhaul lines between the execution entity 200 that is the control target and the control entity 100.

As an example, a time at which execution of control in a control scheme is started is the time obtained as a result of adding the longest delay time to a transmission scheduled time of a control command.

By setting a control command application timing according to quality of backhaul lines as above, it is possible to cause all execution entities 200 which are control targets to execute control in a control scheme.

8. Application Example

The technology according to the present disclosure can be applied to various products. For example, an entity (the control entity 100 or the execution entity 200) may be realized as any type of server such as a tower server, a rack server, or a blade server. In addition, at least some constituent elements of an entity (the control entity 100 or the execution entity 200) may be realized in a module (for example, an integrated circuit module configured with a single die or a card or a blade inserted into a slot of a blade server) mounted in a server.

In addition, an entity (the control entity 100 or the execution entity 200) may be realized as, for example, any type of evolved Node B (eNB) such as a macro eNB or a small eNB. A small eNB may be an eNB which covers a smaller cell than a macrocell, such as a pico eNB, a micro eNB, or a home (femto) eNB. Instead, an entity (the control entity 100 or the execution entity 200) may be realized as, for example, another type of base station such as a Node B or a base transceiver station (BTS). An entity (the control entity 100 or the execution entity 200) may include a main body which controls radio communication (which is also referred to as a base station device) and one or more remote radio heads (RRHs) disposed in a different place from the main body. In addition, the execution entity 200 may be an RRH. Furthermore, various types of terminals to be described below may operate as the execution entity 200 by executing the function of a base station temporarily or permanently. Furthermore, at least some constituent elements of the entity may be realized in a base station device or a module for a base station device.

For example, the execution entity 200 may be realized as a mobile terminal such as a smartphone, a tablet personal computer (PC), a notebook PC, a portable game terminal, a portable/dongle type mobile router, or a digital camera, or an in-vehicle terminal such as a car navigation apparatus. The execution entity 200 may also be realized as a terminal (that is also referred to as a machine type communication (MTC) terminal) that performs machine-to-machine (M2M) communication. Furthermore, at least some constituent elements of the execution entity 200 may be realized in a radio communication module (such as an integrated circuit module configured with a single die) mounted on each of the terminals.

(First Application Example)

Figure 66:
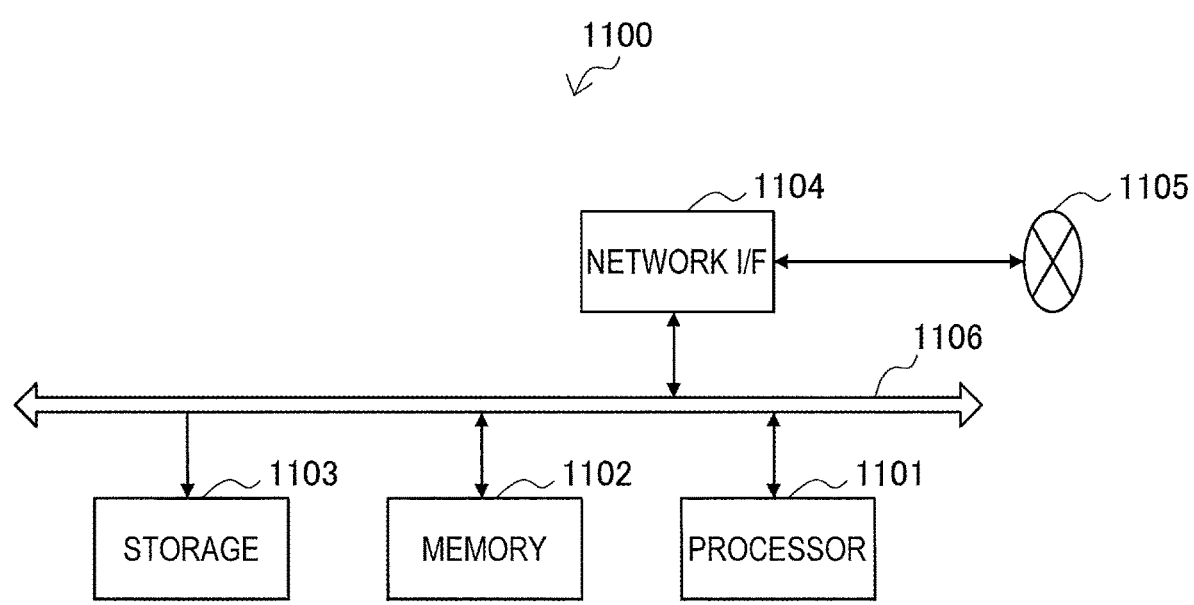
FIG. 66 is a block diagram showing an example of a schematic configuration of a server.

FIG. 66 is a block diagram showing an example of a schematic configuration of a server 1100 to which the technology of the present disclosure can be applied. The server 1100 includes a processor 1101, a memory 1102, a storage 1103, a network interface 1104, and a bus 1106.

The processor 1101 may be, for example, a central processing unit (CPU) or a digital signal processor (DSP), and controls various functions of the server 1100. The memory 1102 includes a random access memory (RAM) and a read only memory (ROM), and stores programs executed by the processor 1101 and data. The storage 1103 can include a storage medium such as a semiconductor memory or a hard disk.

The network interface 1104 is a wired communication interface for connecting the server 1100 to a wired communication network 1105. The wired communication network 1105 may be a core network such as Evolved Packet Core (EPC), or Packet Data Network (PDN) such as the Internet.

The bus 1106 connects the processor 1101, the memory 1102, the storage 1103, and the network interface 1104 with one another. The bus 1106 may include two or more buses with different speeds (for example, a high-speed bus and a low-speed bus).

In the server 1100 shown in FIG. 66, one or more constituent element included in the processing unit 130 described with reference to FIG. 16 (the quality measurement unit 131, the information collection unit 133, the information acquisition unit 135, and/or the application control unit 137) may be implemented in the processor 1101. As an example, a program for causing the processor to function as the one or more constituent elements (in other words, a program for causing the processor to execute the operations of the one or more constituent elements) may be installed in the server 1100 and thus the processor 1101 may execute the program. As another example, the server 1100 may be mounted with a module that includes the processor 1101 and the memory 1102 and the one or more constituent elements may be implemented in the module. In this case, the module may store the program for causing the processor to function as the one or more constituent elements in the memory 1102 and the program may be executed by the processor 1101. In this manner, the server 1100 or the module may be provided as a device having the one or more constituent elements, and the program for causing the processor to function as the one or more constituent elements may be provided. In addition, a readable recording medium in which the program is recorded may be provided. With regard to these points, one or more constituent elements included in the processing unit 250 described with reference to FIG. 17 (the quality measurement unit 251, the information collection unit 253, the information acquisition unit 255, the information providing unit 257, and/or the communication control unit 259) are the same as the one or more constituent elements included in the processing unit 130.

(Second Application Example)

Figure 67:
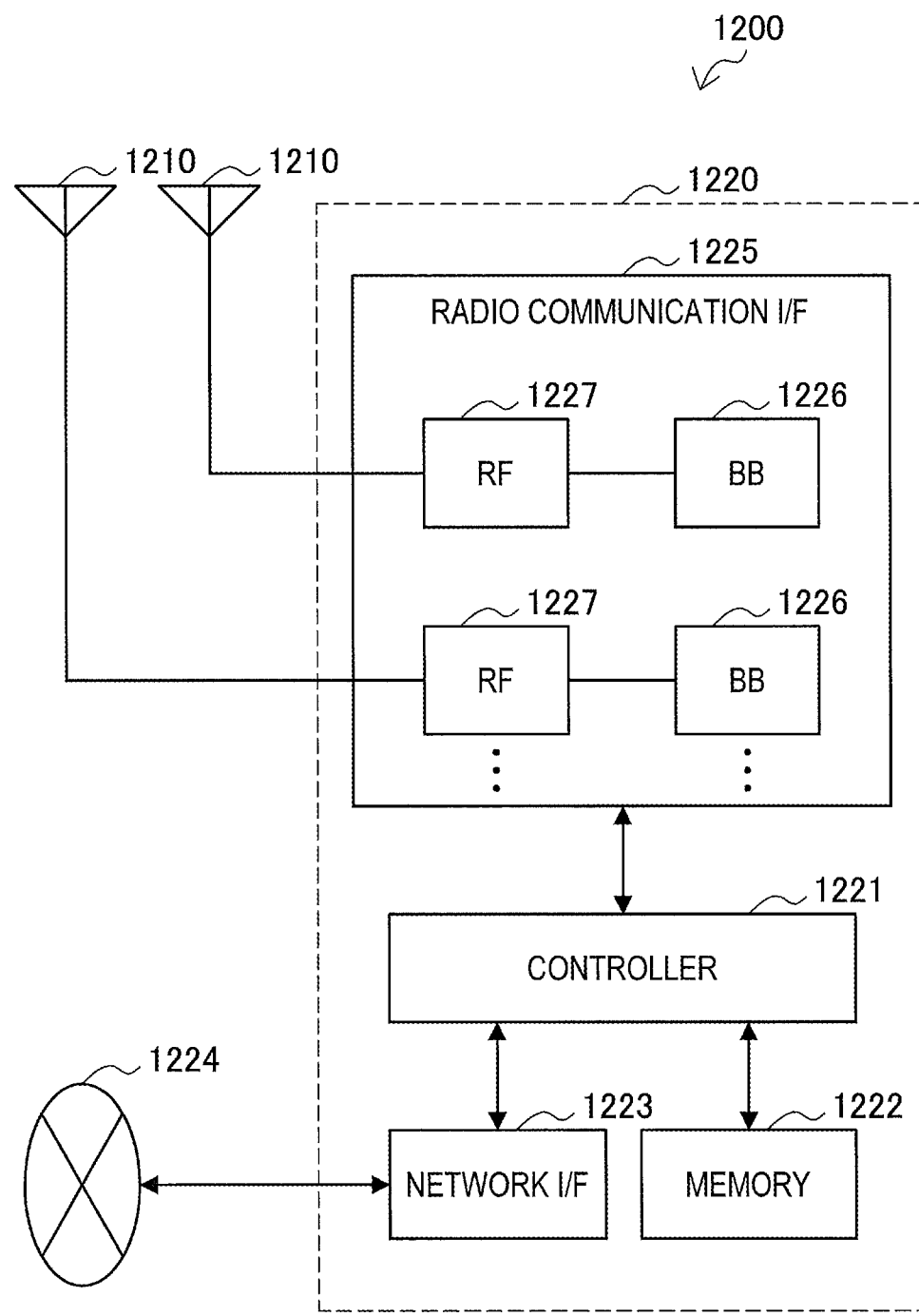
FIG. 67 is a block diagram illustrating a first example of a schematic configuration of eNB.

FIG. 67 is a block diagram showing a first example of the schematic configuration of an eNB to which the technology of the present disclosure can be applied. An eNB 1200 includes one or more antennas 1210 and a base station device 1220. Each antenna 1210 and the base station device 1220 may be connected to each other via an RF cable.

Each of the antennas 1210 includes a single or multiple antenna elements (such as multiple antenna elements included in an MIMO antenna), and is used for the base station device 1220 to transmit and receive radio signals. The eNB 1200 may include the multiple antennas 1210, as illustrated in FIG. 67. For example, the multiple antennas 1210 may be compatible with multiple frequency bands used by the eNB 1200, respectively. Note that FIG. 67 illustrates the example in which the eNB 1200 includes the multiple antennas 1210, but the eNB 1200 may also include a single antenna 1210. The base station device 1220 includes a controller 1221, a memory 1222, a network interface 1223, and a radio communication interface 1225.

The controller 1221 may be, for example, a CPU or a DSP, and operates various functions of a higher layer of the base station device 1220. For example, the controller 1221 generates a data packet from data in signals processed by the radio communication interface 1225, and transfers the generated packet via the network interface 1223. The controller 1221 may bundle data from multiple base band processors to generate the bundled packet and transfer the generated bundled packet. The controller 1221 may have logical functions of performing control such as radio resource control, radio bearer control, mobility management, admission control, and scheduling. The control may be performed in corporation with an eNB or a core network node in the vicinity. The memory 1222 includes a RAM and a ROM, and stores a program that is executed by the controller 1221, and various types of control data (such as a terminal list, transmission power data, and scheduling data).

The network interface 1223 is a communication interface for connecting the base station device 1220 to a core network 1224. The controller 1221 may communicate with a core network node or another eNB via the network interface 1223. In that case, the eNB 1200, and the core network node or the other eNB may be connected to each other through a logical interface (such as an S1 interface and an X2 interface). The network interface 1223 may also be a wired communication interface or a radio communication interface for radio backhaul. If the network interface 1223 is a radio communication interface, the network interface 1223 may use a higher frequency band for radio communication than a frequency band used by the radio communication interface 1225.

The radio communication interface 1225 supports any cellular communication scheme such as Long Term Evolution (LTE) or LTE-Advanced, and provides radio connection to a terminal positioned in a cell of the eNB 1200 via the antenna 1210. The radio communication interface 1225 may typically include, for example, a baseband (BB) processor 1226 and an RF circuit 1227. The BB processor 1226 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 1226 may have a part or all of the above-described logical functions instead of the controller 1221. The BB processor 1226 may be a memory that stores a communication control program, or a module that includes a processor and a related circuit configured to execute the program. Updating the program may allow the functions of the BB processor 1226 to be changed. The module may be a card or a blade that is inserted into a slot of the base station device 1220. Alternatively, the module may also be a chip that is mounted on the card or the blade. Meanwhile, the RF circuit 1227 may include, for example, a mixer, a filter, and an amplifier, and transmits and receives radio signals via the antenna 1210.

The radio communication interface 1225 may include the multiple BB processors 1226, as illustrated in FIG. 67. For example, the multiple BB processors 1226 may be compatible with multiple frequency bands used by the eNB 1200. The radio communication interface 1225 may include the multiple RF circuits 1227, as illustrated in FIG. 67. For example, the multiple RF circuits 1227 may be compatible with multiple antenna elements, respectively. Note that FIG. 67 illustrates the example in which the radio communication interface 1225 includes the multiple BB processors 1226 and the multiple RF circuits 1227, but the radio communication interface 1225 may also include a single BB processor 1226 or a single RF circuit 1227.

In the eNB 1200 shown in FIG. 67, the one or more constituent elements included in the processing unit 250 described with reference to FIG. 17 (the quality measurement unit 251, the information collection unit 253, the information acquisition unit 255, the information providing unit 257, and/or the communication control unit 259) may be implemented in the radio communication interface 1225. Alternatively, at least some of the constituent elements may be implemented in the controller 1221. As an example, the eNB 1200 may be mounted with a part (for example, the BB processor 1226) of or the entire radio communication interface 1225 and/or a module that includes the controller 1221, and the one or more constituent elements may be implemented in the module. In this case, the module may store a program for causing the processor to function as the one or more constituent elements (in other words, a program for causing the processor to execute operations of the one or more constituent elements) to execute the program. As another example, the program for causing the processor to function as the one or more constituent elements may be installed in the eNB 1200 and the radio communication interface 1225 (for example, the BB processor 1226) and/or the controller 1221 may execute the program. As described above, the eNB 1200, the base station device 1220, or the module may be provided as a device that includes the one or more constituent elements, and the program for causing the processor to function as the one or more constituent elements may be provided. In addition, a readable recording medium in which the program is recorded may be provided. With regard to these points, the one or more constituent elements included in the processing unit 130 described with reference to FIG. 16 (the quality measurement unit 131, the information collection unit 133, the information acquisition unit 135, and/or the application control unit 137) are the same as the one or more constituent elements included in the processing unit 250.

(Third Application Example)

Figure 68:
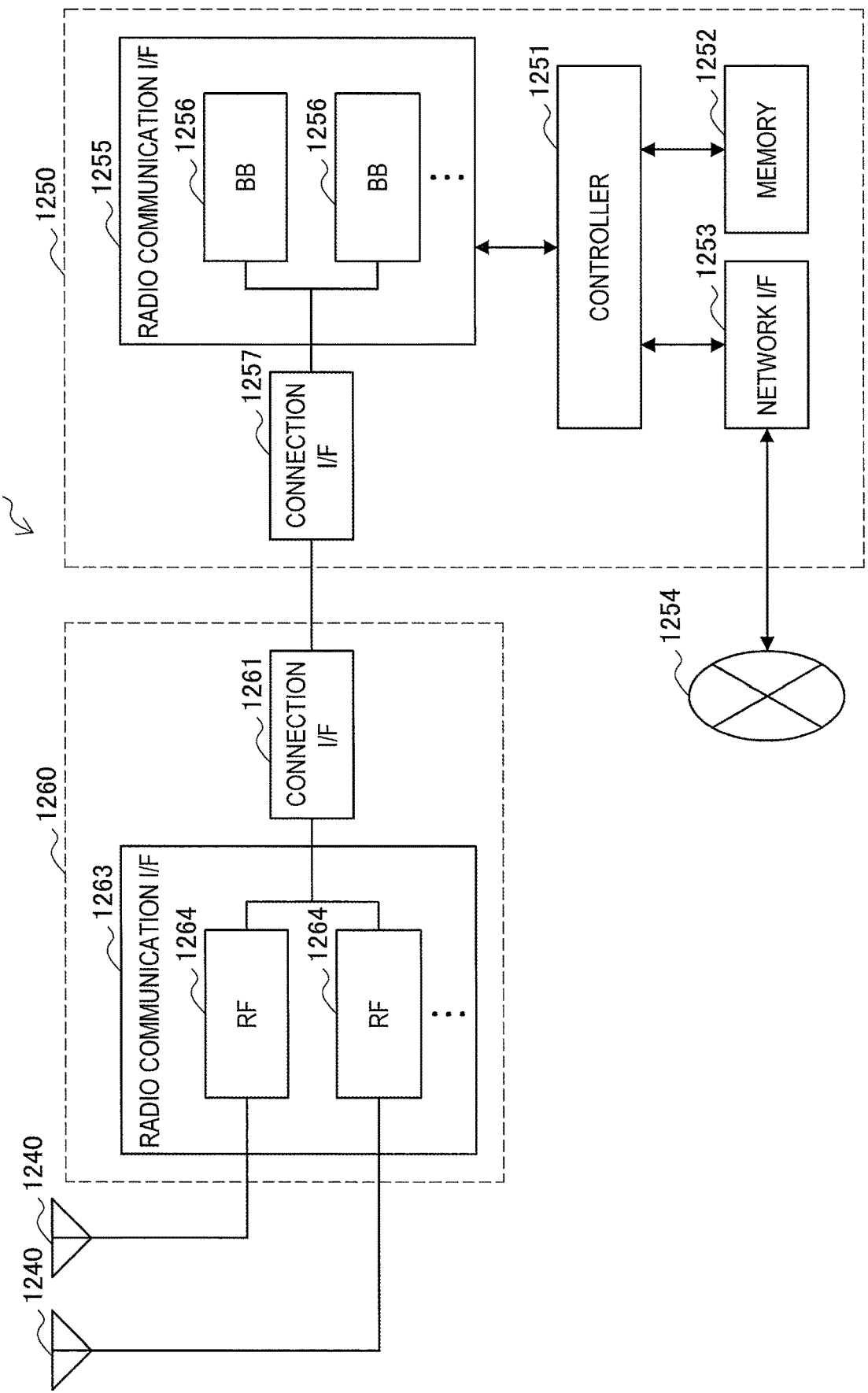
FIG. 68 is a block diagram showing a second example of a schematic configuration of eNB.

FIG. 68 is a block diagram showing a second example of the schematic configuration of an eNB to which the technology of the present disclosure may be applied. An eNB 1230 includes one or more antennas 1240, a base station apparatus 1250, and an RRH 1260. Each antenna 1240 and the RRH 1260 may be connected to each other via an RF cable. Further, the base station apparatus 1250 and the RRH 1260 may be connected to each other by a high-speed line such as an optical fiber cable.

Each of the antennas 1240 includes a single or multiple antenna elements (such as multiple antenna elements included in an MIMO antenna), and is used for the RRH 1260 to transmit and receive radio signals. The eNB 1230 may include the multiple antennas 1240, as illustrated in FIG. 68. For example, the multiple antennas 1240 may be compatible with multiple frequency bands used by the eNB 1230, respectively. Note that FIG. 68 illustrates the example in which the eNB 1230 includes the multiple antennas 1240, but the eNB 1230 may also include a single antenna 1240.

The base station apparatus 1250 includes a controller 1251, a memory 1252, a network interface 1253, a radio communication interface 1255, and a connection interface 1257. The controller 1251, the memory 1252 and the network interface 1253 are similar to the controller 1221, the memory 1222 and the network interface 1223 described with reference to FIG. 67.

The radio communication interface 1255 supports any cellular communication scheme such as the LTE or the LTE-Advanced, and provides radio connection to a terminal positioned in a sector corresponding to the RRH 1260 via the RRH 1260 and the antenna 1240. The radio communication interface 1255 may typically include a BB processor 1256, and others. The BB processor 1256 is similar to the BB processor 1226 described with reference to FIG. 67 except for being connected to an RF circuit 1264 of the RRH 1260 via the connection interface 1257. The radio communication interface 1255 includes the multiple BB processors 1256 as shown in FIG. 68, and, for example, the multiple BB processors 1256 may be compatible with the multiple frequency bands used by the eNB 1230, respectively. Note that FIG. 68 illustrates the example in which the radio communication interface 1255 includes the multiple BB processors 1256, but the radio communication interface 1255 may also include a single BB processor 1256.

The connection interface 1257 is an interface for connecting the base station apparatus 1250 (radio communication interface 1255) to the RRH 1260. The connection interface 1257 may be a communication module for communication on the high-speed line for connecting the base station apparatus 1250 (radio communication interface 1255) to the RRH 1260.

Furthermore, the RRH 1260 includes a connection interface 1261, and a radio communication interface 1263.

The connection interface 1261 is an interface for connecting the RRH 1260 (radio communication interface 1263) to the base station apparatus 1250. The connection interface 1261 may be a communication module for communication on the high-speed line.

The radio communication interface 1263 transmits and receives radio signals via the antenna 1240. The radio communication interface 1263 may typically include the RF circuit 1264, and others. The RF circuit 1264 may include a mixer, a filter, and an amplifier, and others, and transmits and receives radio signals via the antenna 1240. The radio communication interface 1263 includes the multiple RF circuits 1264 as shown in FIG. 68, and, for example, the multiple RF circuits 1264 may be compatible with the multiple antenna elements, respectively. Note that FIG. 68 illustrates the example in which the radio communication interface 1263 includes the multiple RF circuits 1264, but the radio communication interface 1263 may also include a single RF circuit 1264.

In the eNB 1230 shown in FIG. 68, the one or more constituent elements included in the processing unit 250 described with reference to FIG. 17 (the quality measurement unit 251, the information collection unit 253, the information acquisition unit 255, the information providing unit 257, and/or the communication control unit 259) may be implemented in the radio communication interface 1255 and/or the radio communication interface 1263. Alternatively, at least some of the constituent elements may be implemented in the controller 1251. As an example, the eNB 1230 may be mounted with a part (for example, the BB processor 1256) of or the entire radio communication interface 1255 and/or a module that includes the controller 1251, and the one or more constituent elements may be implemented in the module. In this case, the module may store a program for causing the processor to function as the one or more constituent elements (in other words, a program for causing the processor to execute operations of the one or more constituent elements) to execute the program. As another example, the program for causing the processor to function as the one or more constituent elements may be installed in the eNB 1230 and the radio communication interface 1255 (for example, the BB processor 1256) and/or the controller 1251 may execute the program. As described above, the eNB 1230, the base station device 1250, or the module may be provided as a device that includes the one or more constituent elements, and the program for causing the processor to function as the one or more constituent elements may be provided. In addition, a readable recording medium in which the program is recorded may be provided. With regard to these points, the one or more constituent elements included in the processing unit 130 described with reference to FIG. 16 (the quality measurement unit 131, the information collection unit 133, the information acquisition unit 135, and/or the application control unit 137) are the same as the one or more constituent elements included in the processing unit 250.

(Fourth Application Example)

Figure 69:
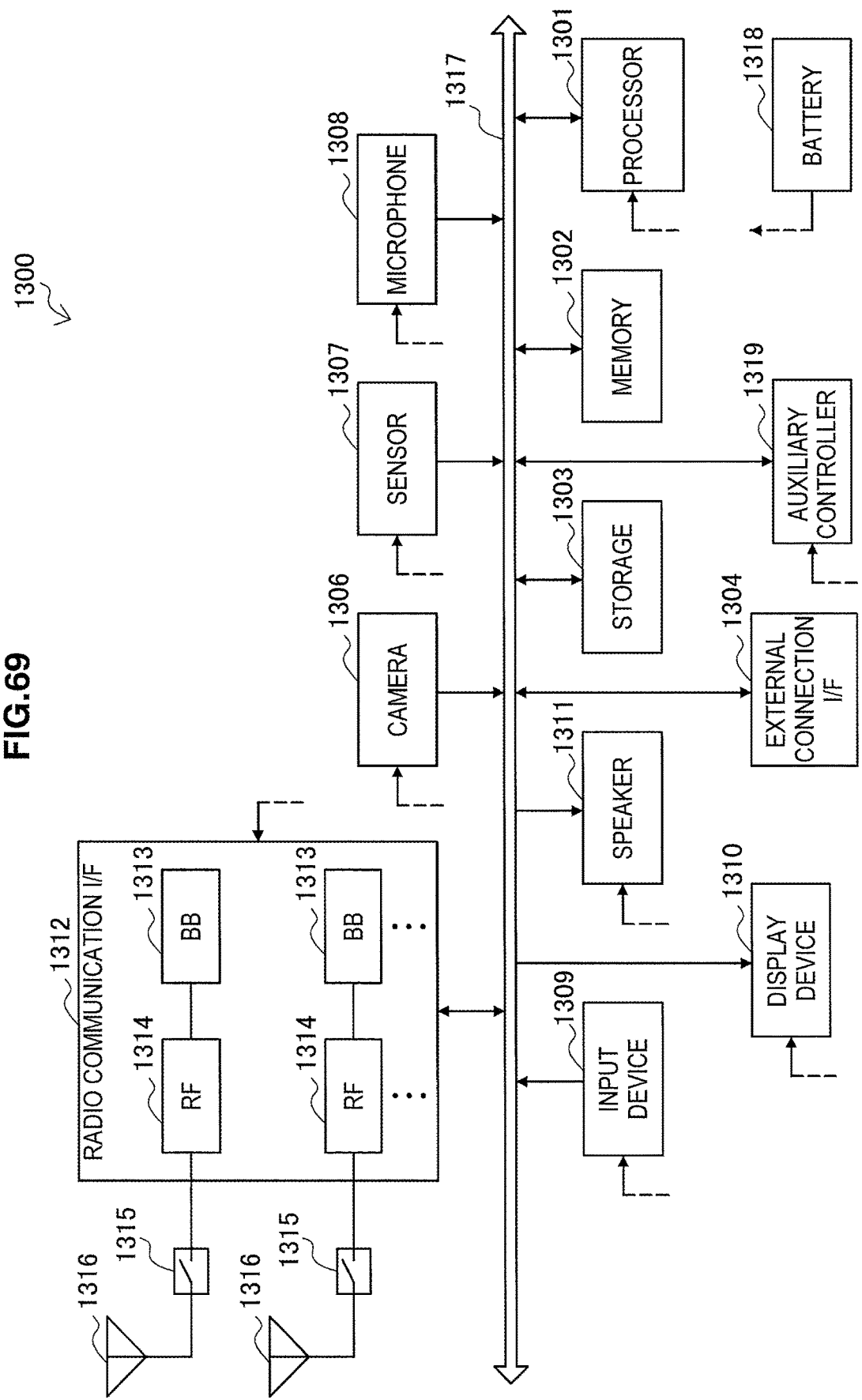
FIG. 69 is a block diagram showing an example of a schematic configuration of a smartphone.

FIG. 69 is a block diagram showing an example of the schematic configuration of a smartphone 1300 to which the technology of the present disclosure may be applied. The smartphone 1300 includes a processor 1301, a memory 1302, a storage 1303, an external connection interface 1304, a camera 1306, a sensor 1307, a microphone 1308, an input device 1309, a display device 1310, a speaker 1311, a radio communication interface 1312, one or more antenna switches 1315, one or more antennas 1316, a bus 1317, a battery 1318, and an auxiliary controller 1319.

The processor 1301 may be, for example, a CPU or a system on chip (SoC), and controls functions of an application layer and another layer of the smartphone 1300. The memory 1302 includes a RAM and a ROM, and stores a program that is executed by the processor 1301, and data. The storage 1303 may include a storage medium such as a semiconductor memory and a hard disk. The external connection interface 1304 is an interface for connecting an external device such as a memory card and a Universal Serial Bus (USB) device to the smartphone 1300.

The camera 1306 includes an image sensor such as a charge coupled device (CCD) and a complementary metal oxide semiconductor (CMOS), and generates a captured image. The sensor 1307 may include a group of sensors such as a measurement sensor, a gyro sensor, a geomagnetic sensor, and an acceleration sensor. The microphone 1308 converts sounds that are input to the smartphone 1300 to audio signals. The input device 1309 includes, for example, a touch sensor configured to detect touch onto a screen of the display device 1310, a keypad, a keyboard, a button, or a switch, and receives an operation or an information input from a user. The display device 1310 includes a screen such as a liquid crystal display (LCD) and an organic light-emitting diode (OLED) display, and displays an output image of the smartphone 1300. The speaker 1311 converts audio signals that are output from the smartphone 1300 into sounds.

The radio communication interface 1312 supports any cellular communication scheme such as LTE and LTE-Advanced, and performs radio communication. The radio communication interface 1312 may typically include, for example, a BB processor 1313 and an RF circuit 1314. The BB processor 1313 may perform, for example, encoding/decoding, modulating/demodulating, and multiplexing/demultiplexing, and performs various types of signal processing for radio communication. Meanwhile, the RF circuit 1314 may include, for example, a mixer, a filter, and an amplifier, and transmits and receives radio signals via the antenna 1316. The radio communication interface 1312 may also be a one chip module that has the BB processor 1313 and the RF circuit 1314 integrated thereon. The radio communication interface 1312 may include the multiple BB processors 1313 and the multiple RF circuits 1314, as illustrated in FIG. 69. It should be noted that FIG. 69 illustrates the example in which the radio communication interface 1312 includes the multiple BB processors 1313 and the multiple RF circuits 1314, but the radio communication interface 1312 may also include a single BB processor 1313 or a single RF circuit 1314.

Furthermore, in addition to a cellular communication scheme, the radio communication interface 1312 may support another type of radio communication scheme such as a short-distance wireless communication scheme, a near field communication scheme, and a radio local area network (LAN) scheme. In that case, the radio communication interface may include the BB processor 1313 and the RF circuit 1314 for each radio communication scheme.

Each of the antenna switches 1315 switches connection destinations of the antennas 1316 among multiple circuits (such as circuits for different radio communication schemes) included in the radio communication interface 1312.

Each of the antennas 1316 includes a single or multiple antenna elements (such as multiple antenna elements included in an MIMO antenna), and is used for the radio communication interface 1312 to transmit and receive radio signals. The smartphone 1300 may include the multiple antennas 1316, as illustrated in FIG. 69. Note that FIG. 69 illustrates the example in which the smartphone 1300 includes the multiple antennas 1316, but the smartphone 1300 may also include a single antenna 1316.

Furthermore, the smartphone 1300 may include the antenna 1316 for each radio communication scheme. In that case, the antenna switches 1315 may be omitted from the configuration of the smartphone 1300.

The bus 1317 connects the processor 1301, the memory 1302, the storage 1303, the external connection interface 1304, the camera 1306, the sensor 1307, the microphone 1308, the input device 1309, the display device 1310, the speaker 1311, the radio communication interface 1312, and the auxiliary controller 1319 to each other. The battery 1318 supplies power to blocks of the smartphone 1300 illustrated in FIG. 69 via feeder lines, which are partially shown as dashed lines in the figure. The auxiliary controller 1319 operates a minimum necessary function of the smartphone 1300, for example, in a sleep mode.

In the smartphone 1300 shown in FIG. 68, the one or more constituent elements included in the processing unit 250 described with reference to FIG. 17 (the quality measurement unit 251, the information collection unit 253, the information acquisition unit 255, the information providing unit 257, and/or the communication control unit 259) may be implemented in the radio communication interface 1312. Alternatively, at least some of the constituent elements may be implemented in the processor 1301 or the auxiliary controller 1319. As an example, the smartphone 1300 may be mounted with a part (for example, the BB processor 1313) of or the entire radio communication interface 1255 and/or a module that includes the processor 1301 or the auxiliary controller 1319, and the one or more constituent elements may be implemented in the module. In this case, the module may store a program for causing the processor to function as the one or more constituent elements (in other words, a program for causing the processor to execute operations of the one or more constituent elements) to execute the program. As another example, the program for causing the processor to function as the one or more constituent elements may be installed in the smartphone 1300 and the radio communication interface 1312 (for example, the BB processor 1313), the processor 1301 and/or the auxiliary controller 1319 may execute the program. As described above, the smartphone 1300, or the module may be provided as a device that includes the one or more constituent elements, and the program for causing the processor to function as the one or more constituent elements may be provided. In addition, a readable recording medium in which the program is recorded may be provided.

(Fifth Application Example)

FIG. 70 is a block diagram showing an example of the schematic configuration of a car navigation device 1320 to which the technology of the present disclosure may be applied. The car navigation device 1320 includes a processor 1321, a memory 1322, a Global Positioning System (GPS) module 1324, a sensor 1325, a data interface 1326, a content player 1327, a storage medium interface 1328, an input device 1329, a display device 1330, a speaker 1331, a radio communication interface 1333, one or more antenna switches 1336, one or more antennas 1337, and a battery 1338.

The processor 1321 may be, for example, a CPU or a SoC, and controls a navigation function and another function of the car navigation device 1320. The memory 1322 includes a RAM and a ROM, and stores a program that is executed by the processor 1321, and data.

The GPS module 1324 uses GPS signals received from a GPS satellite to measure a position (such as latitude, longitude, and altitude) of the car navigation device 1320. The sensor 1325 may include a group of sensors such as a gyro sensor, a geomagnetic sensor, and an air pressure sensor. The data interface 1326 is connected to, for example, an in-vehicle network 1341 via a terminal that is not shown, and acquires data generated by the vehicle, such as vehicle speed data.

The content player 1327 reproduces content stored in a storage medium (such as a CD and a DVD) that is inserted into the storage medium interface 1328. The input device 1329 includes, for example, a touch sensor configured to detect touch onto a screen of the display device 1330, a button, or a switch, and receives an operation or an information input from a user. The display device 1330 includes a screen such as a LCD or an OLED display, and displays an image of the navigation function or content that is reproduced. The speaker 1331 outputs sound of the navigation function or the content that is reproduced.

The radio communication interface 1333 supports any cellular communication scheme such as LET and LTE-Advanced, and performs radio communication. The radio communication interface 1333 may typically include, for example, a BB processor 1334 and an RF circuit 1335. The BB processor 1334 may perform, for example, encoding/decoding, modulating/demodulating, and multiplexing/demultiplexing, and performs various types of signal processing for radio communication. Meanwhile, the RF circuit 1335 may include, for example, a mixer, a filter, and an amplifier, and transmits and receives radio signals via the antenna 1337. The radio communication interface 1333 may be a one chip module having the BB processor 1334 and the RF circuit 1335 integrated thereon. The radio communication interface 1333 may include the multiple BB processors 1334 and the multiple RF circuits 1335, as illustrated in FIG. 70. Note that FIG. 70 illustrates the example in which the radio communication interface 1333 includes the multiple BB processors 1334 and the multiple RF circuits 1335, but the radio communication interface 1333 may also include a single BB processor 1334 or a single RF circuit 1335.

Furthermore, in addition to a cellular communication scheme, the radio communication interface 1333 may support another type of radio communication scheme such as a short-distance wireless communication scheme, a near field communication scheme, and a radio LAN scheme. In that case, the radio communication interface may include the BB processor 1334 and the RF circuit 1335 for each radio communication scheme.

Each of the antenna switches 1336 switches connection destinations of the antennas 1337 among multiple circuits (such as circuits for different radio communication schemes) included in the radio communication interface 1333.

Each of the antennas 1337 includes a single or multiple antenna elements (such as multiple antenna elements included in an MIMO antenna), and is used for the radio communication interface 1333 to transmit and receive radio signals. The car navigation device 1320 may include the multiple antennas 1337, as illustrated in FIG. 70. Note that FIG. 70 illustrates the example in which the car navigation device 1320 includes the multiple antennas 1337, but the car navigation device 1320 may also include a single antenna 1337.

Furthermore, the car navigation device 1320 may include the antenna 1337 for each radio communication scheme. In that case, the antenna switches 1336 may be omitted from the configuration of the car navigation device 1320.

The battery 1338 supplies power to blocks of the car navigation device 1320 illustrated in FIG. 70 via feeder lines that are partially shown as dashed lines in the figure. The battery 1338 accumulates power supplied form the vehicle.

In the car navigation device 1320 shown in FIG. 70, the one or more constituent elements included in the processing unit 250 described with reference to FIG. 17 (the quality measurement unit 251, the information collection unit 253, the information acquisition unit 255, the information providing unit 257, and/or the communication control unit 259) may be implemented in the radio communication interface 1333. Alternatively, at least some of the constituent elements may be implemented in the processor 1321. As an example, the car navigation device 1320 may be mounted with a part (for example, the BB processor 1334) of or the entire radio communication interface 1333 and/or a module that includes the processor 1321, and the one or more constituent elements may be implemented in the module. In this case, the module may store a program for causing the processor to function as the one or more constituent elements (in other words, a program for causing the processor to execute operations of the one or more constituent elements) to execute the program. As another example, the program for causing the processor to function as the one or more constituent elements may be installed in the car navigation device 1320 and the radio communication interface 1333 (for example, the BB processor 1334), and/or the processor 1321 may execute the program. As described above, the car navigation device 1320, or the module may be provided as a device that includes the one or more constituent elements, and the program for causing the processor to function as the one or more constituent elements may be provided. In addition, a readable recording medium in which the program is recorded may be provided.

In addition, the technology of the present disclosure may be realized as an in-vehicle system (or a vehicle) 1340 which includes one or more blocks of the above-described car navigation device 1320, the in-vehicle network 1341, and a vehicle-side module 1342. In other words, the in-vehicle system (or vehicle) 1340 may be provided as a device which includes the one or more constituent elements included in the processing unit 250. The vehicle-side module 1342 generates vehicle data such as a vehicle speed, the number of engine rotations, or breakdown information, and outputs the generated data to the in-vehicle network 1341.

8. Conclusion

So far, devices and processes according to the embodiments of the present disclosure have been described using FIGS. 1 to 67. According to the embodiments of the present disclosure, the control entity 100 (information acquisition unit 135) acquires quality-related information (backhaul quality information) regarding quality of a backhaul line that is used to provide control-related information regarding to control in a control scheme of radio communication to a communication node to which the control scheme is applied. Then, the control entity 100 (application control unit 137) controls application of the control scheme to the communication node based on the quality-related information (backhaul quality information).

Accordingly, when it is not possible to properly apply a control scheme due to a delay on a backhaul line (or irregular delay), application of the control scheme can be avoided. As an example, in application of a control scheme (for example, BF (null steering)) to two eNBs, control-related information is transmitted to one eNB without delay and to the other eNB with a long delay. If the control scheme is applied to them in this case, there is a possibility of the application to the one eNB in time and the application to the other eNB not in time. In such a case, application of the control scheme can be avoided. It should be noted that, when there is no problem in application of a control scheme, the control scheme can be applied considering a delay on a backhaul line (or irregular delay). In this manner, control over a plurality of communication nodes (for example, interference control, and CoMP transmission and reception) can be performed more properly.

Control Scheme

The above-described control scheme is a scheme for improving a communication capacity of the communication system which includes the communication nodes.

By controlling application of a control scheme for improving the communication quality of the communication system based on the backhaul quality information, for example, communication quality can be improved and the communication capacity can be improved.

As an example, the control scheme includes a scheme for suppressing interference in radio communication in which two or more communication nodes respectively participate (interference control scheme).

By controlling application of an interference control scheme based on the backhaul quality information, for example, it is possible to select and apply a more proper interference control scheme within the constraint on the backhaul lines. Accordingly, interference can be more properly suppressed. As a result, communication quality can be improved and the communication capacity of the communication system 1 can be improved.

As another example, the control scheme includes coordinated multi-point (CoMP) transmission and reception.

By controlling application of CoMP transmission and reception based on the backhaul quality information, for example, CoMP transmission and reception can be applied only in a case possible within the constraint on the backhaul lines. Accordingly, while communication quality can be improved due to CoMP transmission and reception, deterioration in communication quality caused by failure of CoMP transmission and reception can be suppressed. As a result, communication quality can be improved and the communication capacity of the communication system 1 can be improved.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, although the example in which the control scheme is interference control scheme or CoMP transmission and reception has been described, the present disclosure is not limited thereto. The control scheme may be an arbitrary control scheme relating to a plurality of communication nodes.

In addition, although the example in which backhaul quality information (quality-related information) is accumulated in the control entity has been described, the present disclosure is not limited thereto. Backhaul quality information (quality-related information) may be accumulated in, for example, another device (a database) instead of the control entity. Further, the control entity may acquire the backhaul quality information accumulated in the other device.

In addition, although the example in which the control entity is implemented in an existing core network node (for example, an MME) has been mainly described, the present disclosure is not limited thereto. For example, the control entity may be implemented as a new core network node, or a radio access network node (for example, an eNB).

In addition, although the example in which the radio access network node (for example, an eNB) allocates radio resources (i.e., scheduling) has been mainly described, the present disclosure is not limited thereto. For example, the control entity that is a core network node may perform a part of or the entire allocation of radio resources.

In addition, although the example in which the communication system is based on LTE, LTE-Advanced, or a communication scheme equivalent thereto has been described, the present disclosure is not limited thereto. The communication system may be a system, for example, based on another communication standard. Further, in such a case, the communication system may include another core network node in place of the MME, the S-GW, or the like, include any base station or access point in place of various eNBs, and include any terminal device in place of the UE.

In addition, processing steps of communication control devices (the control entity and the execution entity) of the present specification may not necessarily be executed in a time sequential manner in the orders described in flowcharts. For example, the processing steps of the communication control devices may be executed in different orders from those described in the flowcharts or in a parallel manner.

In addition, a computer program for causing a processor (for example, a CPU, a DSP, or the like) included in a device of the present specification (for example, the control entity or a module thereof, or the execution entity or a module thereof) to function as one or more constituent elements of the device (in other words, a computer program for causing the processor to execute operations of the constituent elements of the device) can also be created. Further, a recording medium in which the computer program is recorded may also be provided. In addition, a device that includes a memory that stores the computer program and one or more processors that can execute the computer programs (for example, a finished product or a module for a finished product (a component, a processing circuit, a chip, or the like)) may also be provided. Further, a method including an operation of the one or more constituent elements of the device is also included in the technology of the present disclosure.

In addition, effects described in the present specification are merely descriptive or illustrative, and not limitative. In other words, the technology of the present disclosure can exhibit, along with or instead of the effects, other effects obvious for a person skilled in the art from description of the present specification. Additionally, the present technology may also be configured as below.

(1)

A communication control device including:

an acquisition unit configured to acquire quality-related information regarding quality of a backhaul line to be used for providing control-related information regarding control in a control scheme of radio communication to a communication node to which the control scheme is applied; and a control unit configured to control the application of the control scheme to the communication node based on the quality-related information.

(2)

The communication control device according to (1), wherein the control unit controls application of the control scheme to two or more communication nodes including the communication node based on the quality-related information.

(3)

The communication control device according to any one of (1) and (2), wherein the control scheme is a scheme for improving a communication capacity of a communication system which includes the communication node.

(4)

The communication control device according to (3), wherein the control scheme includes a scheme for suppressing interference in radio communication in which two or more communication nodes respectively participate.

(5)

The communication control device according to (3) or (4), wherein the control scheme includes coordinated multi-point transmission and reception.

(6)

The communication control device according to (2), wherein a plurality of communication nodes to which the control scheme is applied are classified into one or more groups based on information regarding the plurality of communication nodes, and wherein the control unit controls, for each group which is included in the one or more groups, application of the control scheme to one or more communication nodes based on the quality-related information for the one or more communication nodes included in a group.

(7)

The communication control device according to (6), wherein the information regarding the plurality of communication nodes includes at least one of information of positions of the plurality of communication nodes, information of a radio resource to be used by the plurality of communication nodes, and quality-related information regarding quality of a backhaul line to be used for providing the control-related information to the plurality of communication nodes.

(8)

The communication control device according to any one of (1) to (7), wherein the quality-related information is generated through a measurement procedure for the quality of the backhaul line, and wherein the acquisition unit acquires the generated quality-related information.

(9)
The communication control device according to (8), wherein the measurement procedure includes measuring the quality of the backhaul line bi-directionally.

(10)
The communication control device according to (8) or (9), wherein the measurement procedure includes transmitting and receiving one or more messages including a transmission time.

(11)
The communication control device according to any one of (8) to (10), wherein the measurement procedure includes measuring the quality of the backhaul line a plurality of times.

(12)
The communication control device according to any one of (8) to (11),
wherein the backhaul line is a combination of a plurality of individual backhaul lines, and
wherein the measurement procedure includes measuring quality of at least one individual backhaul line among the plurality of individual backhaul lines.

(13)
The communication control device according to any one of (1) to (12),
wherein the quality-related information is collected from another device through a collection procedure for the quality-related information, and
wherein the acquisition unit acquires the collected quality-related information.

(14)
The communication control device according to (13),
wherein the backhaul line is a combination of a plurality of individual backhaul lines, and
wherein the collection procedure includes collecting information regarding quality of at least one individual backhaul line among the plurality of individual backhaul lines.

(15)
The communication control device according to any one of (1) to (14), wherein the quality of the backhaul line is delay time on the backhaul line.

(16)
The communication control device according to any one of (1) to (15), wherein the communication node is a base station, a relay station, or a terminal device which controls radio communication on a localized network which is formed by a plurality of terminal devices.

(17)
A communication control method executed by a communication control device, the communication control method including:
acquiring quality-related information regarding quality of a backhaul line to be used for providing control-related information regarding control in a control scheme of radio communication to a communication node to which the control scheme is applied; and
controlling the application of the control scheme to the communication node based on the quality-related information.

(18)
A communication device including:
an acquisition unit configured to acquire at least a part of quality-related information regarding quality of a backhaul line to be used for providing control-related information regarding control in a control scheme of radio communication to a communication node to which the control scheme is applied; and
a providing unit configured to provide the at least a part of the quality-related information,
wherein the quality-related information is information to be used in controlling the application of the control scheme to the communication node.

(19)
The communication device according to (18),
wherein the at least a part of the quality-related information is generated through a measurement procedure for the quality of the backhaul line, and
wherein the acquisition unit acquires the generated at least a part of the quality-related information.

(20)
The communication device according to (18) or (19),
wherein the backhaul line is a combination of a plurality of individual backhaul lines, and
wherein the at least a part of the quality-related information is information regarding quality of at least one individual backhaul line among the plurality of individual backhaul lines.

REFERENCE SIGNS LIST 1 communication system
21 macro evolved Node B (eNB)/MeNB
23 pico PeNB/PeNB
25 remote radio head (RRH)
27 relay node (RN)
29 home eNB/HeNB
31 user equipment (UE)
41 mobility management entity (MME)
43 serving gateway/S-GW
45 HeNB gateway/HeNB-GW
47 packet data network gateway/PDN-GW
100 control entity
135 information acquisition unit
137 application control unit
200 execution entity
255 information acquisition unit
257 information providing unit
259 communication control unit

What is claimed is:
1. A communication device, comprising:
at least one processor configured to:
transmit a request message associated with a quality of a backhaul link to a communication node,
wherein the communication node measures at least a first part of quality-related information associated with the quality of the backhaul link based on the request message;
acquire at least the first part of the quality-related information associated with the quality of the backhaul link, via a response message from the communication node;
measure at least a second part of the quality-related information for the quality of the backhaul link, based on the response message;
generate at least the second part of the quality-related information for the quality of the backhaul link based on the measurement of at least the second part of the quality-related information for the quality of the backhaul link, wherein
the measurement of at least the first part of the quality-related information and the measurement of at least the second part of the quality-related information are repeated for a plurality of times; and provide at least the second part of the quality-related information to the communication node.

2. The communication device according to claim 1, wherein
the backhaul link is a combination of a plurality of individual backhaul links, and
each of at least the first part of the quality-related information and at least the second part of the quality-related information is information associated with a quality of at least one respective individual backhaul link of the plurality of individual backhaul links.

3. The communication device according to claim 1, wherein
the request message includes a current request index and a total number of a plurality of request messages, and
the current request index indicates an order of the request message among the plurality of request messages.

4. The communication device according to claim 1, wherein
the response message includes a total number of a plurality of response messages, a current response index, and a measurement result of at least the first part of the quality-related information associated with the quality of the backhaul link.

5. The communication device according to claim 1, wherein
the request message includes a request flag for the measurement of the quality of the backhaul link, and
the request flag indicates a type of quality corresponding to the measurement of the quality of the backhaul link.

6. A method, comprising:
transmitting a request message associated with a quality of a backhaul link to a communication node,
wherein the communication node measures at least a first part of quality-related information associated with the quality of the backhaul link based on the request message;
acquiring at least the first part of the quality-related information associated with the quality of the backhaul link, via a response message from the communication node;
measuring at least a second part of the quality-related information for the quality of the backhaul link, based on the response message;
generating at least the second part of the quality-related information for the quality of the backhaul link based on the measurement of at least the second part of the quality-related information for the quality of the backhaul link, wherein
the measurement of at least the first part of the quality-related information and the measurement of at least the second part of the quality-related information are repeated for a plurality of times; and
providing at least the second part of the quality-related information to the communication node.

7. The method according to claim 6, wherein
the backhaul link is a combination of a plurality of individual backhaul links, and
each of at least the first part of the quality-related information and at least the second part of the quality-related information is information associated with a quality of at least one respective individual backhaul link from the plurality of individual backhaul links.

8. The method according to claim 6, wherein
the request message includes a current request index and a total number of a plurality of request messages, and
the current request index indicates an order of the request message among the plurality of request messages.

9. The method according to claim 6, wherein
the response message includes a total number of a plurality of response messages, a current response index, and a measurement result of at least the first part of the quality-related information associated with the quality of the backhaul link.

10. The method according to claim 6, wherein
the request message includes a request flag for the measurement of the quality of the backhaul link, and
the request flag indicates a type of quality corresponding to the measurement of the quality of the backhaul link.

11. A non-transitory computer-readable medium having stored thereon computer-executable instructions that, when executed by a processor, cause the processor to execute operations, the operations comprising:
transmitting a request message associated with a quality of a backhaul link to a communication node,
wherein the communication node measures at least a first part of quality-related information associated with the quality of the backhaul link based on the request message;
acquiring at least the first part of the quality-related information associated with the quality of the backhaul link, via a response message from the communication node;
measuring at least a second part of the quality-related information for the quality of the backhaul link, based on the response message;
generating at least the second part of the quality-related information for the quality of the backhaul link based on the measurement of at least the second part of the quality-related information for the quality of the backhaul link, wherein
the measurement of at least the first part of the quality-related information and the measurement of at least the second part of the quality-related information are repeated for a plurality of times; and
providing at least the second part of the quality-related information to the communication node.

12. The non-transitory computer-readable medium according to claim 11, wherein
the backhaul link is a combination of a plurality of individual backhaul links, and
each of at least the first part of the quality-related information and at least the second part of the quality-related information is information associated with a quality of at least one respective individual backhaul link of the plurality of individual backhaul links.

13. The non-transitory computer-readable medium according to claim 11, wherein
the request message includes a current request index and a total number of a plurality of request messages, and
the current request index indicates an order of the request message among the plurality of request messages.

14. The non-transitory computer-readable medium according to claim 11, wherein
the response message includes a total number of a plurality of response messages, a current response index, and a measurement result of at least the first part of the quality-related information associated with the quality of the backhaul link.

15. The non-transitory computer-readable medium according to claim 11, the request message includes a request flag for the measurement of the quality of the backhaul link, and the request flag indicates a type of quality corresponding to the measurement of the quality of the backhaul link.

\* \* \* \* \*